United States Patent [19]  [11] Patent Number: 5,647,650
Daugherty et al.  [45] Date of Patent: Jul. 15, 1997

[54] MODULAR STORAGE AND SUPPORT ASSEMBLY

[75] Inventors: Jonathan M. Daugherty, Wilkes-Barre; Kenneth A. Stevens, Harleysville, both of Pa.

[73] Assignee: Metro Industries, Inc., Reno, Nev.

[21] Appl. No.: 426,674

[22] Filed: Apr. 21, 1995

[51] Int. Cl.⁶ .................................................. A47B 47/00
[52] U.S. Cl. ........................... 312/265.1; 312/265.5; 312/265.2; 312/249.8; 312/249.11; 108/144; 108/153; 108/180; 108/193; 52/282.2; 403/170; 403/174; 403/252
[58] Field of Search ...................... 312/265.1, 265.2, 312/265.3, 265.4, 265.5, 265.6, 249.8, 249.11; 108/50, 153, 180, 182, 186, 193, 144; 248/245.1; 403/252, 174, 178, 170; 52/282.1, 282.2, 736.1, 720.1

[56] References Cited

U.S. PATENT DOCUMENTS

| D. 361,631 | 8/1995 | King. |
| 3,462,110 | 8/1969 | Cheslock. |
| 3,486,287 | 12/1969 | Guillon ............................... 52/282.2 X |
| 3,513,606 | 5/1970 | Jones ................................. 52/282.2 X |
| 3,523,508 | 8/1970 | Maslow ............................... 108/144 |
| 4,142,343 | 3/1979 | Trafton. |
| 4,163,537 | 8/1979 | Mourgue ............................. 108/153 X |
| 4,490,064 | 12/1984 | Ducharme ........................... 403/252 X |
| 4,544,300 | 10/1985 | Lew et al. ............................. 403/170 |
| 4,641,983 | 2/1987 | Strässle ............................... 403/252 X |
| 4,676,038 | 6/1987 | Doyon et al. ......................... 52/282.2 |
| 4,775,259 | 10/1988 | Shell .................................... 403/252 |
| 4,805,365 | 2/1989 | Bastian ................................ 52/282.2 |
| 4,936,068 | 6/1990 | Schönfeld et al. ................... 52/282.2 |
| 5,003,741 | 4/1991 | Yeh ................................... 312/265.1 X |
| 5,102,254 | 4/1992 | Yeh ...................................... 403/174 |
| 5,265,972 | 11/1993 | Bahr .................................... 403/252 |
| 5,356,234 | 10/1994 | Vangsol ............................... 403/170 |
| 5,529,423 | 6/1996 | Burke et al. ...................... 52/282.2 X |

FOREIGN PATENT DOCUMENTS

| 1130359 | 8/1982 | Canada ................................ 312/265.1 |
| 223496 | 6/1987 | European Pat. Off. ............ 312/265.4 |
| 592825 | 4/1994 | European Pat. Off. ............... 108/144 |
| 2531121 | 2/1984 | France ................................ 248/245.1 |
| 1490768 | 6/1969 | Germany ............................ 312/265.5 |
| 2436439 | 2/1976 | Germany ............................ 312/265.5 |
| 3331173 | 3/1985 | Germany ............................ 312/265.5 |
| 3405862 | 8/1985 | Germany ............................... 108/180 |
| 2061092 | 5/1981 | United Kingdom ................... 312/111 |
| 2156206 | 10/1985 | United Kingdom ................... 108/153 |

*Primary Examiner*—Peter M. Cuomo
*Assistant Examiner*—Rodney B. White
*Attorney, Agent, or Firm*—Fitzpatrick, Cella, Harper & Scinto

[57] ABSTRACT

A modular storage and support assembly uses a platform system that includes vertically disposed support posts. The support post has an extended tubular body and a plurality of symmetrically spaced, radially extending flanges running the length of the tubular body. Each flange has a first portion extending radially from the post and a second portion at the terminal end of the first portion. A slot is defined between each pair of adjacent flanges for receiving vertical panels or other inserts.

27 Claims, 49 Drawing Sheets

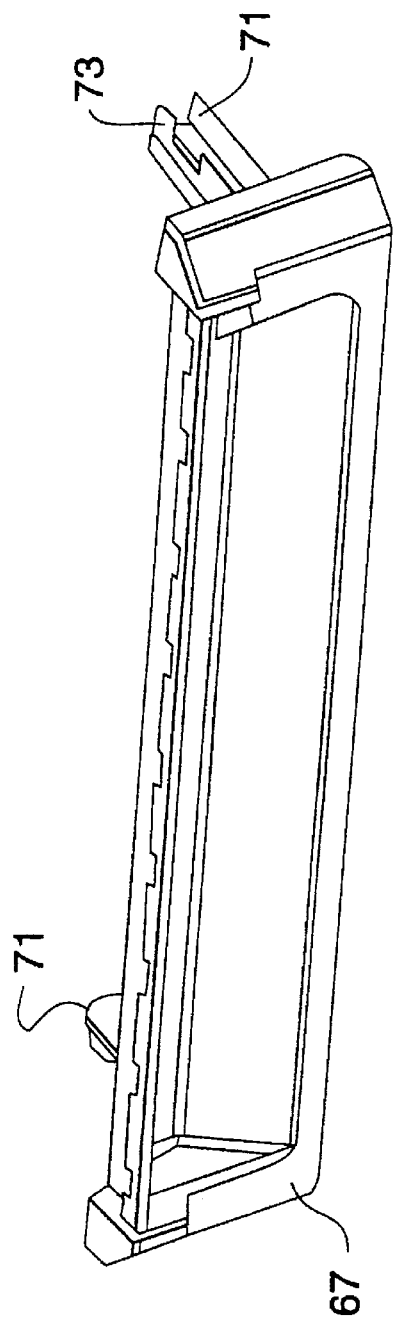
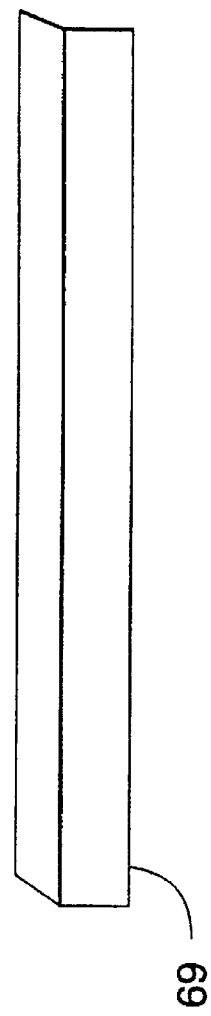
FIG. 14A
FIG. 14B

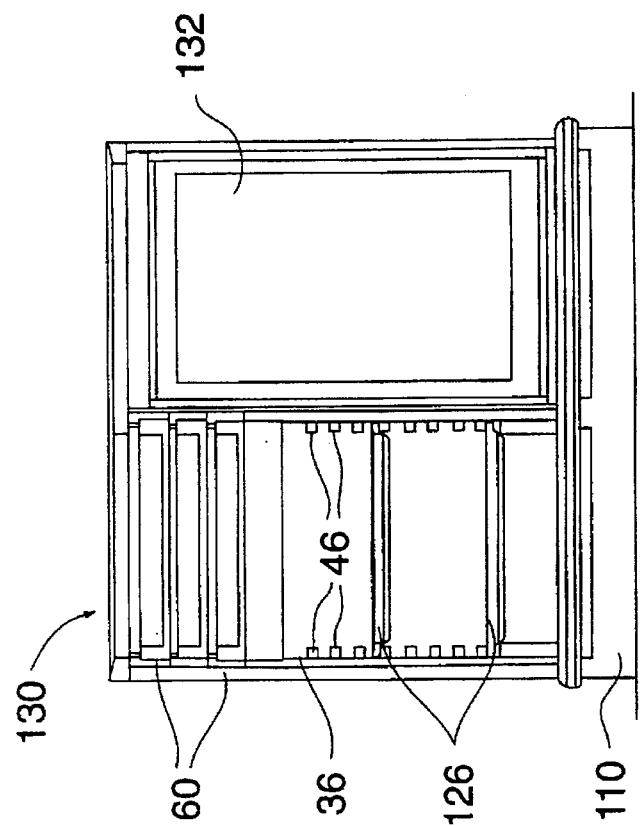
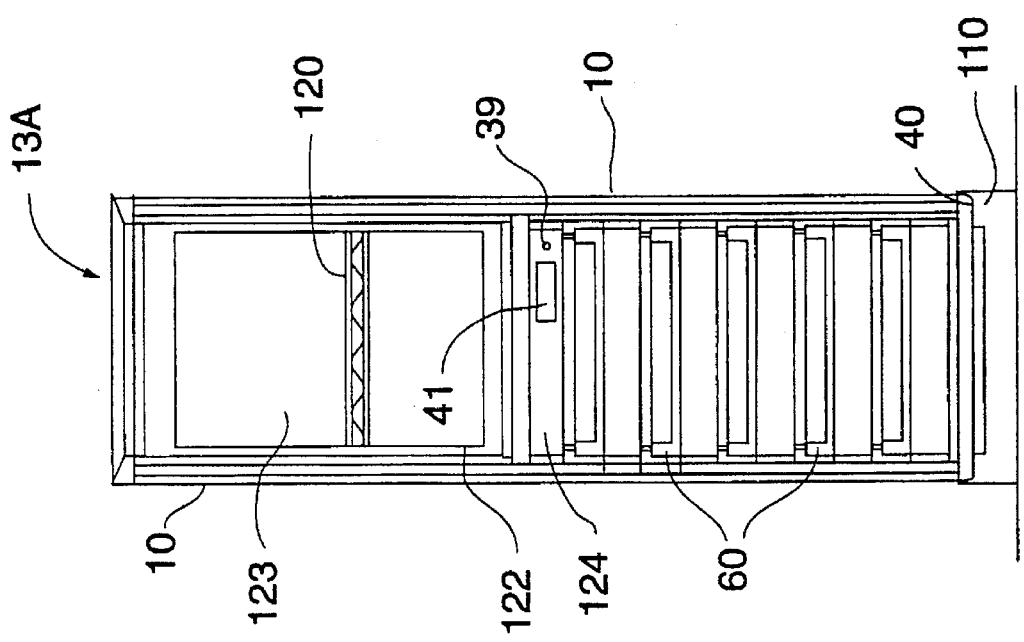

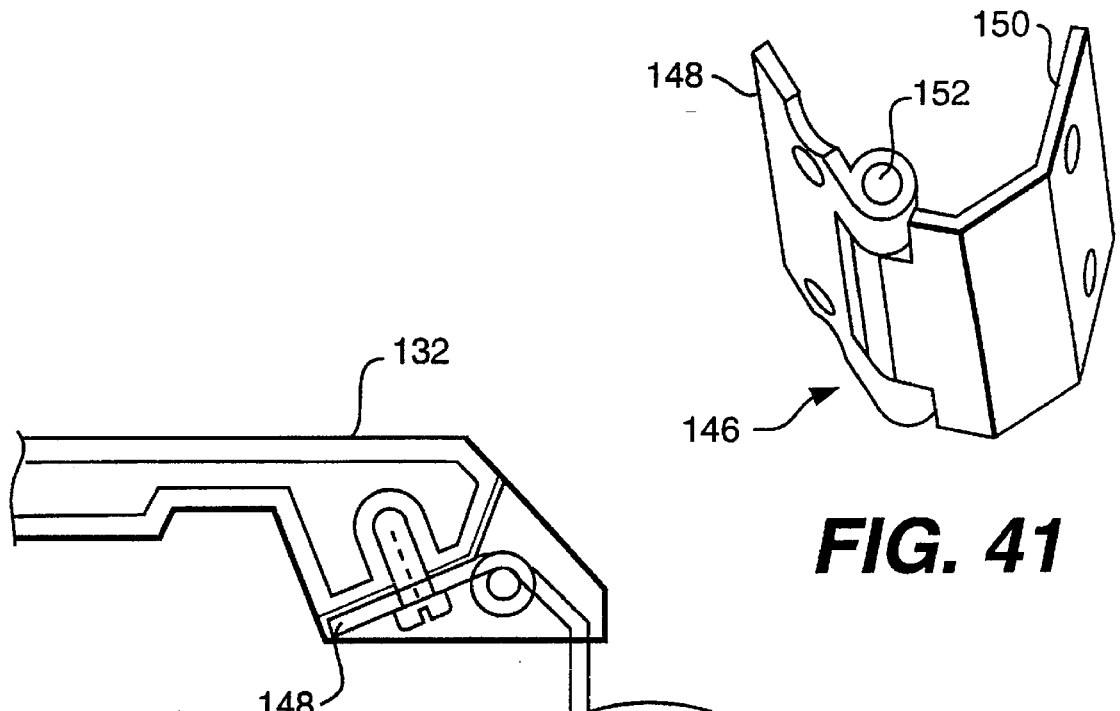
FIG. 41
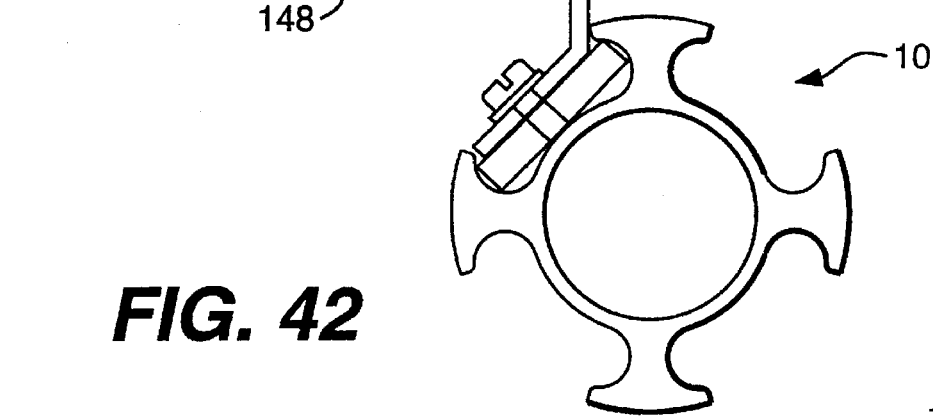
FIG. 42
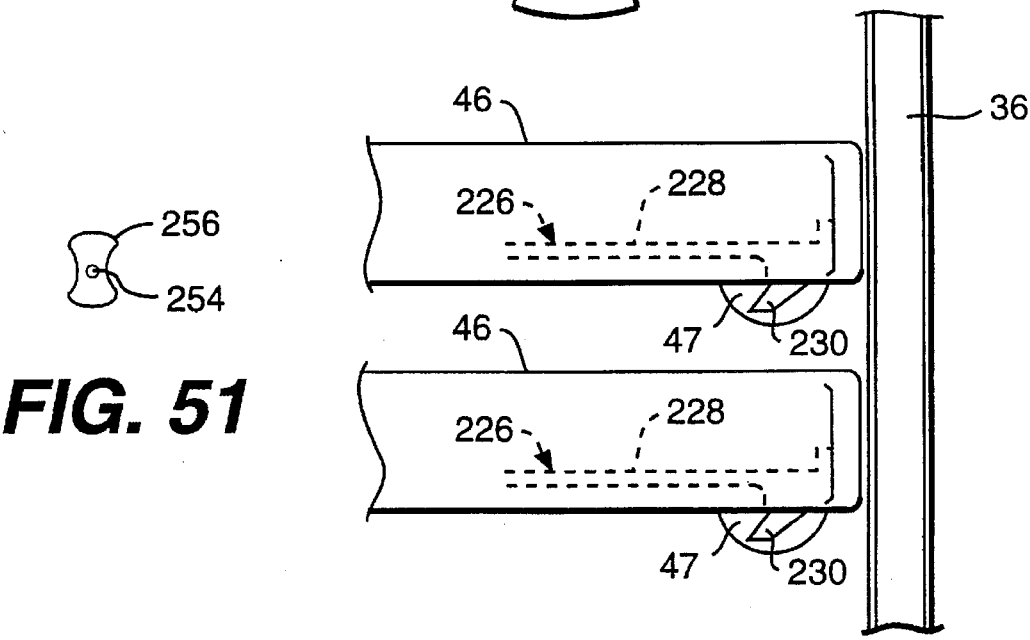
FIG. 51
FIG. 50

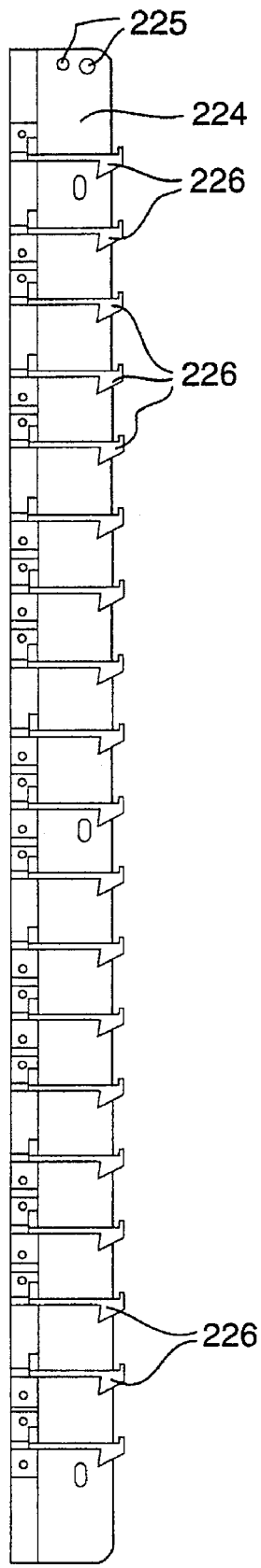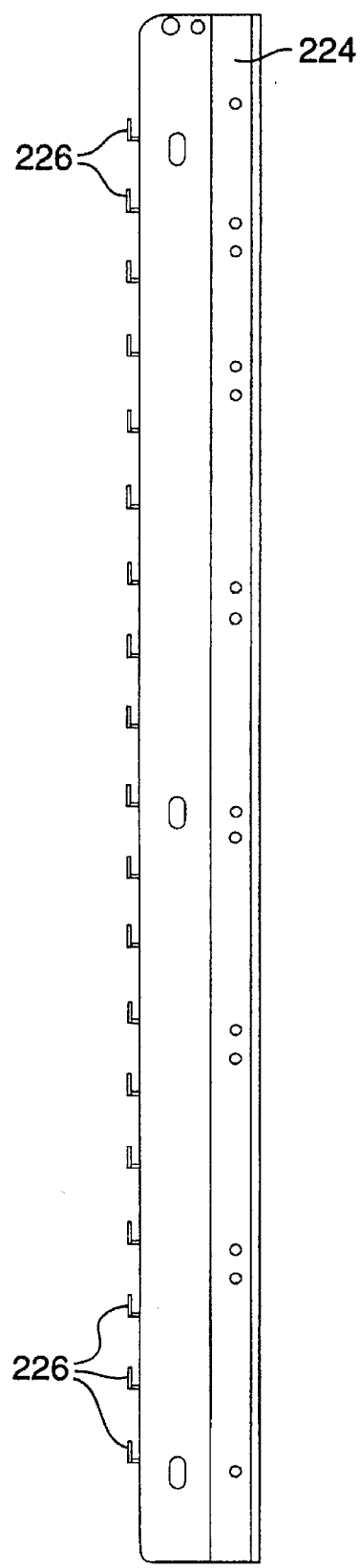
FIG. 46A     FIG. 46B

MODULAR STORAGE AND SUPPORT ASSEMBLY

BACKGROUND OF THE INVENTION

1. Field of the Invention

This invention relates generally to a modular storage and support assembly, and more particularly to a platform system featuring vertically disposed support posts each having a plurality of radially extending flanges. The support posts serve as the basic frame component in both open and enclosed structures that comprise the modular storage and support assembly.

By providing a sturdy and space-efficient modular storage and support assembly which can be customized to fit the end-user's needs, the subject invention will find use in a variety of commercial, industrial and residential applications.

2. Description of the Prior Art

Storage and support assemblies for use in, for example, open structures such as shelving systems or enclosed structures such as carts or cabinets are well known in the art. In open structures, shelving systems typically use four cylindrical support posts designed to support one or more horizontal shelves. Conventional enclosed structures, on the other hand, usually provide three or four-sided assemblies supported on a base platform that can be mobile (for carts) or stationary (for cabinets). The sides can be formed of panels designed to be secured to each other or secured to vertical frame members such as posts.

One type of known modular shelving system is disclosed in U.S. Pat. No. 3,424,111 (Maslow) and No. 3,523,508 (Maslow), which are assigned to the assignee of the subject invention. The adjustable shelving system disclosed in these patents has achieved great commercial success under assignee's trademark SUPER ERECTA SHELF. The platform, or basic frame, for this shelving system is a cylindrical support post provided with a plurality of equally spaced, annular grooves on its outer surface. A basic shelving system uses four support posts to support one or more formed-wire shelves, with each shelf having a frusto-conically-shaped collar at each corner for receiving a support post. A two-piece interlocking sleeve fits around the support post. The sleeve features a rib on its interior surface for engaging one of the grooves on the support post and has a frusto-conically-shaped outer surface, which is widest at the bottom, designed to complement the shape of the shelf collars. The support posts fitted with sleeves are received in the collars of each shelf to assemble the shelving system. When assembled, the weight of the shelf creates a radially-inwardly directed force between the collars and sleeves. This force brings the sleeves into a locking relation with the posts due to a wedging action between the collars and sleeves.

U.S. patent application Ser. No. 08/093,331 discloses a shelving system that uses hanger brackets to permit easy installation and/or removal of one or more shelves without requiring the disassembly of the entire shelving system. This shelving system, known under the trademark QWIKSLOT SHELF, is also assigned to the assignee of the subject invention. The platform of the QWIKSLOT SHELF shelving system uses support posts formed with a plurality of elongated slots at regular vertical intervals for receiving the hanger brackets. The slotted support post can also have annular grooves as discussed above in the SUPER ERECTA SHELF shelving system. A notch in each hanger bracket receives a truncated corner of a shelf.

In one type of enclosed structure known as the METROFLEX cart, which is assigned to assignee of the subject invention, interlocking molded panels are used without the need for vertical support posts. In that regard, two side/bottom panels are joined together to form the lateral sides and bottom of the cart and a back panel is secured to the side/bottom panels. A top portion is added to complete a 3-sided enclosed cart. The open side can receive an array of differently sized drawers and bins, and shelves or other accessories can be provided on the outer sides of the cart. For mobility, the cart can be provided with casters or, alternatively, set on a base platform provided with casters. The METROFLEX Cart is the subject of U.S. Pat. No. 5,016,948 and No. D 323,915.

Prior art FIG. 1 shows another type of platform system intended for use in both open and enclosed structures. This platform features extruded aluminum strut profiles for use in a modular framing system. As shown in FIG. 1, the strut profile 1 has a center post 3 of a substantially square cross-section and a flange 5 extending radially from each corner. A T-shaped slot 7 is defined between each adjacent pair of flanges. As shown in the figure, each flange is formed to have a right angle and includes a double wall design. The strut profile is part of a framing system that uses standardized components. The rectilinear design of the strut profile is intended to provide maximum utility, as it is disposed in both vertical and horizontal positions in the framing system.

However, further improvements in storage and support assemblies are desired. More specifically, it would be desirable to provide a platform system with flanged support posts uniquely capable of use in both open and enclosed structures.

SUMMARY OF THE INVENTION

It is one object of the invention to provide a platform system for use in a modular storage and support assembly.

Accordingly, it is an object of the present invention to provide a platform system that features flanged support posts for use in the modular storage and support assembly.

In accordance with one aspect of the invention, a support post is comprised of an elongated tubular post and a plurality of spaced flanges extending radially from the post and running in a longitudinal direction along the post. Each flange includes a first portion extending radially from the post and a second portion extending from a terminal end of the first portion.

In accordance with another aspect of the invention, a support post comprises an elongated post having an outer circumference and a longitudinal axis, and a plurality of symmetrically spaced, elongated flanges extending radially from the post. Each pair of adjacent flanges defines an elongated, substantially T-shaped slot having rounded opposite ends and an arcuate side.

In accordance with yet another aspect of the invention, a support post comprises an elongated tubular post with an exterior wall defining a first circumference and having a longitudinal axis, and a plurality of symmetrically-spaced, elongated flanges extending radially from the post and running in the longitudinal direction of the post. In accordance with the invention, the flanges define a second circumference concentric with the first circumference.

It is another object of the invention to provide enclosed structures, such as carts and cabinets, utilizing the support posts.

It is yet another object of the invention to provide side panels for cooperating with the support posts to form the enclosed structure.

In accordance with another aspect of the invention, a platform system comprises a plurality of support posts, with each support post having an elongated interior post and a plurality of spaced flanges extending radially from each post and running in a longitudinal direction along the post. Each flange has a first portion extending radially from the post and a second arcuate portion extending from a terminal end of the first portion. In addition, each adjacent pair of flanges defines an elongated slot, and a plurality of panels are secured between the support posts. Each panel includes first and second lateral ends formed to be received in an elongated slot in the support post.

In accordance with another aspect of the invention, each panel includes a lateral axis extending between two support posts supporting the panel, and each lateral end includes a lateral axis, a longitudinal axis and a first axis orthogonal to the lateral and longitudinal axes, with the first axis being transverse to the lateral axis of the panel.

It is still another object of the invention to provide an open architecture type of drawer for use with the enclosed structure.

In accordance with this aspect of the invention, a drawer comprises a drawer frame having a back panel, first and second side panels and a front panel secured together to form an open, bottomless frame, and a drawer insert having a plurality of vertical walls and a bottom surface. The drawer insert includes support means for supporting the drawer insert within the drawer frame. The front panel includes a handle section with a first height and, when the depth of the drawer insert is larger than the first height of the handle section, a first blank section is secured to the handle section to increase the total height of the front panel to at least equal the depth of the drawer insert.

It is yet another object of the invention to provide utility cabinets, or side pods, for swing-out attachment to the carts or cabinets or for individual use.

In accordance with this aspect of the invention, a utility cabinet includes a rear panel and first and second side panels secured to opposite ends of the rear panel to form a three-sided enclosure with an open front side. The side panels have molded interior surfaces, with each interior surface having a molded section including an arcuate slot and a front notch.

It is still another object of the invention to provide a door asymmetrical about its vertical axis for use with the enclosed structure.

In accordance with this aspect of the invention, a platform system includes a hinged door secured to one of the support posts for closing an open side of the enclosed structure. The hinged door has hinge notches on one edge and at least top and bottom handles.

Another aspect of the invention relates to hinge means for securing the door to one of the support posts. The hinge means includes a mounting plate disposed in an elongated slot in the support post and secured by set screws for forcing the mounting plate against a back side of the flanges.

It is another object of the present invention to provide a security system for use with the enclosed structure to lock and secure the drawers. The security system will also allow an open drawer to be closed and locked after a locking mechanism is actuated.

In accordance with another aspect of the invention, a security system is provided for an enclosed structure having at least two sides and a corrugated interior surface. The security system comprises a locking bar disposed in one of the sides, a plurality of locking fingers secured to the locking bar and housed within the corrugated interior surface, and actuating means for actuating the locking bar between a locked position and an unlocked position. In the locked position the locking fingers extend out of the corrugated interior surface.

It is still another object of the invention to provide an electric controller for electronically controlling the security system and an overriding mechanical controller for controlling the security system.

In accordance with this aspect of the invention, a control system is provided for use with an enclosed structure including (a) at least one drawer and (b) an electrically-controlled locking mechanism for locking the drawer in the enclosed structure. The control system includes input means for inputting information, memory means for storing valid user codes for access to the drawer, and control means for controlling the locking mechanism in accordance with user input from the input means. The control means includes (a) means for validating a user code entered at the input means against valid user codes stored in the memory means and for producing a validation result and (b) means for unlocking the drawer in accordance with the validation result.

It is another object of the invention to provide support posts capable of supporting horizontally disposed elements, such as shelving, in an open structure.

It is yet another object of the invention to provide support posts capable of use with tapered sleeves, mounting brackets and other shelf supporting accessories.

These and other objects, aspects, features and advantages of the present invention will become apparent from the following detailed description of the preferred embodiments taken in conjunction with the accompanying drawings.

BRIEF DESCRIPTION OF THE DRAWINGS

FIGS. 14A and 14B are perspective views of front panel parts of the drawer frame in accordance with the present invention;

FIG. 34 is a front view of a tall cabinet in accordance with the present invention;

FIG. 36 is a front view of a double wide enclosed structure in accordance with the present invention;

FIG. 41 is an isometric view of one type of door hinge in accordance with the present invention;

FIG. 42 is a top view of the door hinge securing a door to the support post in accordance with the present invention;

FIGS. 46A and 46B are front and rear views, respectively, of a locking bar in accordance with the present invention;

FIG. 50 is a partial front elevational view of the corrugated interior panel in accordance with the present invention;

FIG. 51 is a front elevational view of a cam gear in accordance with the present invention;

DESCRIPTION OF THE PREFERRED EMBODIMENTS

Figure 1:
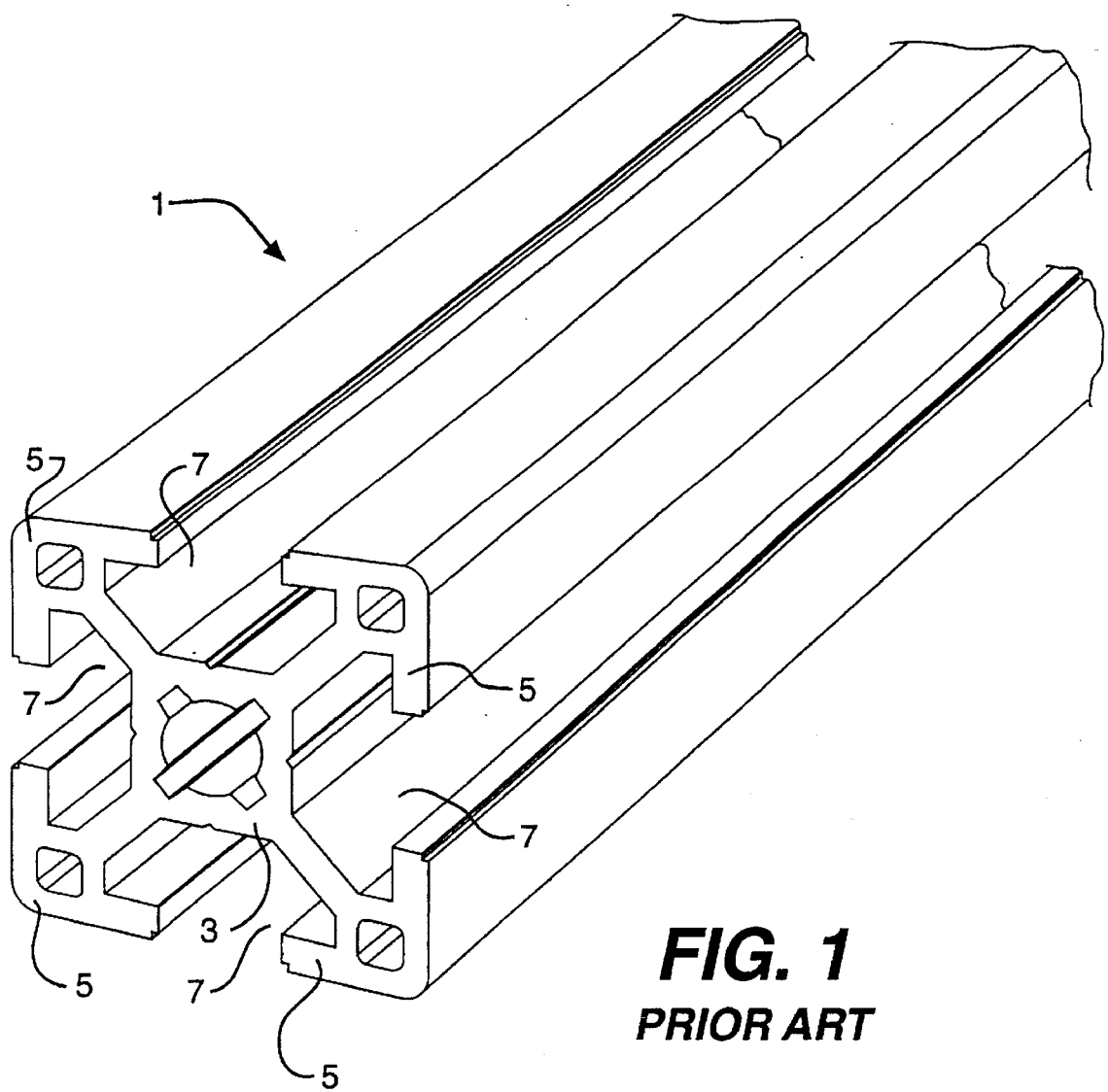
FIG. 1 is a perspective view of a conventional strut profile.
Figure 2:
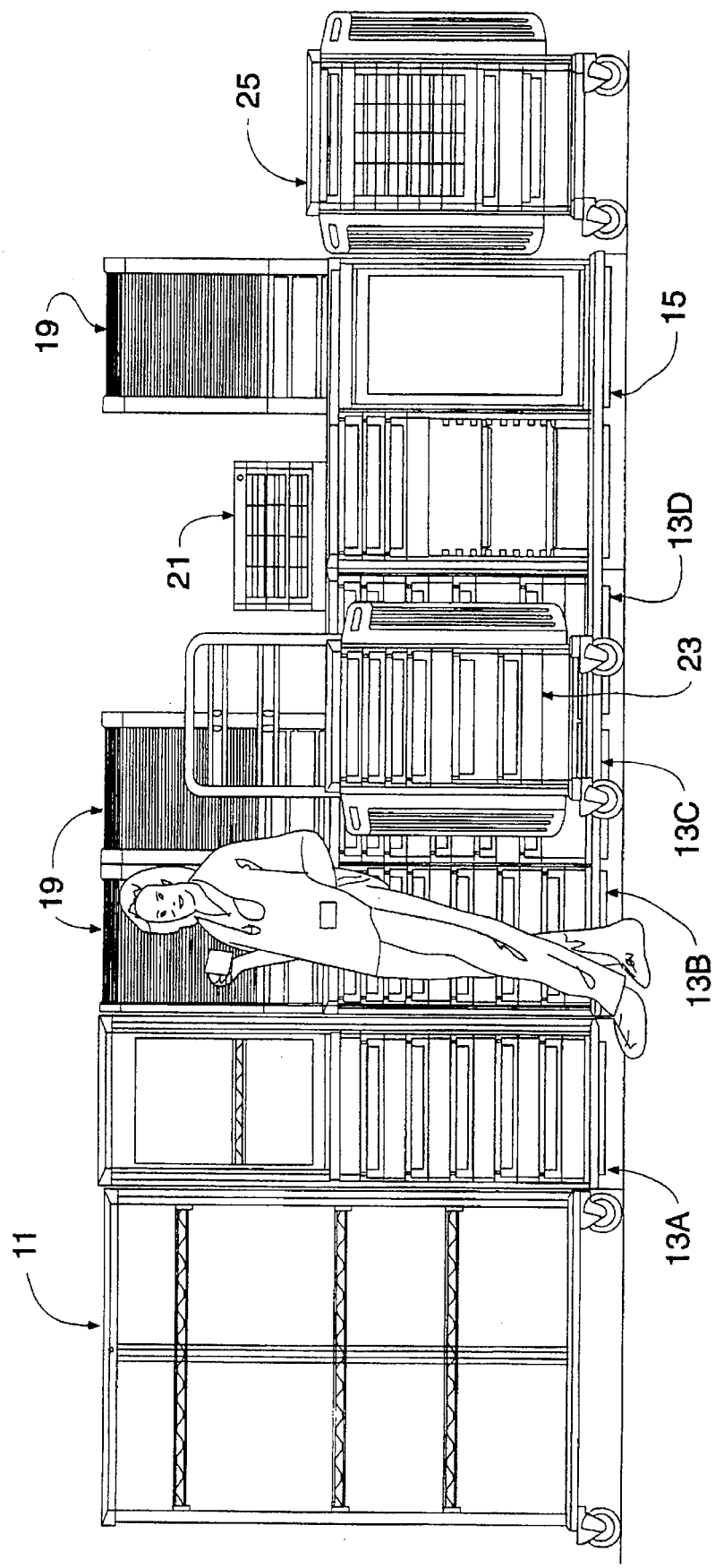
FIG. 2 is a pictorial illustration of a modular storage and support assembly utilizing a platform system in accordance with the subject invention.

FIG. 2 provides an overall view of a modular storage and support assembly based on the platform system of the subject invention. As will be appreciated from the following disclosure, the platform system featuring the flanged support posts can be used to construct a wide array of both open and enclosed structures. These structures can be combined in a virtually unlimited number of combinations to custom design a modular storage and support assembly.

From left to right in FIG. 2, the modular support assembly features a double-wide active level storage system 11, a tall cabinet 13A, three drawer-filled cabinets 13B, 13C and 13D, and a double-wide cabinet 15 fitted with a door. The tall cabinet includes an array of drawers and, on the top half, a shelf enclosed behind a clear panelled door. Sitting on top of the cabinets are overhead cabinets 19 and a 3-level cassette assembly 21. In front of the cabinets is a mobile cart 23 equipped with side pods, and to the right of the double-wide cabinet is a unit dose cart 25, which also includes side pods. The unit dose cart, which is similar in many respects to the mobile cart but is provided with a multi-level cassette assembly, and the shelving assembly are subjects of separate copending applications filed concurrently herewith.

The modular storage and support system illustrated in FIG. 2 is ideally suited for use in hospitals and other health care facilities. It will be appreciated, however, that the modular storage and support system of the subject invention will find use in many other commercial applications, such as hotels and restaurants, as well as in industrial and residential settings.

The overall dimensions of each component comprising the modular storage and support assembly is a matter of design choice, although for manufacturing and assembly purposes a limited number of standard heights is preferred. As an example, in FIG. 2 the mobile cart 23 and unit dose cart 25 have heights of 39" and 42", respectively. Also, the height of the tall cabinet 13A is 72".

Figure 3:
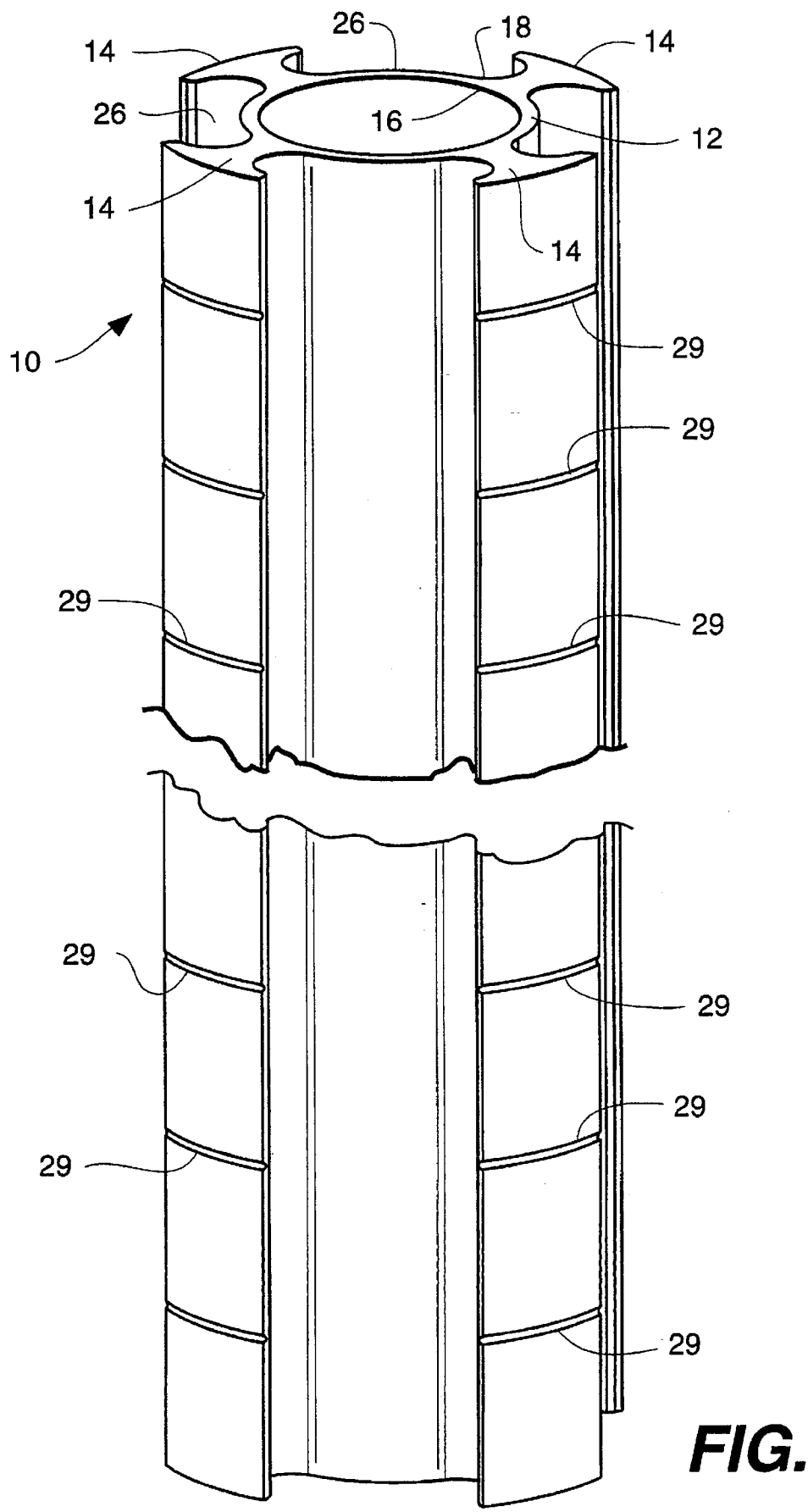
FIG. 3 is a perspective view of a support post in accordance with the present invention.
Figure 4:
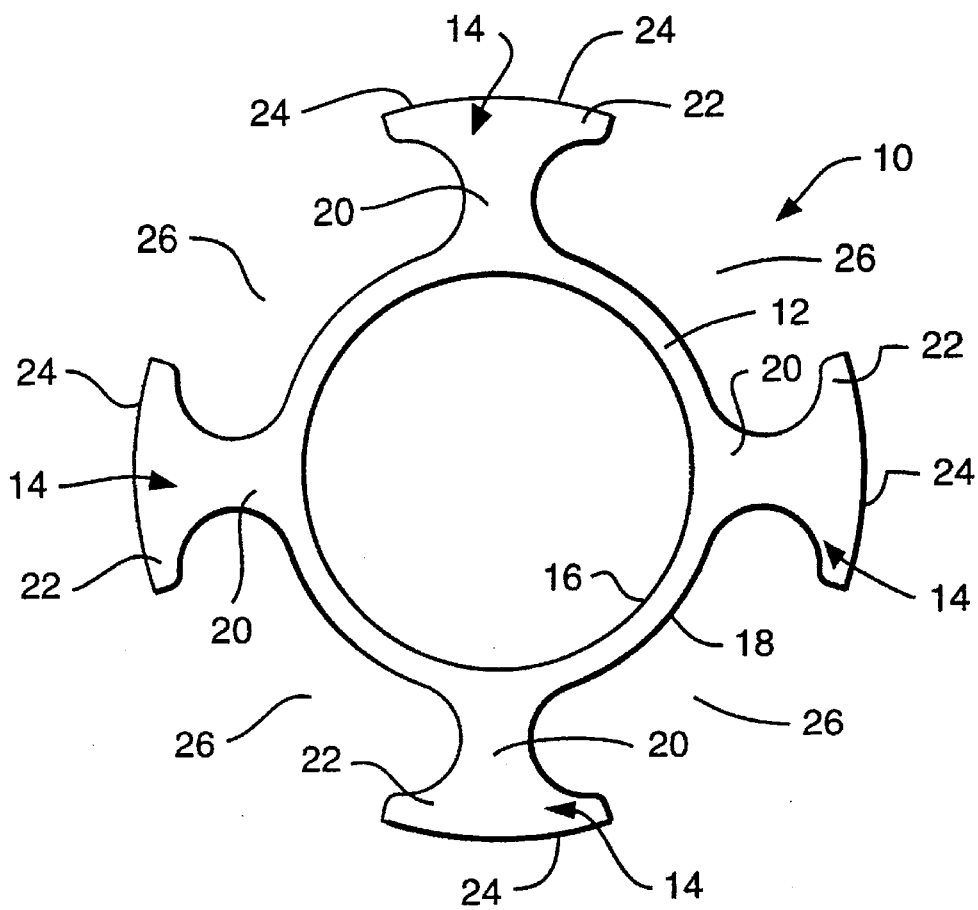
FIG. 4 is a top plan view of the support post shown in FIG. 3 in accordance with the present invention.
Figure 5:
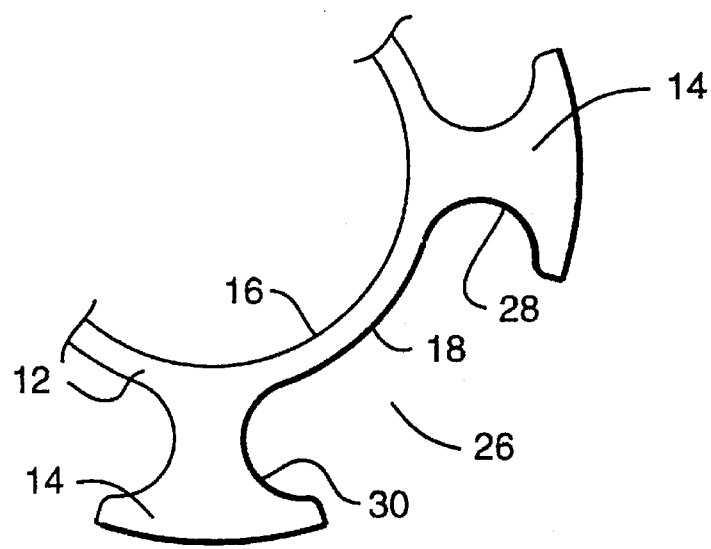
FIG. 5 is a fragmented partial view of FIG. 4, isolating a slot in the support post in accordance with the present invention.

A support post 10 in accordance with the subject invention is illustrated in FIGS. 3, 4 and 5. The support post 10 is generally comprised of an interior post 12 and a plurality of radially extending, equally spaced flanges 14. The post is designed to be vertically disposed in normal use and can be supported at its lower end by a base platform, a foot, a caster, etc. In a single-wide platform, discussed in more detail below, preferably four support posts are used together to provide corner supports for an enclosed structure such as a cabinet or cart or an open structure such as a shelving assembly.

The interior post 12 is preferably tubular in shape, with a circular cross-section and interior 16 and exterior 18 concentric wall surfaces as best seen in FIGS. 3 and 4. The flanges 14 preferably extend along the entire longitudinal length of the interior post. In addition, the flanges and interior post are preferably formed by conventional extrusion techniques to form an integral structure made of, for example, aluminum. However, other comparable means, e.g., pultrusion, roll-formed steel, could be used to form the support post in accordance with the subject invention.

The flanges 14, or dovetails, are preferably spaced equidistant from each other around the periphery of the interior post 12 to create a symmetrical support post. Thus, four flanges would be spaced at 90° intervals around the post. Although using four flanges is preferred because of the versatility such an arrangement provides, the number of flanges is arbitrary and can vary without departing from the scope of the invention. With reference to FIG. 4, each flange has a first portion 20 which extends radially from the interior post 12. At the terminal end of each first portion is a transversely-disposed second portion 22. The second portions are formed with arcuate outer surfaces 24, that together outline a circumference that is concentric with the interior 16 and exterior 18 wall surfaces of the interior post 12. Referring to FIG. 3, the outer surfaces 24 of each flange are formed with a series of equally spaced circumferential grooves 29. The vertically-spaced grooves are desirably provided along the entire longitudinal length of the flanges. In one embodiment, the outside diameter of the support post, as defined by the arcuate outer surfaces 24, is 1.625" and the inside diameter is 0.875".

A slot 26 is formed between each pair of adjacent flanges 14. Because of the arcuate shapes of the outer wall surface 18 and the flanges, the slots can be described as substantially concave T-shaped, with respect to a longitudinal axis of the support post. With reference to FIG. 5, each slot is shaped to have concave-shaped opposite end surfaces 28 and 30. The outer wall 18 forms a convex interior surface of the slot. The contour of the end surfaces and outer wall form a slot that is simple in design but provides maximum flexibility and support. In addition, the curved single-wall design of the flanges makes extrusion easier, is readily cleanable and allows the support posts to be aesthetically integrated into the finished structure as will be discussed in detail below.

Figure 6:
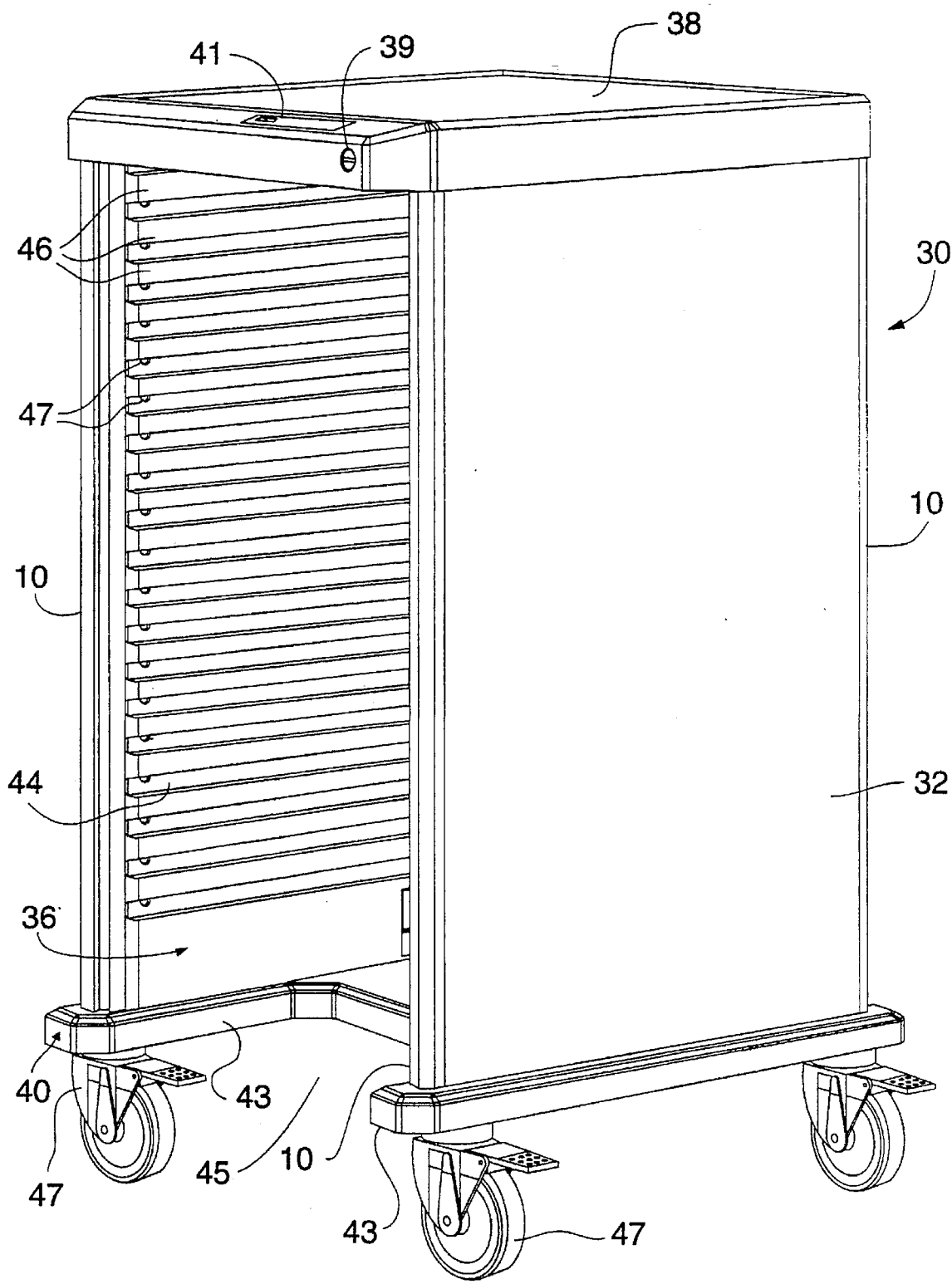
FIG. 6 is a perspective view of a mobile cart in accordance with the present invention.

In one embodiment of the invention, the support posts 10 are used in an enclosed structure such as a cabinet or a cart as shown generally in FIG. 2 and more particularly in FIG. 6.

The enclosed structure 30 in FIG. 6 is a mobile cart built on a single-wide platform constructed of four support posts 10. In this embodiment, the support posts support two exterior side panels 32 and a back panel 34 (unseen in FIG. 6). In addition, interior side panels 36 are disposed side-by-side adjacent to the exterior side panels 32. Top and bottom platforms 38 and 40, respectively, complete the enclosed structure. The top platform houses a mechanical locking mechanism 39 and an electronic controller 41, both used for operating a security system that will be described in detail below. The completed structure forms a 3-sided enclosed frame, with the front side, or fourth side, open to receive an array of drawers, shelves, etc., as discussed in detail below.

Each interior side panel includes a corrugated interior surface 44 with an array of corrugations 46 adapted to receive and support drawers, shelves or other accessories. The horizontal corrugations are uniformly spaced in the vertical direction. Small, semicircular openings 47 can be seen in the lateral front face of the interior side panel immediately below the end of each corrugation. The openings extend to the underside of each corrugation but cannot be seen in this view. The openings allow locking fingers, which will be positioned in each corrugations as discussed below, to move in and out of the corrugations as part of the security system that will be discussed below. Openings can also be provided along the right-hand side of the interior panel 36 for the same purpose.

The top and bottom platforms 38 and 40 are preferably formed of a metal frame fitted with a plastic cover. As shown in FIG. 6, the top platform has a substantially rectangular shape for fitting over the four support posts 10. The bottom platform 40 is preferably designed, at least in a single-wide platform, to have a "C"-shape formed to have two extending legs 43 defining an open front portion 45 therebetween. By cutting out the front center portion of the bottom platform, the overall appearance of the cart is enhanced, especially when drawers or other accessories are not disposed in the lower part of the cart.

Both top and bottom platforms can be secured to the support posts by using threaded plugs (unshown) that are force-fitted, for example, in opposite ends of each support post and threaded fastening means fed through the top and bottom platforms and into the plugs. In assembling the enclosed structure, each support post is positioned on the base platform fitted with its cover, and a threaded bolt or other fastener is inserted through a hole in the platform from the underside and into engagement with the threaded plug. The side panels are then top loaded into the support posts. Threaded fasteners are inserted through the metal frame of the top platform and into the plugs at the top ends of the support posts. Finally, the top cover is fitted over the top platform. Of course, other comparable means for securing the platforms to the support posts could be used. As shown in FIG. 6, the bottom platform can be fitted with casters 47 for mobility.

In the single-wide platform design as discussed above, the enclosed structure preferably has one support post 10 positioned at each of four corners. In this design, the support posts are spaced, for example, 19.8" from center to center. Of course, the spacing of the posts is arbitrary and can be varied to construct different size and shaped structures. A "double-wide" design platform includes, in addition to four corner posts, a rear center post and, depending on the structure, a front center post. In a double-wide enclosed structure, a front center post is preferred, but in a double-wide open structure, such as a shelving assembly, the front center post is normally not used.

Figure 7:
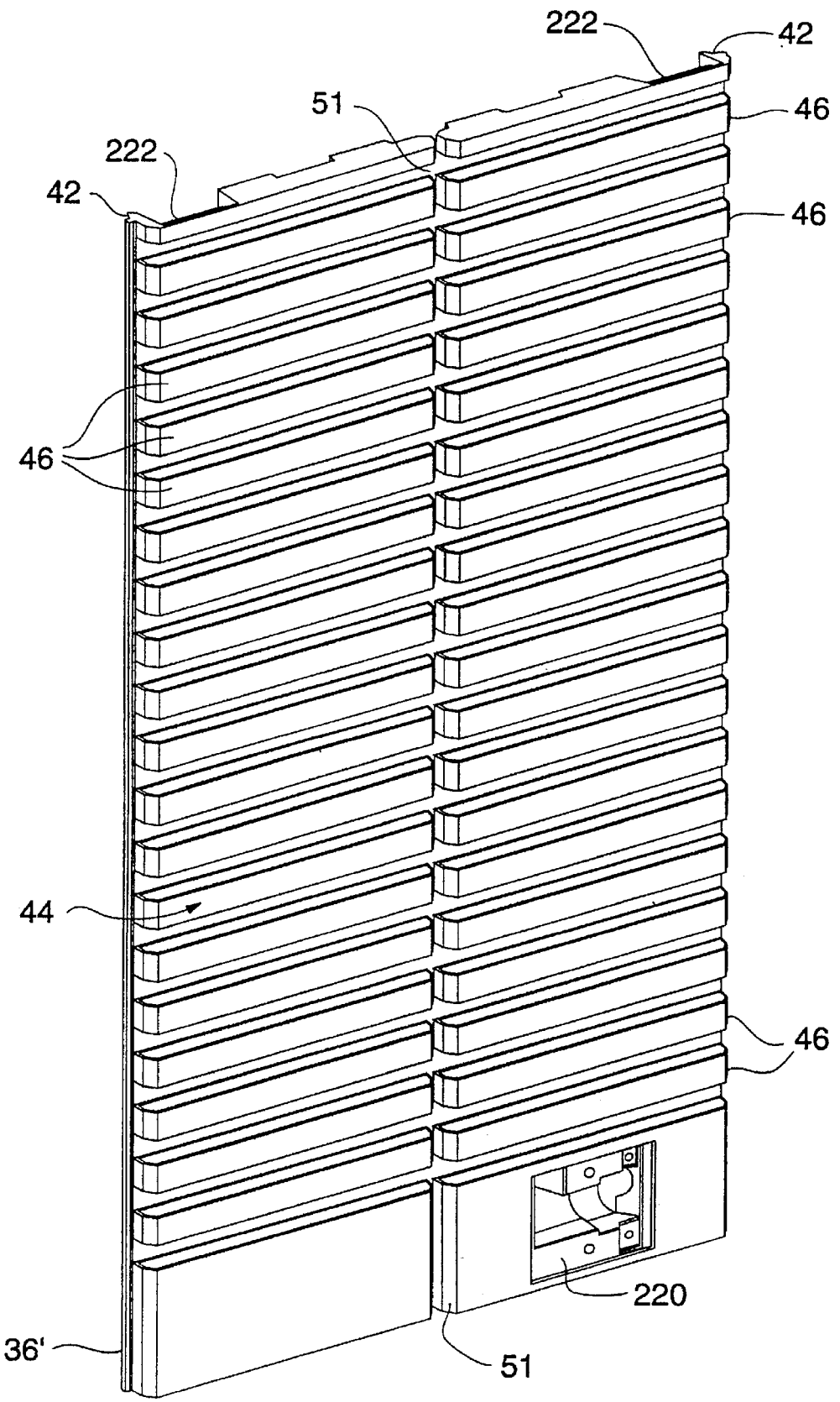
FIG. 7 is a perspective view of a modified interior side panel for use in the mobile cart in accordance with the present invention.

A slightly modified interior side panel 36' is shown in FIG. 7. The modified side panel 36' differs from the side panel 36 only in that each corrugation 46 is formed in two halves to define a dividing slot 51 that runs the vertical length of the side panel. The modified panel can be used in a two-sided enclosed structure, i.e., a dual access cart, whereby the front and back are open to receive, for example, drawers. In a dual access cart, a thin, flat panel (unshown) can be secured in the dividing slot 51 for dividing the interior of the structure in half.

A recessed opening, or pocket, 220 in the lower part of the interior surface 44 and pockets 222 in the back of the interior side panel 36' (and 36) are provided to house various components of the security system. Offset lateral ends, or edges, 42 of the interior panel are received in slots 26 in the support posts as discussed below to secure the side panel.

All of the side panels can be made of a polymer material and are preferably blow molded or formed by other comparable means to form a hollow, two-faced structure. The interior side panels 36 are also compression molded in part as discussed below.

FIGS. 8A, 9A, 9B, 10 and 11 are top views of the support posts 10 engaging side panels in various examples of enclosed structures in accordance with the present invention. As discussed above, the side panels are top-loaded into the slots 26 of the support posts and rest on the bottom platform, or base, 40.

Figure 8A:
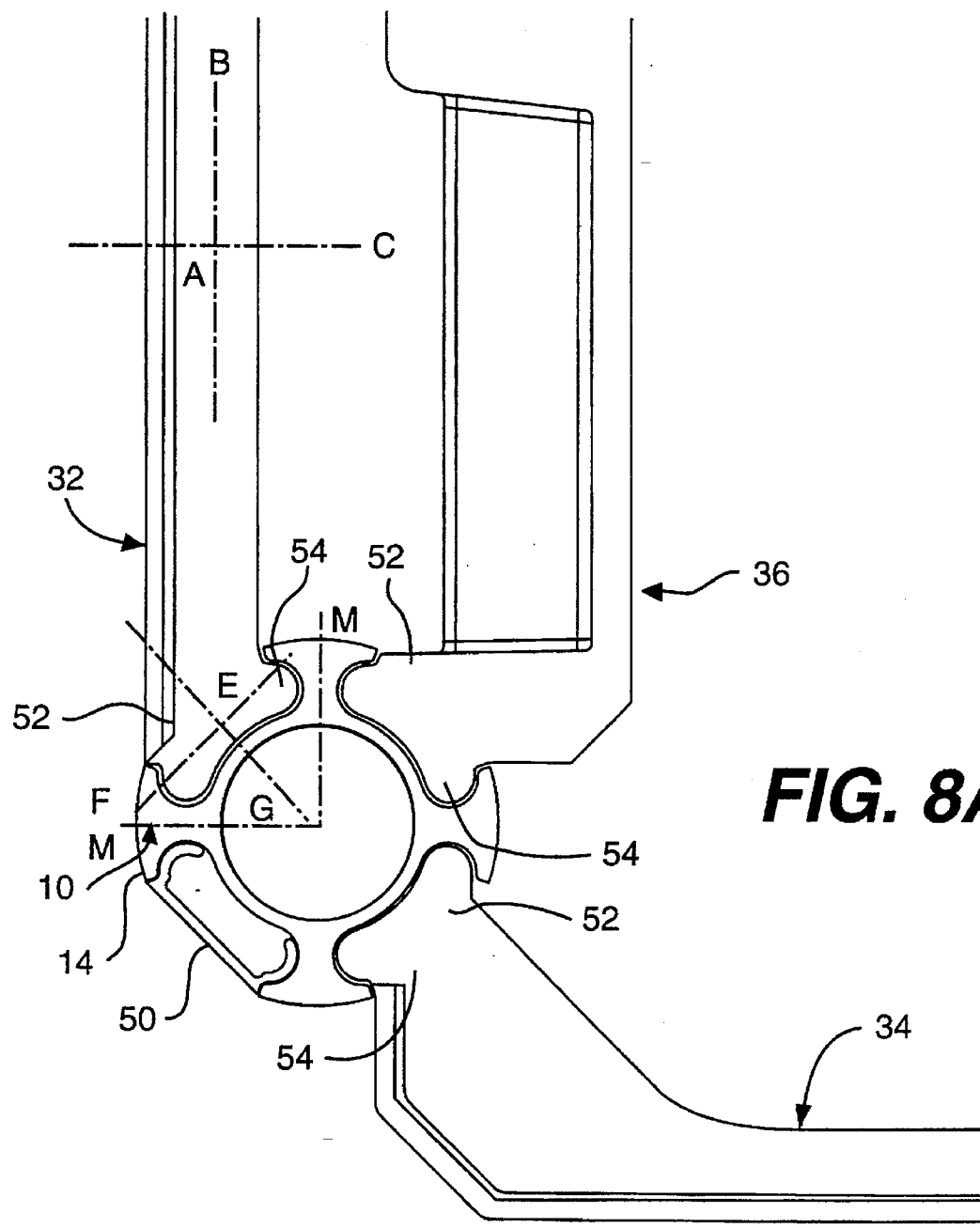
FIG. 8A is a top plan view of a support post in use in a back corner of an enclosed structure in accordance with the present invention.

FIG. 8A is a partial top view of the support post 10 in use as a right rear support (with reference from the front side of the cart). Clockwise in this figure, the support post 10 secures an interior side panel 36, a back side panel 34, a blank extrusion 50 and an exterior side panel 32. The blank extrusion 50 is essentially a linear trim piece of molded plastic, preferably extending the length of the support post, that is inserted into an empty slot 26 for aesthetic purposes, i.e., to provide a finished look to the enclosed structure.

Figure 8B:
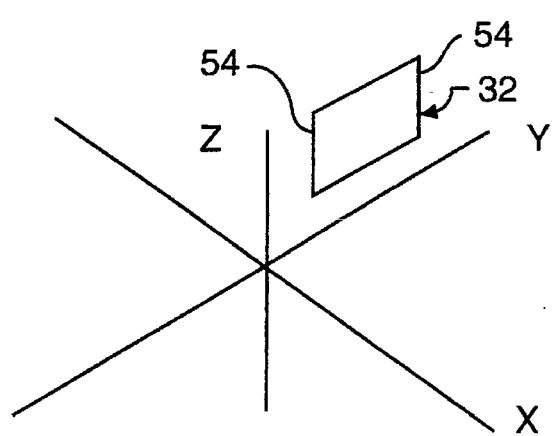
FIG. 8B is a three-axis coordinate system and a schematic view of a side panel in accordance with the present invention.

As FIG. 8A shows, each side panel is shaped to have a neck portion 52 and a head portion 54 forming each lateral end for engagement in the support post. The head portion is shaped to compliment the shape of the slots 26. In addition, each neck portion is offset from its respective panel. Using the exterior side panel 32 in FIG. 8A as an example, and using the coordinate system in FIG. 8B as a reference, the side panel has a longitudinal axis A running in the heightwise direction (in the Z-axis direction), a lateral axis B in the widthwise direction (Y-axis) and an orthogonal axis C representing its depth (X-axis). Axis C is orthogonal to both axes A and B. Likewise, the head portion 54 has its own longitudinal axis E, lateral axis F and orthogonal offset axis G. In accordance with the subject invention, the offset axis G of the head portion is transverse to the lateral axis B of the panel. In this manner, a contour fit is achieved between the panels and the support posts. As will also be appreciated, lateral axes M of the flanges 14 extend in directions either parallel or perpendicular to the lateral axes (axis B) of the panels they secure. This arrangement allows the support posts to be visually integrated into the structure and provide a clean, aesthetically-pleasing appearance.

Figure 9A:
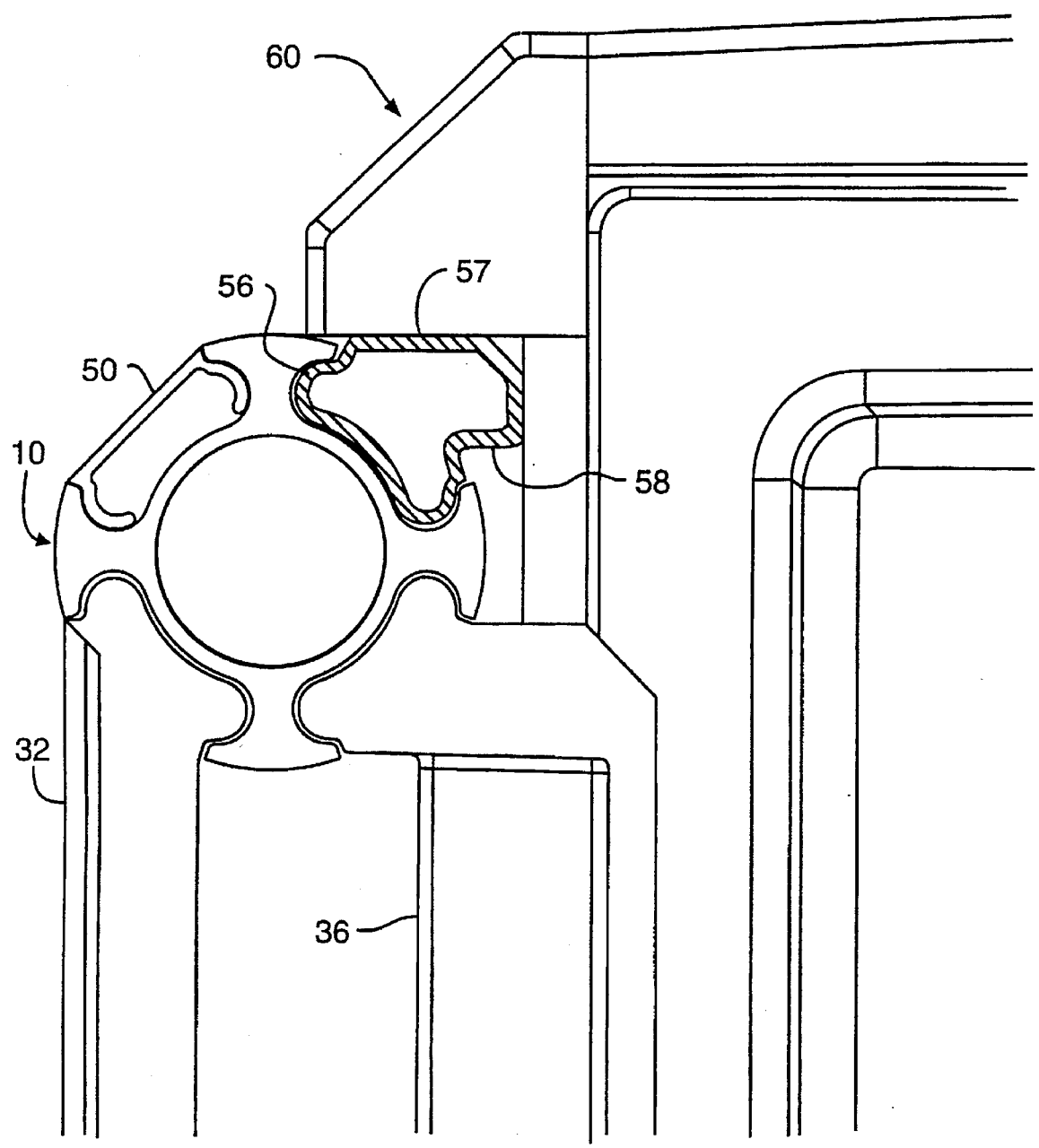
FIG. 9A is a top plan view of a support post in use in a front corner of the enclosed structure in accordance with the present invention.
Figure 9B:
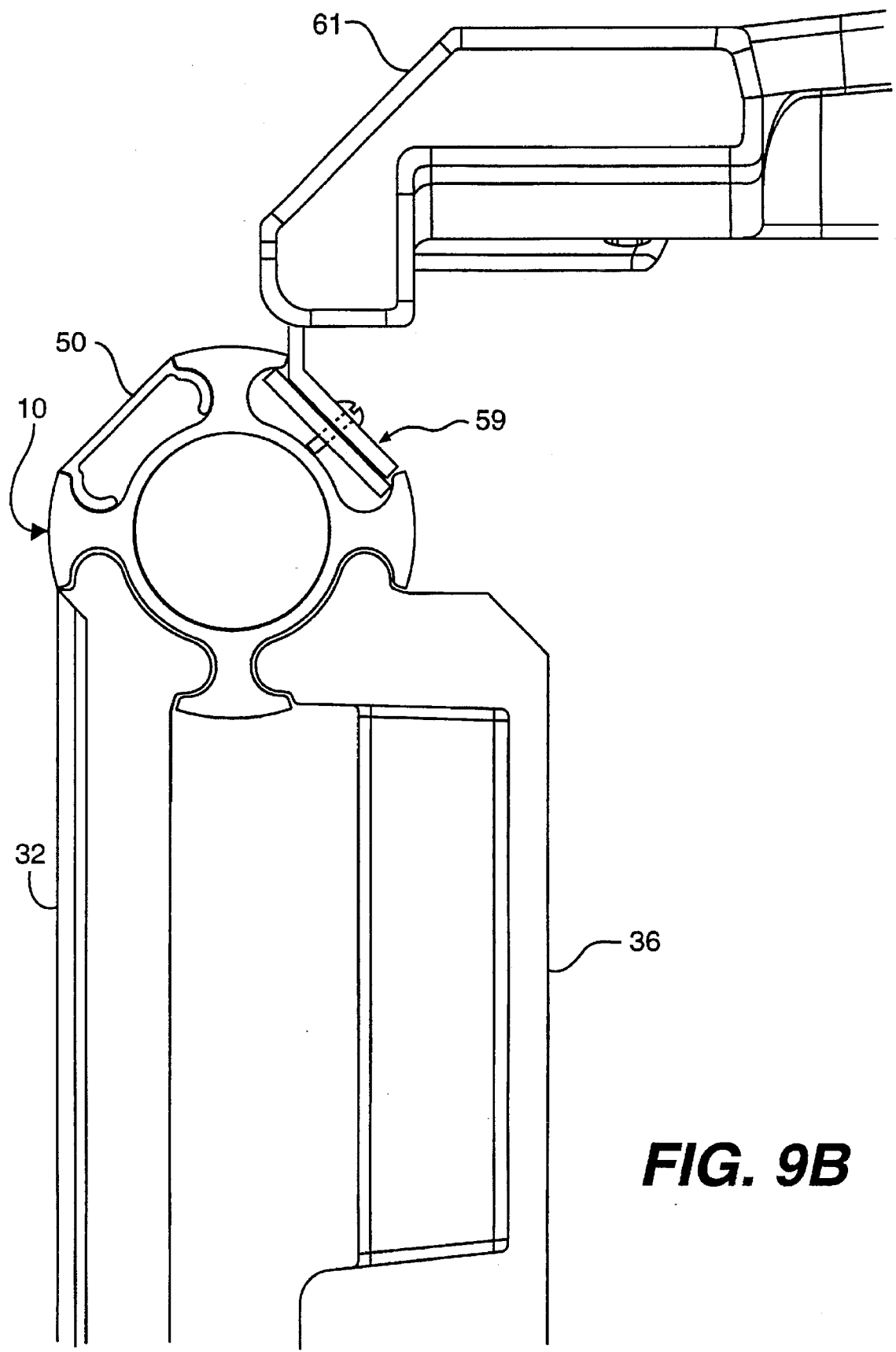
FIG. 9B is a top plan view of a modified front corner of the enclosed structure in accordance with the present invention.

FIGS. 9A and 9B illustrate a support post 10 in use as a right front support in an enclosed structure. In FIG. 9A, the slots 26 in the support post 10 receive an exterior side panel 32, an interior side panel 36 and a blank extrusion 50 in the same manner as described above in FIG. 8A. In the remaining slot is secured a drawer-abutting extrusion 56 for abutting a drawer 60 that is slidably received in the enclosed structure. As discussed in detail below, the drawer is provided with a surface, e.g., one or more ribs, that is slidably supported on the corrugated surface 44 of the interior side panel 36. As shown in FIG. 9A, the drawer-abutting extrusion 56, which is preferably a resilient plastic, includes an abutting face 57 for contacting the fully closed drawer and a locking face 58 for contacting a part of the drawer and preventing it from being accidentally pulled out. Details of the drawer are provided below. FIG. 9B is an alternative arrangement with the drawer-abutting extrusion replaced by a hinge assembly 59 for supporting a door 61. Both the hinge assembly and the door will be discussed in detail below.

Figure 10:
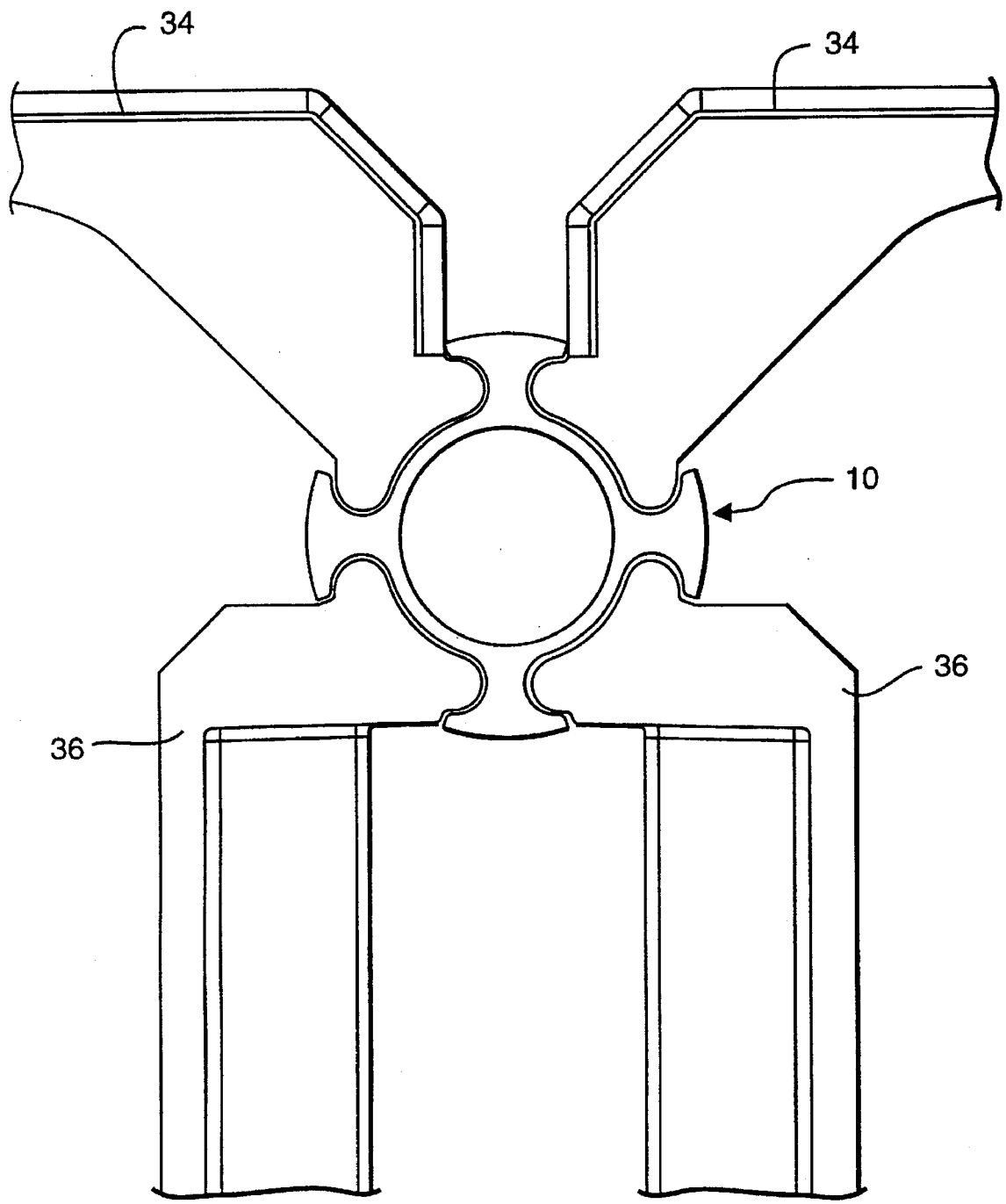
FIG. 10 is a top plan view of a central rear support post in use in a double-wide enclosed structure in accordance with the present invention.
Figure 11:
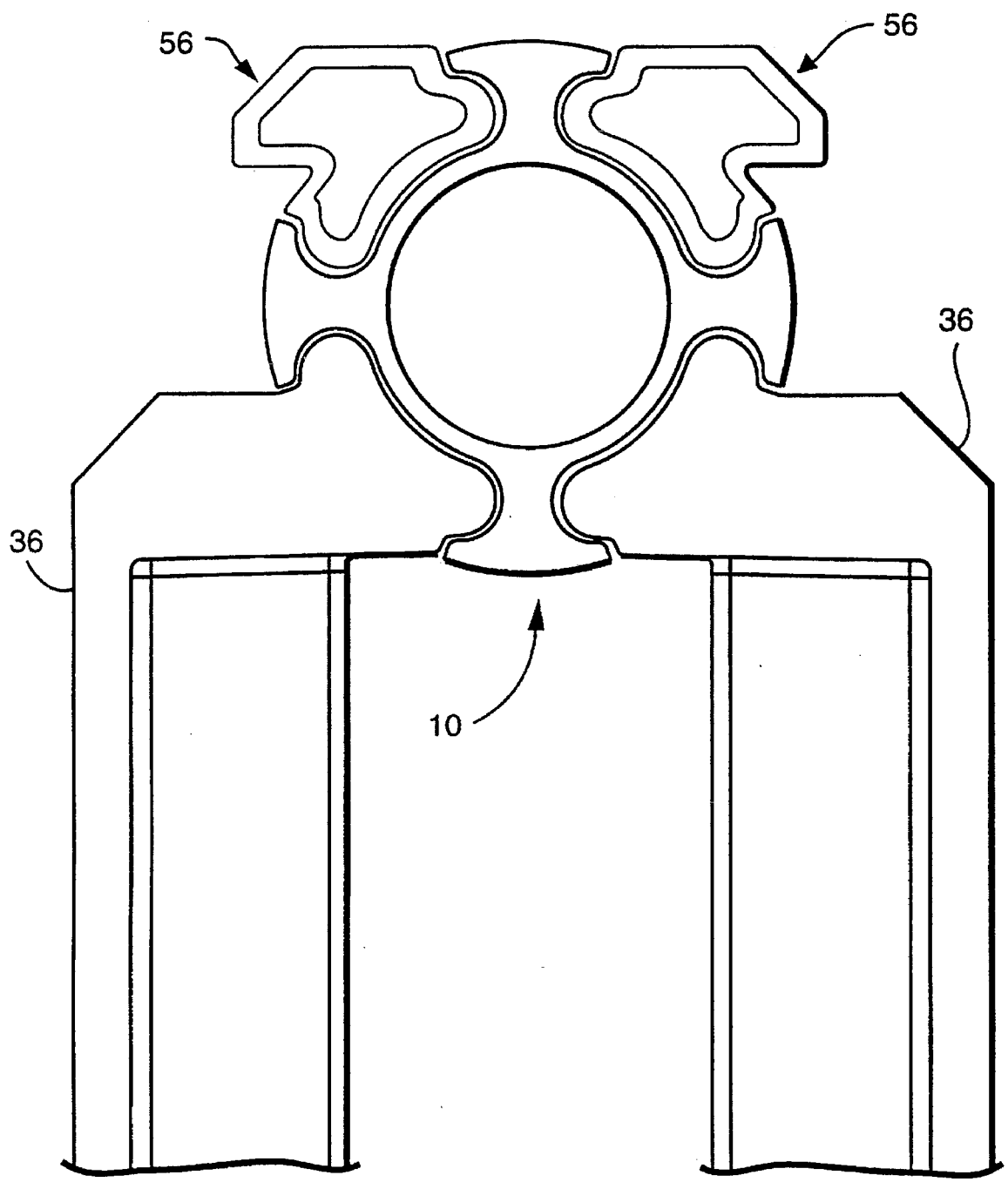
FIG. 11 is a top plan view of a central front support post in use in a double-wide enclosed structure in accordance with the present invention.

FIGS. 10 and 11 are top plan views showing the support post 10 in use in a double-wide enclosed structure. The support post in FIG. 10 is a back center post supporting two back side panels 34 extending in opposite directions and two side-by-side interior lateral side panels 36. FIG. 11 illustrates the support post 10 in a front-center position. Two interior side panels 36 are secured in rearward slots 26 and drawer-abutting extrusions 56 are secured in the frontward slots.

Figure 12:
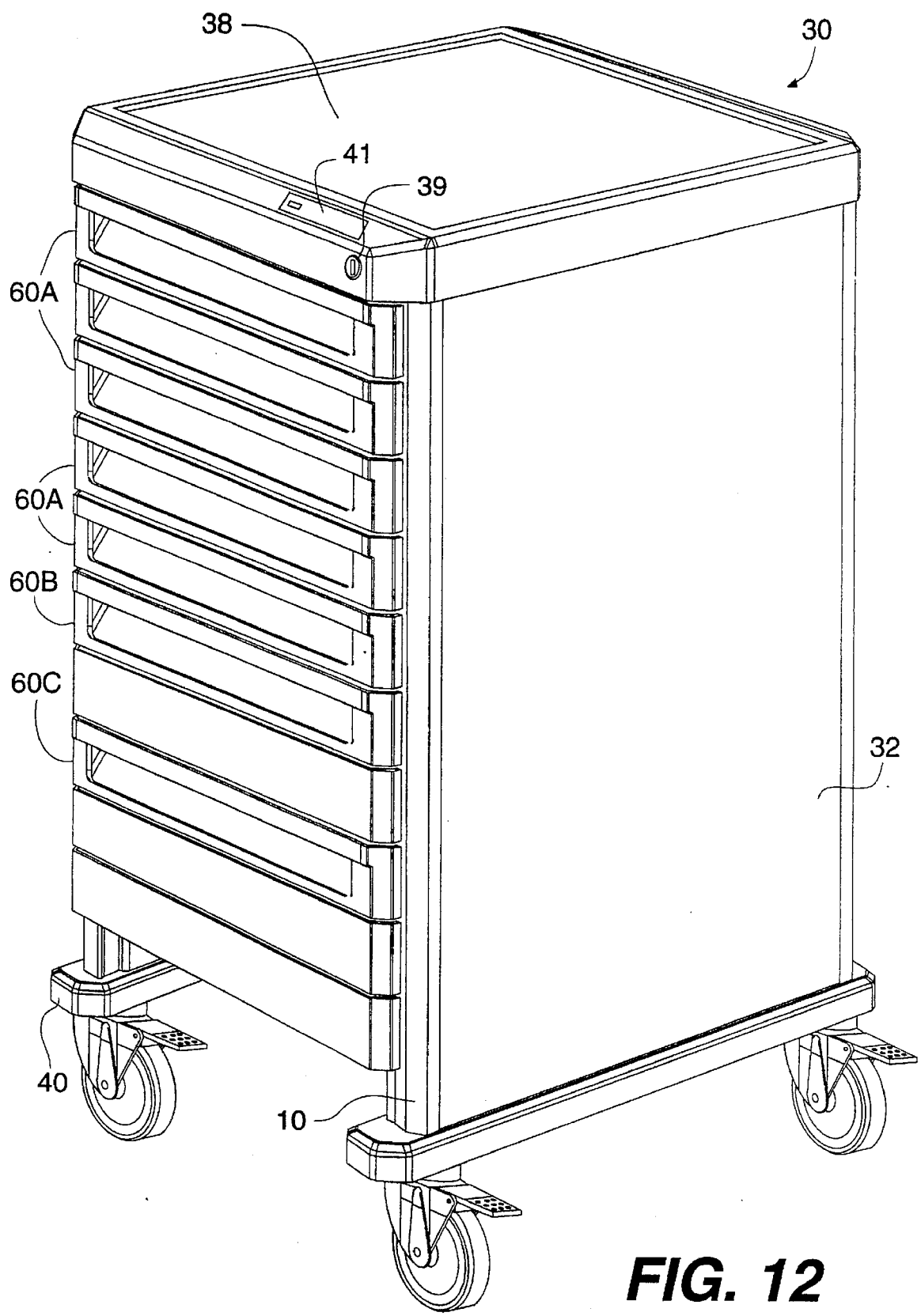
FIG. 12 is a perspective view of a drawer-filled mobile cart in accordance with the present invention.

FIG. 12 illustrates a mobile cart 30 filled with a plurality of drawers 60. As will be appreciated, the cart in this figure is filled with five (5) single-depth drawers 60A, one (1) double-depth drawer 60B and one (1) triple-depth drawer 60C. Of course, any number or combination of drawers can fill the enclosed structure.

Figure 13:
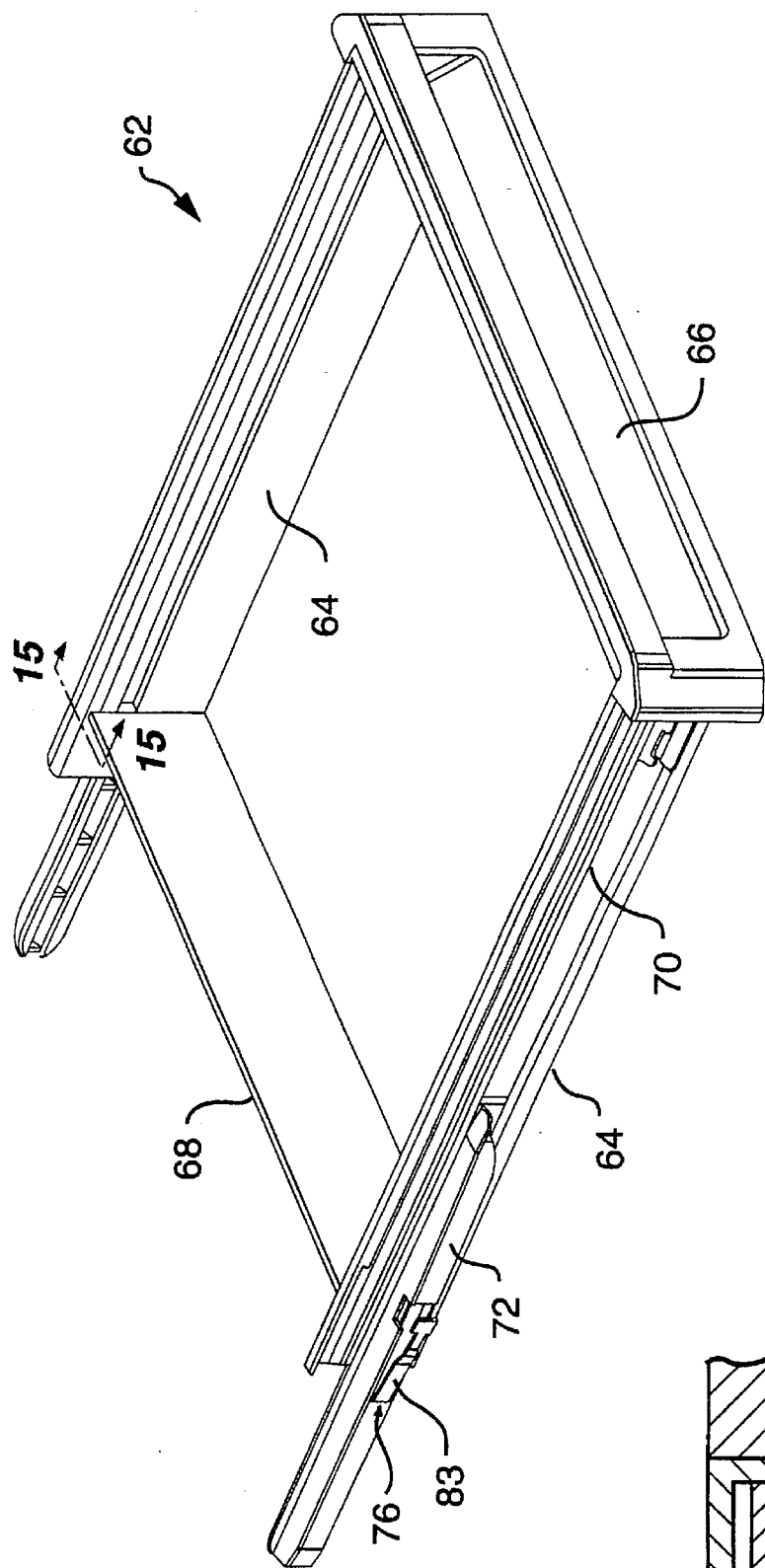
FIG. 13 is a perspective view of a drawer frame in accordance with the present invention.

Details of a drawer assembly for use in the enclosed structure, whether it be a mobile cart or a stationary cabinet, are shown in FIG. 13. In accordance with the subject invention, the drawer assembly features an open architecture type of construction which uses one standard type of drawer frame for drawers of different sizes, i.e., depths.

A standard drawer frame 62 is shown in FIG. 13 to include two side panels 64 fastened between a handle drawer front 66 and a rear panel 68. The handle drawer front 66 is shown in isolation in FIGS. 14A and 14B. The front handle section, which is preferably molded plastic, is actually formed from two pieces for ease of production: a recessed front face 67 and a handle 69. The recessed front face 67 shown in FIG.

14A includes opposite arms 71 that are secured, such as by threaded fasteners, to the side panels 64 of the frame. Each arm 71 includes a notched channel 73 for receiving a locking finger as discussed in detail below. The notched channel 73 permits the drawer assembly to be securely locked in the enclosed structure. The plastic handle 69, as shown in FIG. 14B, is snap-fitted to the front face to complete the front handle section.

The side panels and rear panel are formed of, for example, aluminum, and secured to each other by common fasteners 75, such as screws. Each side panel includes a formed channel 70 on its exterior surface for slidably receiving a drawer glide 72. The drawer glide, by virtue of its elongated, rectangularly-shaped outer side, slides between the corrugations 46 in the interior side panels 36 to support the drawer assembly in the enclosed structure.

Figure 15:
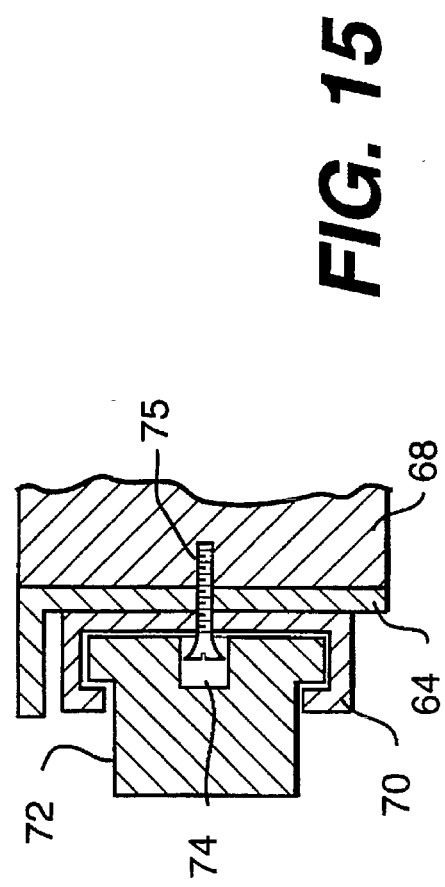
FIG. 15 is a cross-sectional view of the drawer frame along lines 15—15 in FIG. 13 in accordance with the present invention.

As best seen in FIG. 15, which depicts a cross-section of the drawer glide 72 and the side panel 64, the drawer glide has a T-shaped cross-section which complements the shape of the channel 70. The drawer glide is also provided with a cut-out notch 74 in its back surface. The notch extends from a rear end of the drawer glide to an intermediate, e.g., halfway, point of the drawer glide. The notch allows the drawer glide 72 to slide over the head of the screw 75 up to the intermediate point where the notch terminates. By allowing the drawer glide to slide relative to the side panel 64, the drawer frame can be pulled further out of the enclosed structure to allow better access to the contents in the drawer. The intermediate end of the notch limits the relative movement between the drawer glide and the side panel to prevent the drawer glide from sliding out of the drawer frame.

Figure 16:
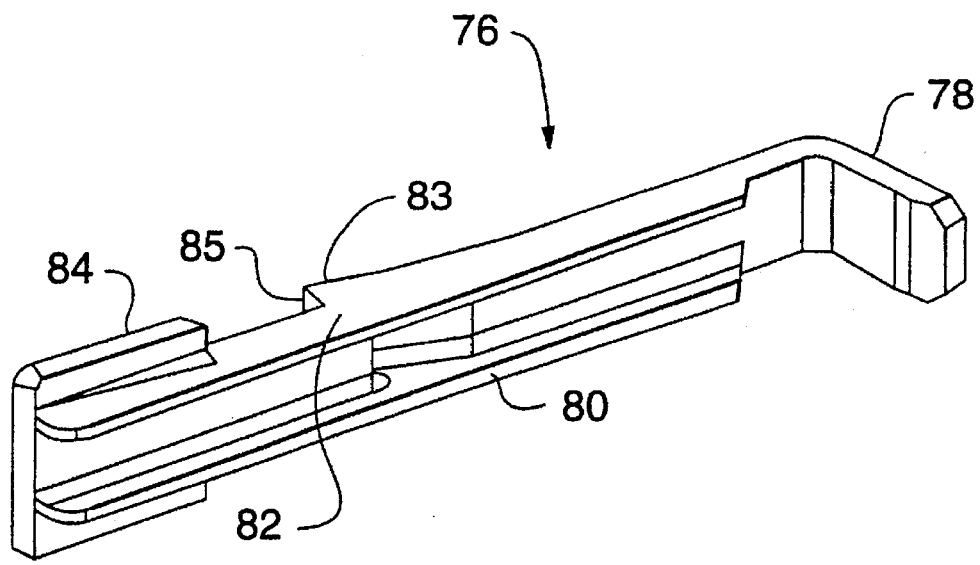
FIG. 16 is a perspective view of a drawer clip in accordance with the present invention.
Figure 17:
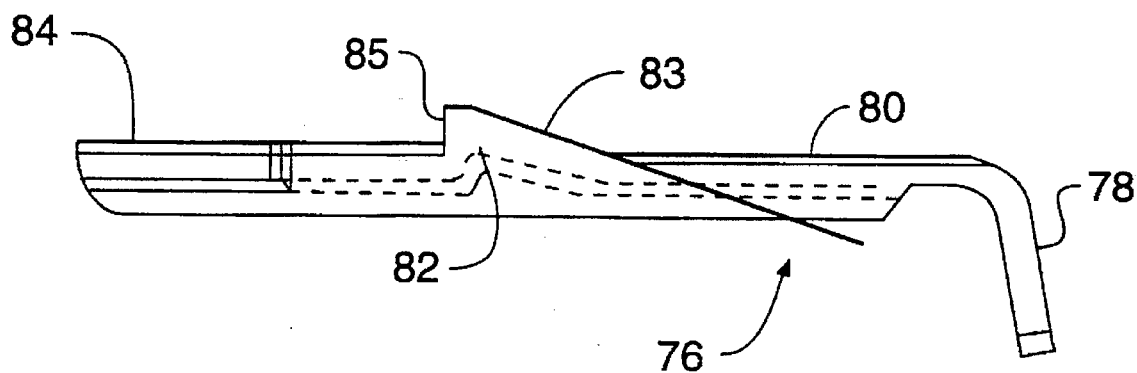
FIG. 17 is a top view of the drawer clip shown in FIG. 16 in accordance with the present invention.
Figure 18A:
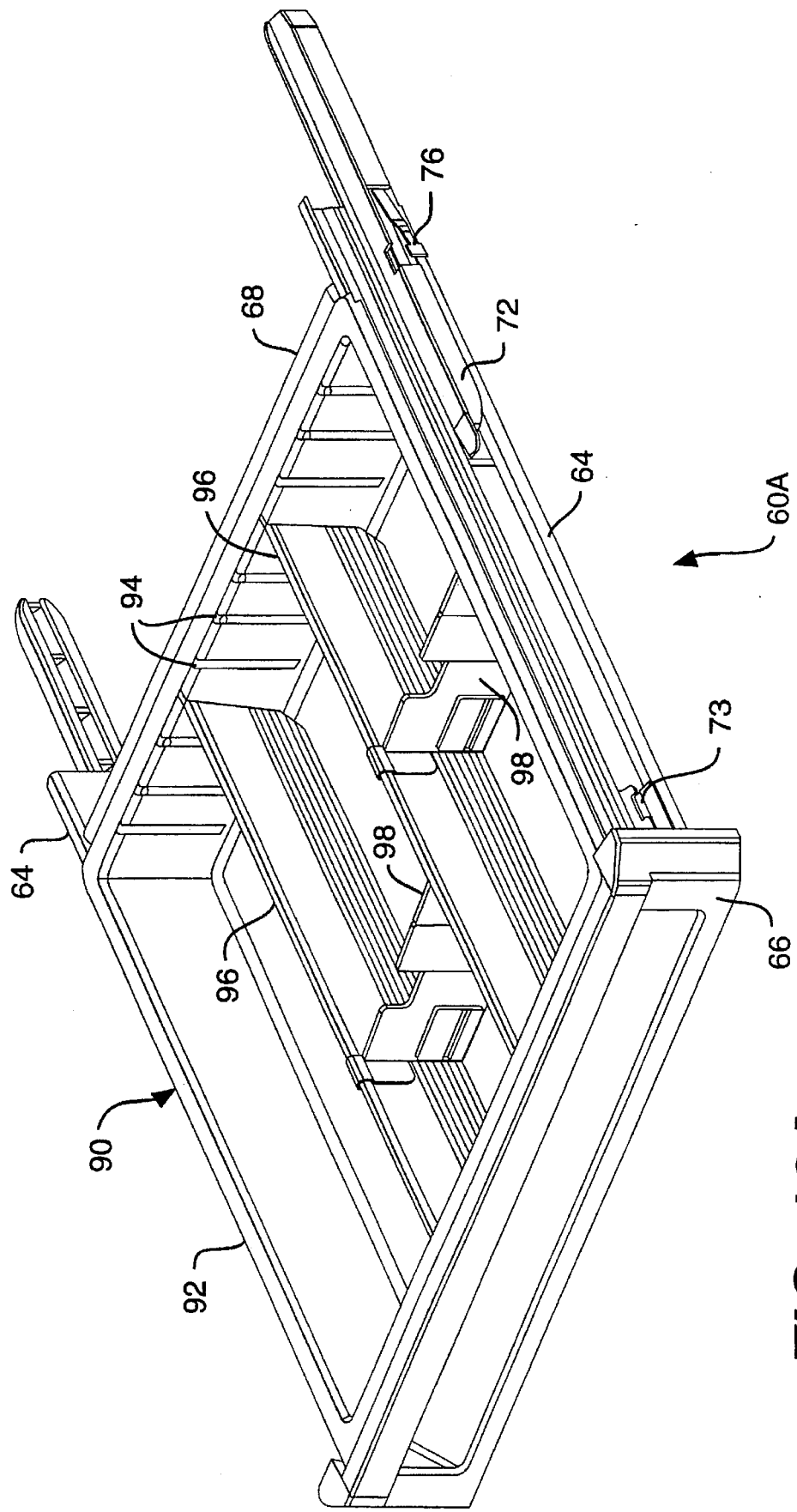
FIG. 18A is a perspective view of a single-depth drawer assembly in accordance with the present invention.
Figure 18B:
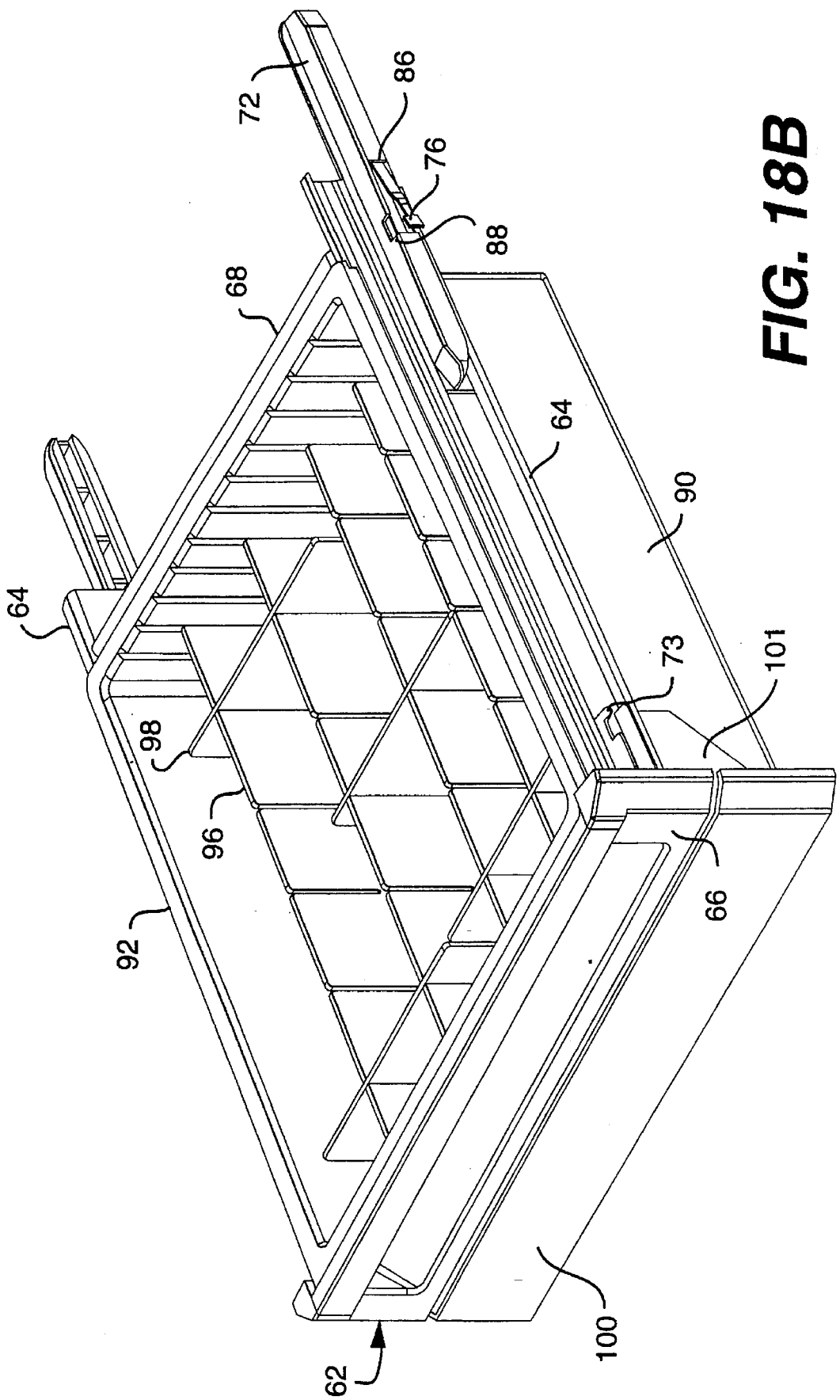
FIG. 18B is a perspective view of a double-depth drawer assembly in accordance with the present invention.

A drawer clip 76 as shown in FIGS. 16 and 17 is provided in each drawer glide 72 to prevent the drawer assembly from accidentally being pulled completely out of the cabinet or cart. With reference to these figures, the integral drawer clip 76 is molded from a non-rigid plastic, such as nylon, to have a short leg 78 and a long leg 80. The long leg is formed with a stop 82, that includes a ramped portion 83 and an abutting face 85, and a finger tab 84. The long and short legs meet to form an angle of approximately 100°, as best seen in FIG. 17, with the short leg fitting into an opening, such as slot 86, in the drawer glide. As shown in FIGS. 18A and 18B, when the drawer clip is positioned in the drawer glide 72, it is almost flush therewith, except for the stop 82, which extends outwardly a short distance, e.g., ⅛." When pulling out the drawer assembly, the drawer glides slide along the corrugated side panel until the abutting face 85 of the stop 82 abuts the locking face 58 of the drawer-abutting extrusion 56 (see FIG. 9A), at which point the drawer cannot be slid out further until the finger tabs 84 on each drawer clip are depressed into a recess 88 in the drawer glide. Depressing the finger tabs withdraws the stop and allows the drawer clips to pass by the drawer-abutting extrusions. Reinserting the drawer assembly is unimpeded because contact between the ramped portion 83 of the drawer clip 76 and the drawer-abutting extrusion biases the drawer clip inwardly, making it possible to slide in the drawer.

Figure 19:
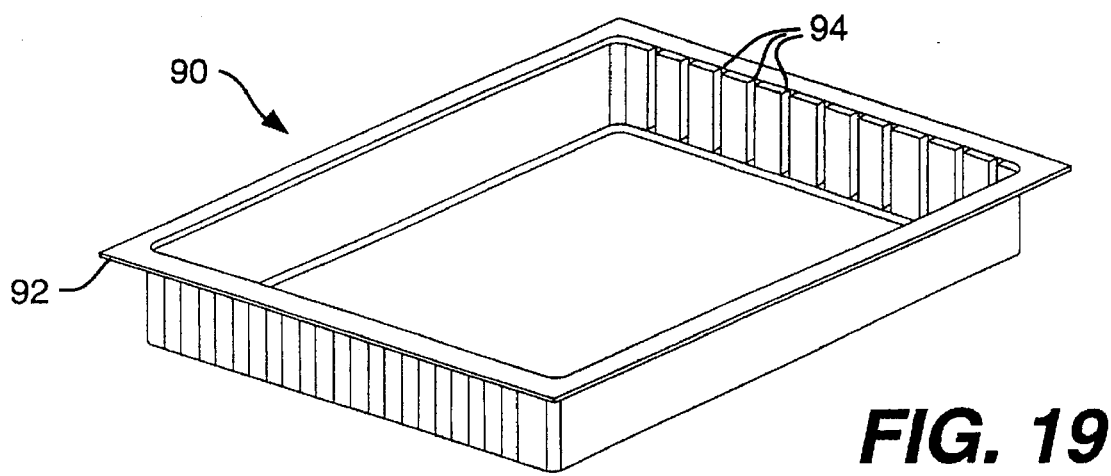
FIG. 19 is a perspective view of a drawer insert for use in the drawer assembly in accordance with the present invention.

FIGS. 18A and 18B further illustrate the open architecture type of drawer assembly. A single-depth drawer 60A in FIG. 18A shows a drawer insert 90, which is essentially a 4-sided bin, supported on the drawer frame 62. An isolated view of the bin 90 is provided in FIG. 19. The drawer insert includes a lip 92 for resting on the side and rear panels of the drawer frame, and can also include slots 94 for receiving optional bin dividers 96. Additional lateral dividers 98 can be positioned on the bin dividers 96 to further divide the drawer insert. One type of lateral divider is shown in FIG. 20 and is discussed below.

In accordance with the invention, the drawer insert 90 can be of any desired depth. However, when the drawer insert 90 is deeper than the handle drawer front 66 of single-depth drawer 60A, the standard drawer frame 62 is supplemented with one or more blank drawer fronts 100. For example, FIG. 18B shows a double-depth drawer, so-called because two-front sections-a handle drawer front 66 and a blank drawer front 100, are secured together to form the front of the drawer assembly.

For simplicity, drawer inserts 90 can be provided in standard depths of, for example, 3", 6" and 9". Each drawer front is sized to cover a 3" depth of the drawer insert. Therefore, a handle drawer front would be used with a 3" deep drawer insert, a handle drawer front and a blank drawer front would be used with a 6" deep drawer insert, and so on. For drawer assemblies of 6" and 9" and so on, a gusset 101 can be secured between the blank drawer front(s) 100 and the side panels 64 on each side of the drawer frame for additional rigidity.

Figure 20:
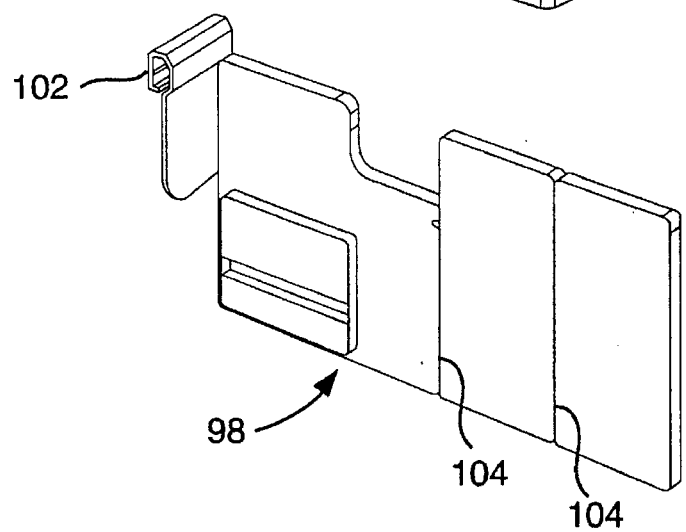
FIG. 20 is a perspective view of a lateral divider for use in the drawer insert in accordance with the present invention.

The lateral divider 98 shown in FIG. 20 includes a U-shaped cap 102 for fitting over a longitudinal divider 96 and scored sections 104 that can be snapped off where appropriate to adjust the length of the lateral divider.

Figure 21:
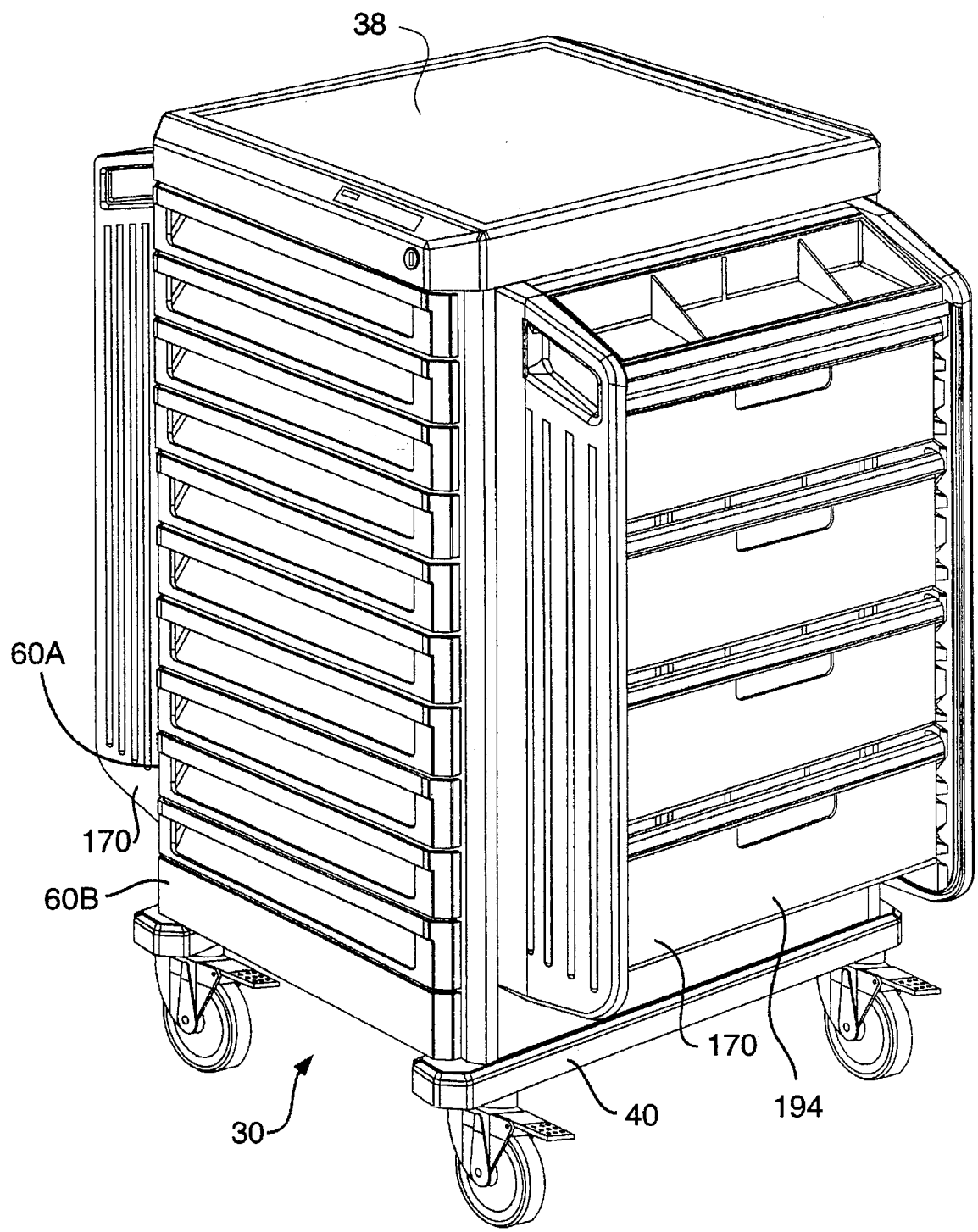
FIG. 21 is a perspective view of a mobile cart with side pods in accordance with the present invention.
Figure 22:
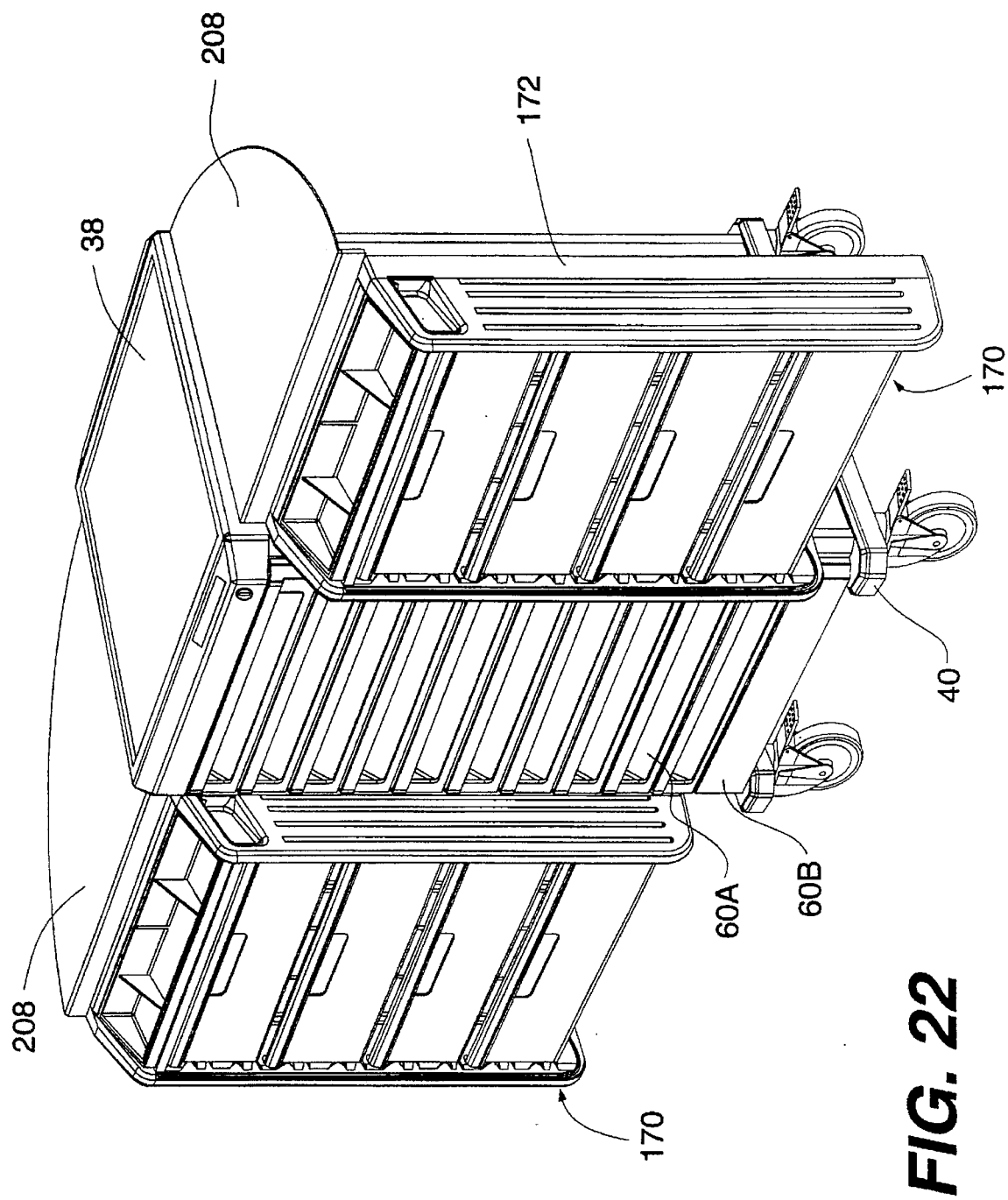
FIG. 22 is a perspective view of the mobile cart with the side pods open in a swing-out position in accordance with the present invention.
Figure 23:
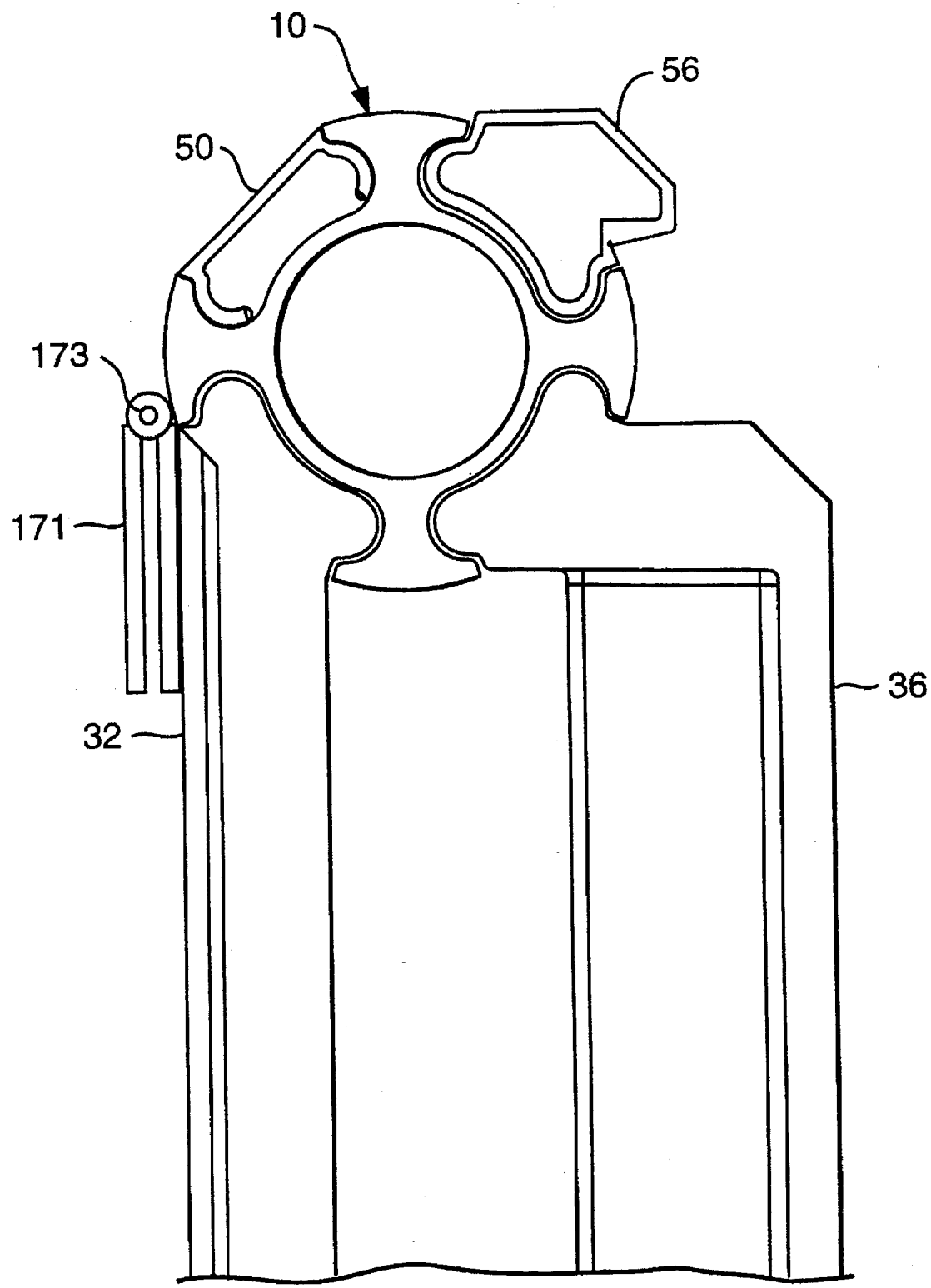
FIG. 23 is a top view of a support post in use in a front corner of the enclosed structure in accordance with the present invention.

FIG. 21 shows a drawer-filled mobile cart 30 equipped with utility cabinets 170. Because the cabinets are mounted on the sides of the mobile cart in this embodiment, they will be referred to as side pods. The side pods are preferably secured to the cart by a hinge, such as a conventional piano hinge, so they can swing open toward the front of the cart. In FIG. 21, the side pods 170 are closed and positioned to rest against the sides of the cart. FIG. 22 shows the hinged side pods 170 in the open position, with bins 194 in the side pods flanking the front side of the cart. FIG. 23 is a top view of the front right corner of the mobile cart and illustrates a hinge 171 secured to the exterior side panel 32. The hinge mounts a back panel of the side pod 170 to the exterior side panel 32 and allows the side pod to pivot about hinge pin 173 to swing toward the front of the cart. Also shown in FIG. 23 is the interior side panel 36, drawer-abutting extrusion 56, blank extrusion 50 and, of course, the flanged support post 10.

Figure 24:
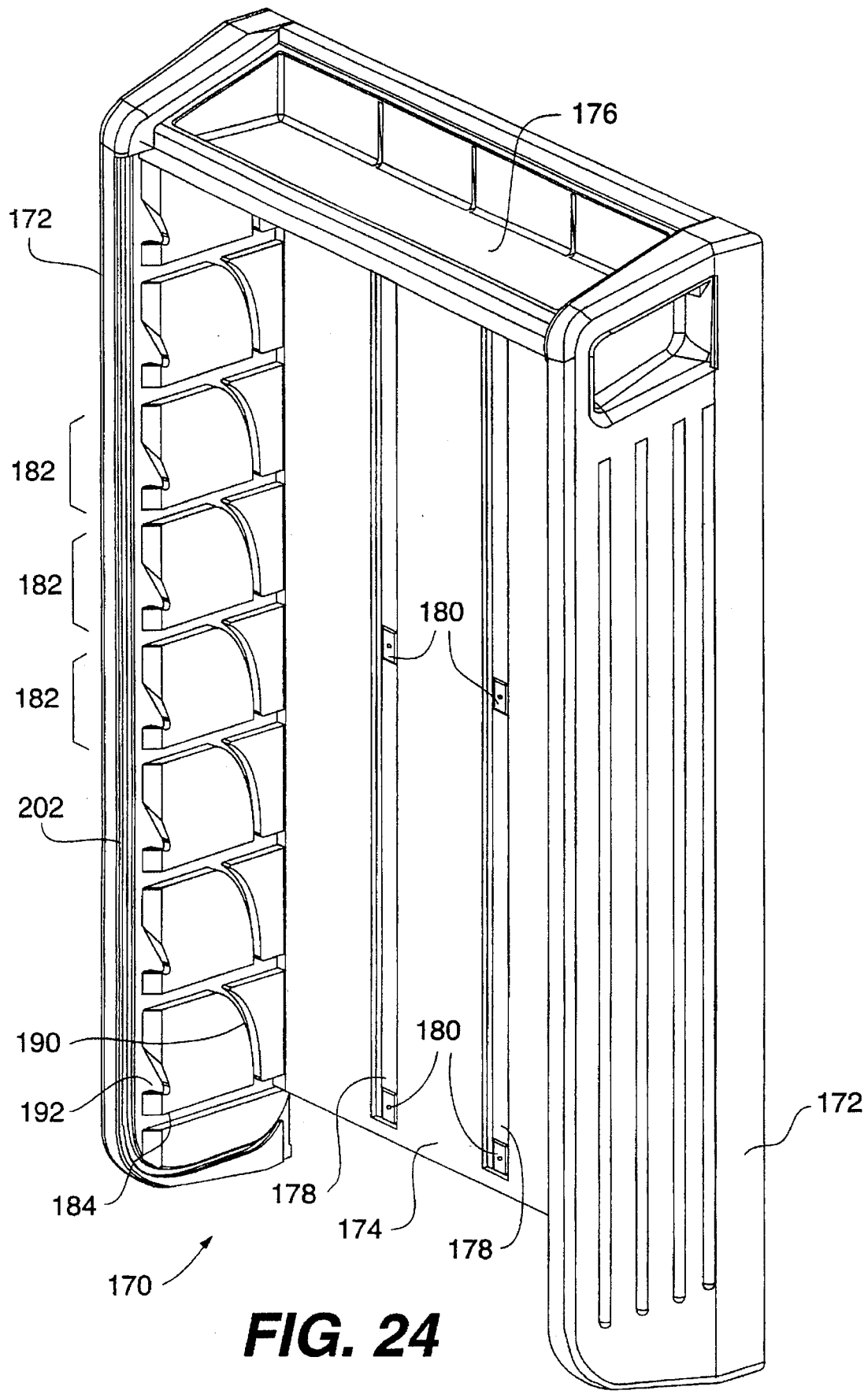
FIG. 24 is a perspective view of an empty side pod in accordance with the present invention.
Figure 25:
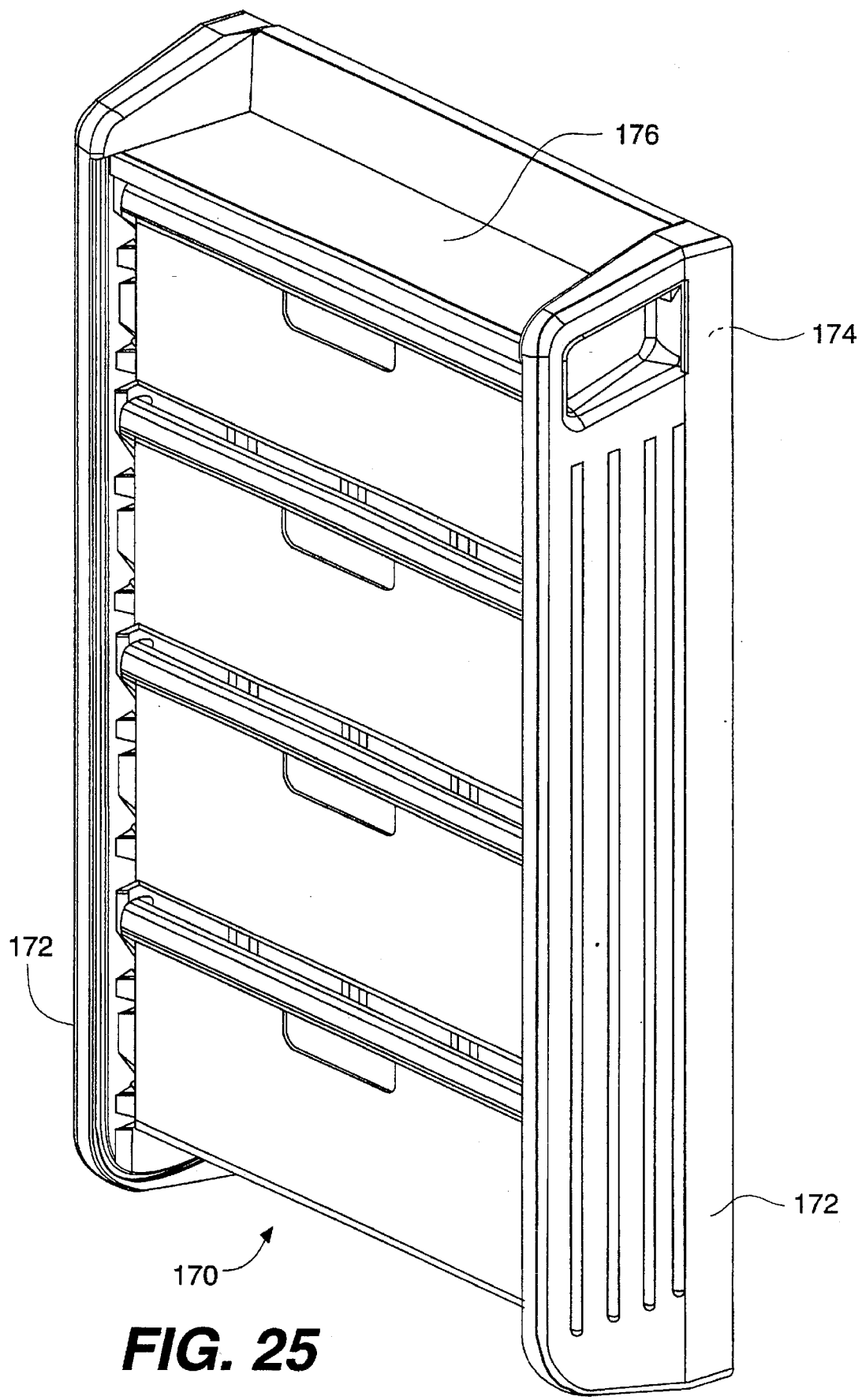
FIG. 25 is a perspective view of the side pod loaded with bins in accordance with the present invention.

As best seen in FIGS. 24 and 25, the individual side pod is formed from two side panels 172 secured to a back panel 174. A utility shelf 176 is positioned between the two side panels. The side and back panels are preferably blow molded and secured to each other by conventional fasteners. The back panel is formed to have a plurality of vertical slots 178 in its interior surface. The slots can be provided with tabs 180 for securing, for example, an unshown horizontal rail for supporting medical instruments, tools, and other accessories. As an additional feature, a vertical support (unshown), or bracket, can be key-fitted in a tab for supporting a partial-length horizontal shelf.

Figure 28:
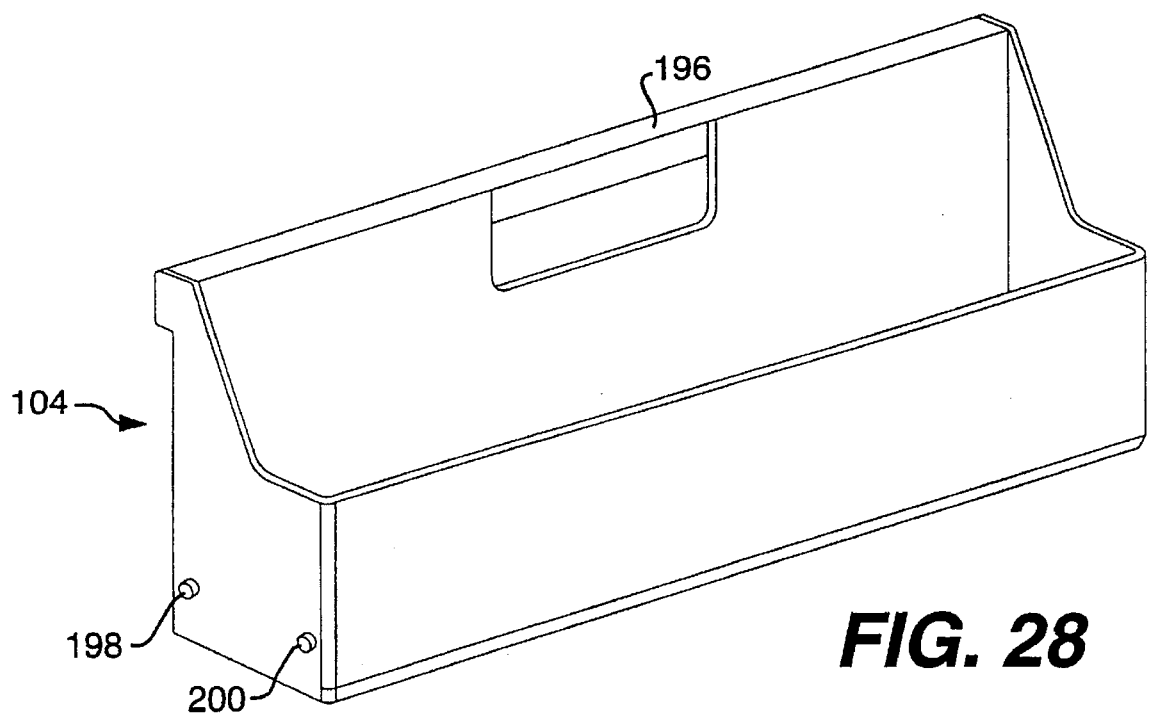
FIG. 28 is a perspective view of a bin for use in the side pods in accordance with the present invention.
Figure 26:
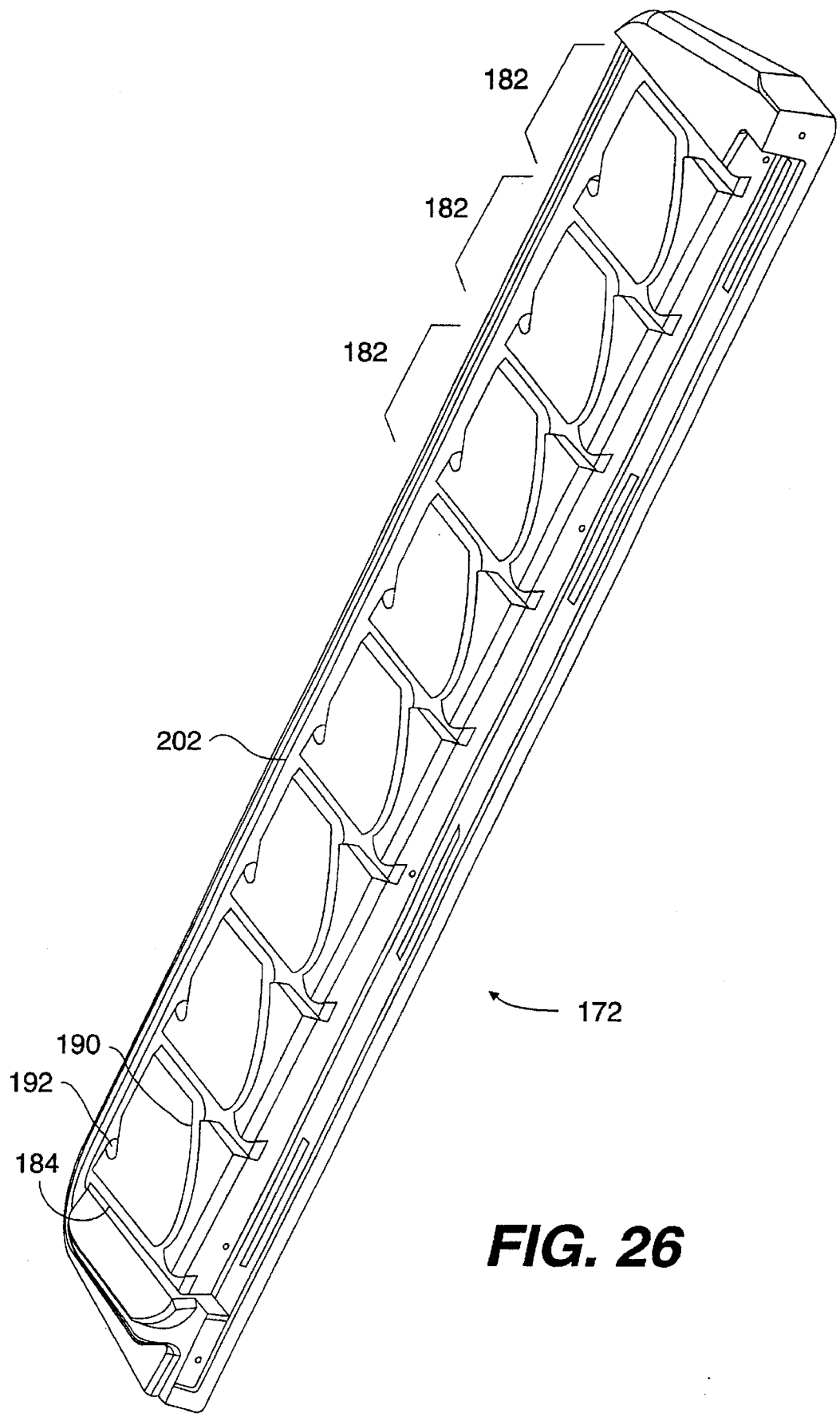
FIG. 26 is a perspective view of a molded side panel of the side pod in accordance with the present invention.
Figure 27:
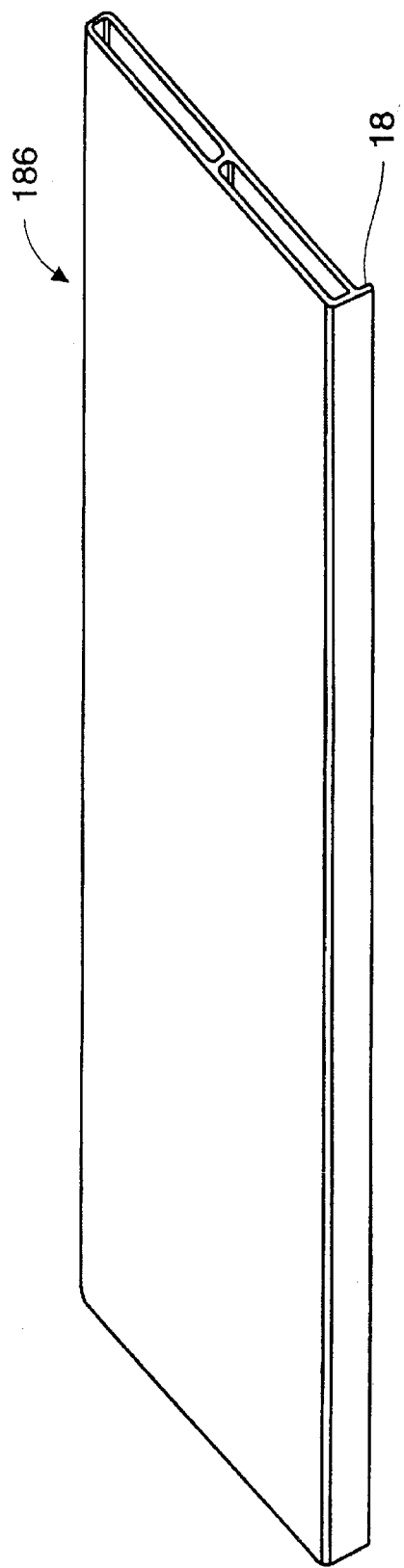
FIG. 27 is a perspective view of a shelf for use in the side pod in accordance with the present invention.

With reference to FIG. 24 and the isolated view of a side panel 172 in FIG. 26, the interior surface of the side panels 172 are formed to have a vertical array of molded, or configured, sections 182. Each molded section includes a horizontal slot 184 for supporting, as an example, a horizontal shelf 186 as shown in FIG. 27. The plastic molded, or more particularly extruded, shelf 186 is reversible and can be provided with a lip 188 along its front edge. In this manner, one side of the shelf provides a smooth, flat surface and the other side of the shelf uses the lip as an edge to help retain items supported on the shelf. Each molded section also includes a rear arcuate slot 190 and a front notch 192 for receiving a bin 194 of the type shown in FIG. 28.

The bin 194 includes a handle 196 and two sets of pins 198 and 200 extending from the lower lateral sides of the bin. For reference purposes, the first set of pins 198 is disposed directly below the handle and the second set of pins 200 is disposed opposite to the first set. To insert the bin in a frontward position, i.e., with the handle on the outside, the bin is tilted to place the first set of pins 198 in the notches 192 and the second set of pins 200 is guided into the arcuate slots 190. The bin can then be rotated into the cabinet to rest in an upright position. In this position, the bin can be tilted outwardly by holding the handle and rotating the bin about the first set of pins 198. The bin can also be mounted in a rearward position, i.e., with the handle on the inside of the cabinet, to provide a deep shelf. To achieve this position, the second set of pins 200 are first inserted into the notches 192 and the bin is tilted inward, with the first set of pins sliding in the arcuate slots 190.

Figure 30:
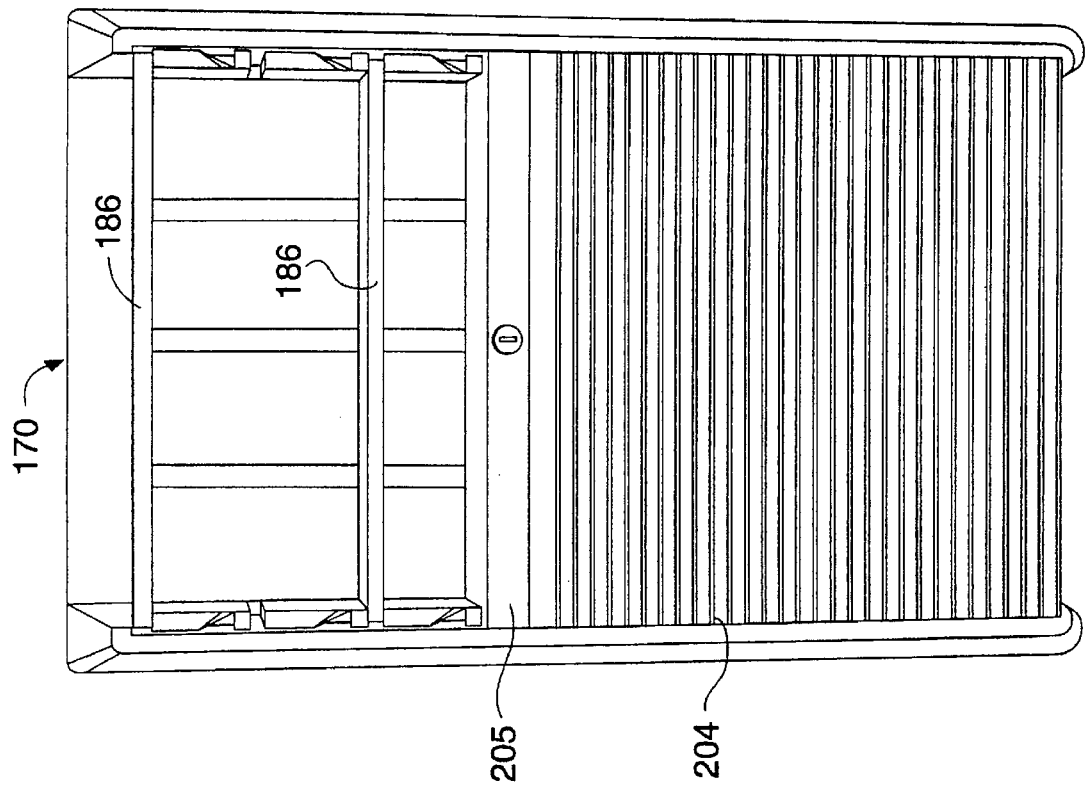
FIG. 30 is a perspective view of the side pod with a door in accordance with the present invention.
Figure 29:
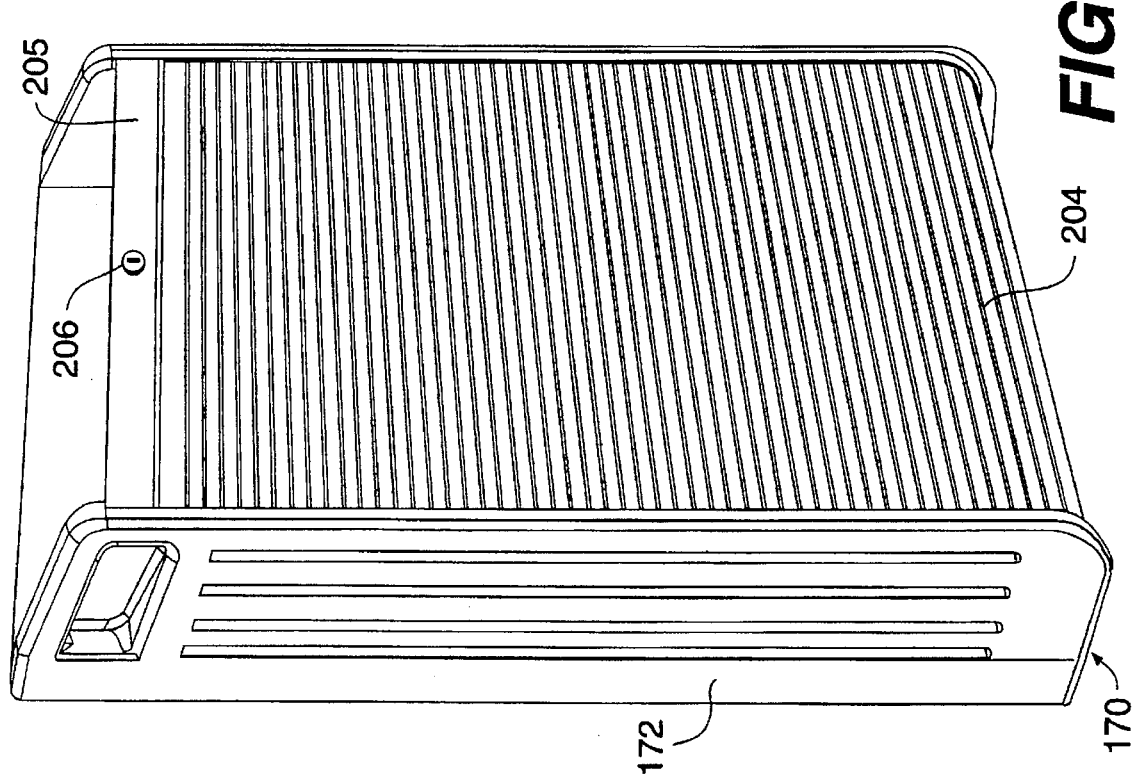
FIG. 29 a perspective view of the side pod with a door in accordance with the present invention.

The side panels 172 also include a groove 202 running along the front inner edge for receiving a door 204, such as a tambour door, as shown in FIG. 29. The tambour door, per se, is conventional and, as known, can be formed from a plurality of parallel sections joined together such as to exhibit flexibility in one direction and rigidity in a perpendicular direction. FIG. 29 shows the door secured to a locking shelf 205 positioned in an uppermost horizontal slot 184 in the side pod. The locking shelf can be formed by modifying the shelf 186 shown in FIG. 27 to provide a slightly enlarged front edge housing a simple manual locking mechanism 206 such as a key lock and a rotatable locking finger (unshown) for securing the tambour door. The locking shelf can be easily located in any horizontal slot in the side panels for altering the portion of the cabinet which can be secured to best fit the user's needs. For example, FIG. 30 shows the locking shelf 205 disposed at approximately the mid-portion of the side pod.

Another feature of the swing-out side pods is the provision of a swing-out work surface 208 that provides additional work space when the side pods are in the open position. As shown in FIG. 22, the work surface is substantially a flat shelf, preferably a quarter-circle in shape to maximize the work surface area, and is secured to a top portion of the back panel 174 of each side pod. When the side pods are closed, the work surface slides under the top platform 38 of the cart and out of sight. Since both side pods are preferably equipped with swing-out work surfaces, these work surfaces are secured at slightly different vertical heights on their respective side pods so they will avoid each other when sliding under the top platform.

While the side pod is ideally suited to be swingably mounted to a mobile cart as discussed above, it can also be mounted to the sides of the cart (so as not to swing) and, as additional non-limiting examples, to a wall, a work station, or a stationary cabinet. The side pod could also be provided on its own wheeled cart or caddy.

Figure 31:
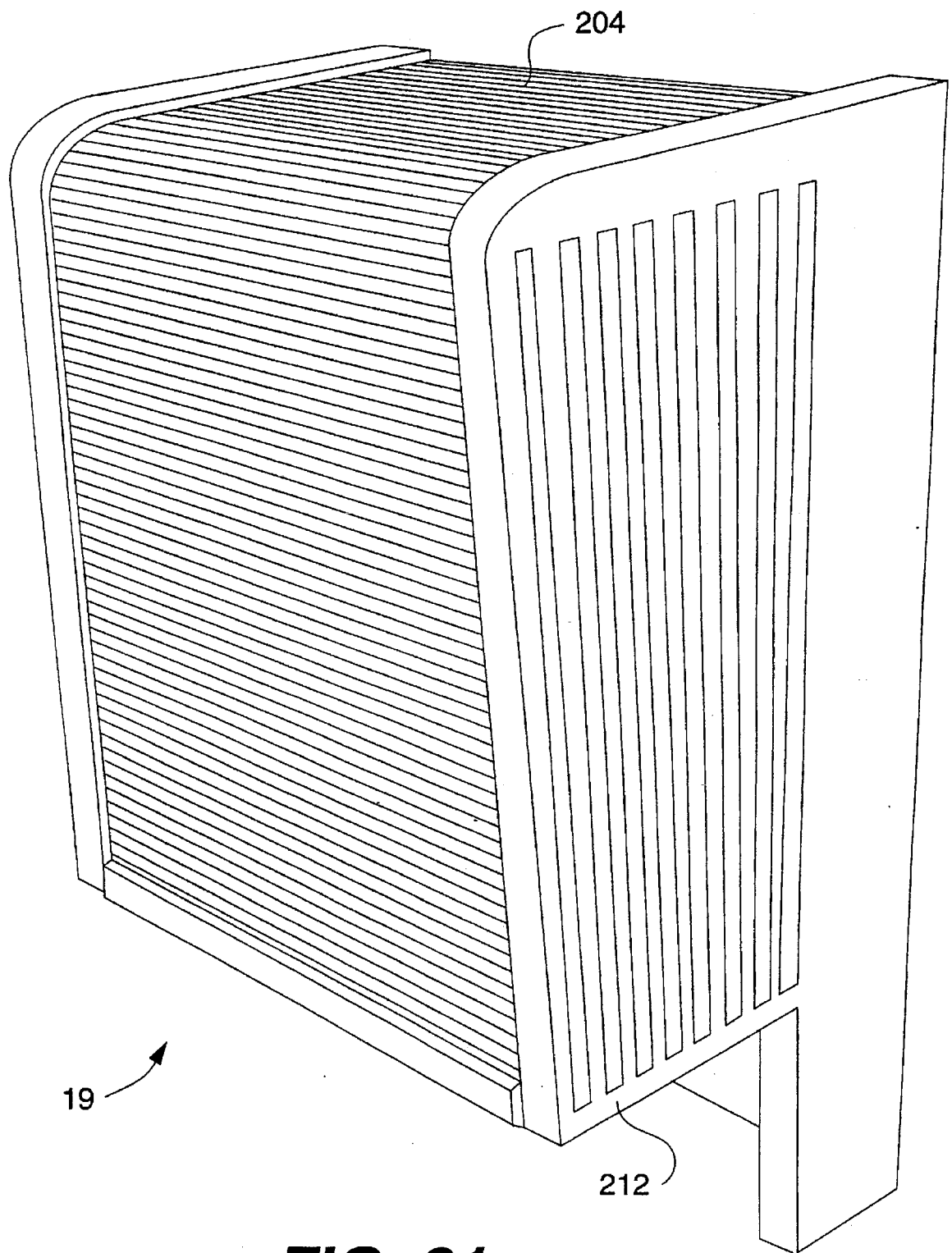
FIG. 31 is a perspective view of an overhead cabinet in accordance with the present invention.
Figure 32:
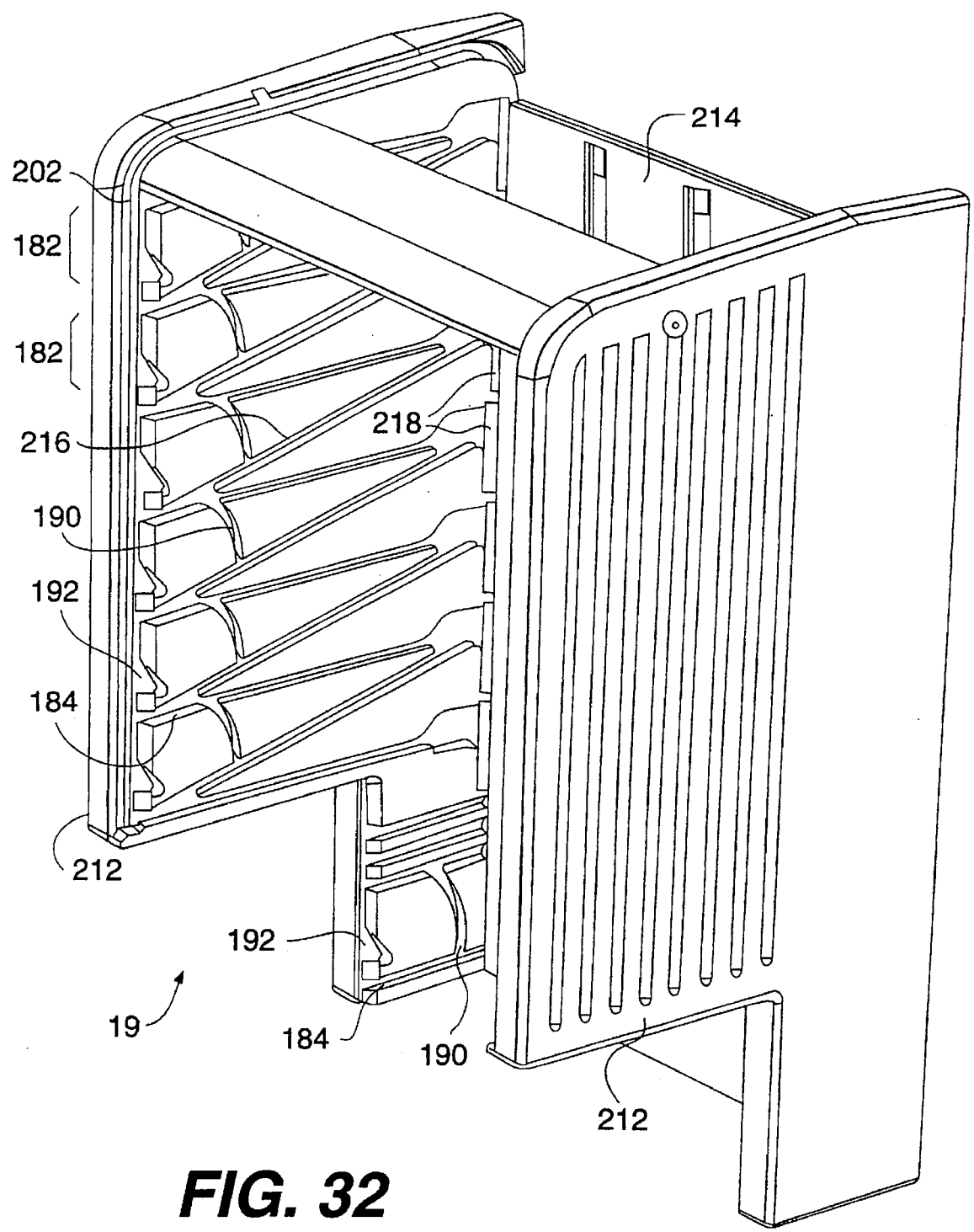
FIG. 32 is a perspective view of the overhead cabinet shown in FIG. 31 without the door in accordance with the present invention.

A variation of the utility cabinet, or side pod, is an overhead cabinet 19 as illustrated in FIG. 31. The overhead cabinet 19 differs from the side pod primarily in the shape of the side panels. As best seen in FIGS. 31 and 32, the overhead cabinet is provided with side panels 212 that are wider than the side panels used in the side pod. The wider side panel provides a deeper cabinet that can be used with larger shelves, bins, etc. to hold more supplies. Because of its larger size, the overhead cabinet 19 shown in these figures is perhaps best suited for mounting on a wall above other components in the modular storage and support assembly as shown, for example, in FIG. 2. Of course, the overhead cabinet can be mounted at various other positions and even provided on its own mobile cart.

Figure 33:
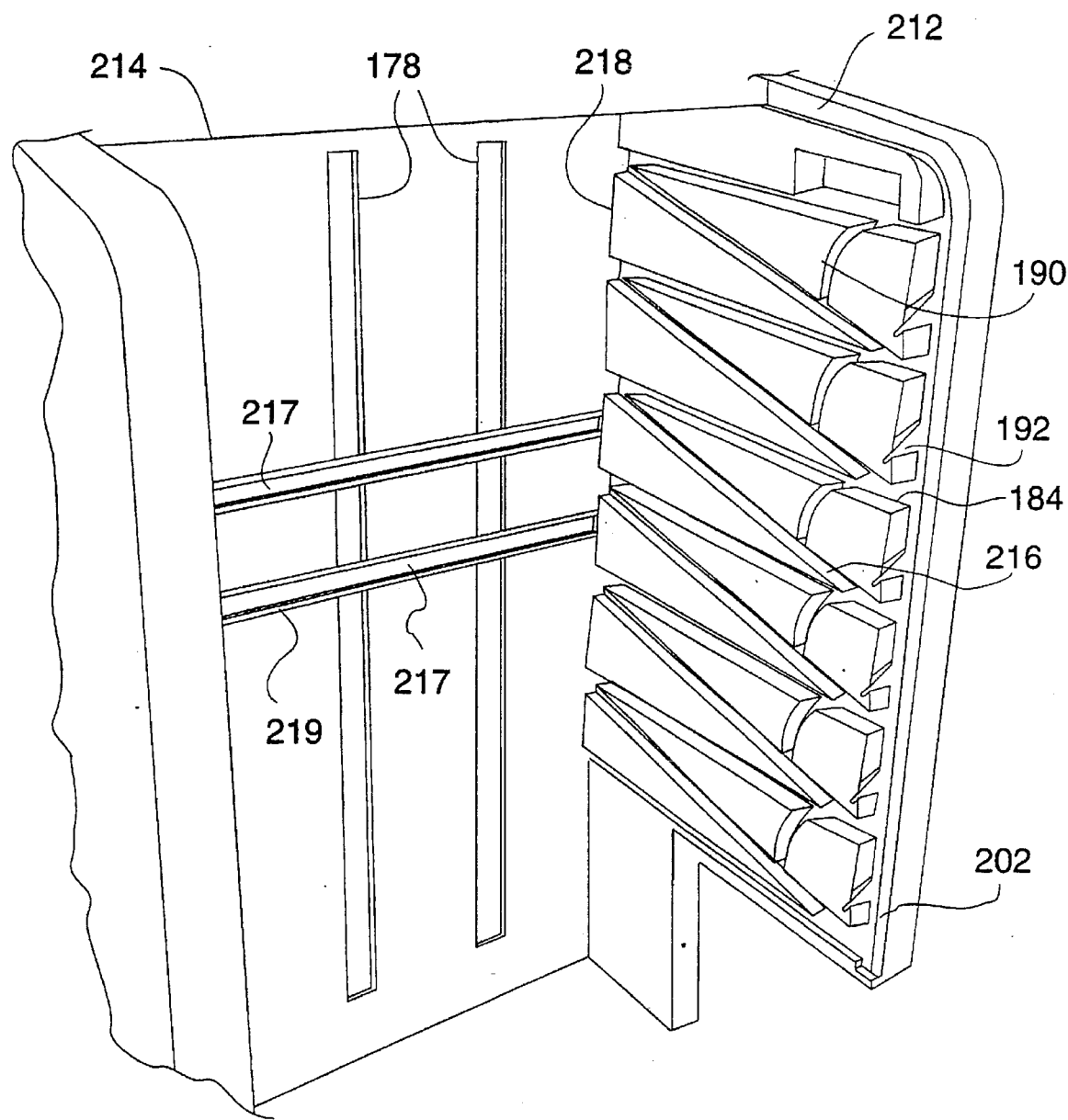
FIG. 33 is a perspective view of a rear and side panel of the overhead cabinet in accordance with the present invention.

With reference to FIGS. 32 and 33, the side panels 212 and a rear panel 214 are preferably blow-molded and include all of the features discussed above with reference to the side pod. These features have accordingly been assigned the same reference numerals. The side panels in the overhead cabinet additionally include a slanted groove 216 and a rear notch 218 in each molded section 182. The slanted groove angles downwardly from back to front at, for example, 15°, and is used to support shelves disposed at such an angle. The rear notches are designed to receive, for example, horizontal hanging rails 217 as shown in FIG. 33. The hanging rails include upturned lips 219 for supporting hanging bins, surgical tools, etc. The side panels 212 in the overhead cabinet also preferably include a cut-out portion at their lower front ends.

The overhead cabinet also utilizes a tambour door 204, as shown in FIG. 31, slidably supported in front slots 202 of the side panels. Because the overhead cabinet is usually mounted at an elevated position, the tambour door is preferably installed to slide from bottom to top when being opened. As with the side pod, the tambour door can be lockable by use with an adjustable shelf having a locking mechanism.

When the enclosed structure is a mobile cart as shown, for example, in FIGS. 12 or 21, the bottom platform 40 is supported on casters 47 or other comparable means as discussed above. However, if the enclosed structure is stationary, such as a cabinet, the bottom platform sits on a stationary support base 110 as illustrated in FIG. 34. The stationary base can be as simple as a single piece of molded plastic with adjustable feet and elevates the enclosed structure off of the ground. The stationary base can be customed formed to fit a single-wide, double-wide, etc., platform as shown in FIG. 2.

The enclosed structure in FIG. 34, which is an isolated view of the tall cabinet 13A shown in FIG. 2, illustrates the versatility of an enclosed structure built on a platform using the support posts of the present invention. While the lower half of the enclosed structure is filled with drawers 60, the upper half of the structure features a wire rod shelf 120 enclosed behind a clear panel door 122. Details of the door will be discussed below reference to FIGS. 36 through 40.

Figure 35:
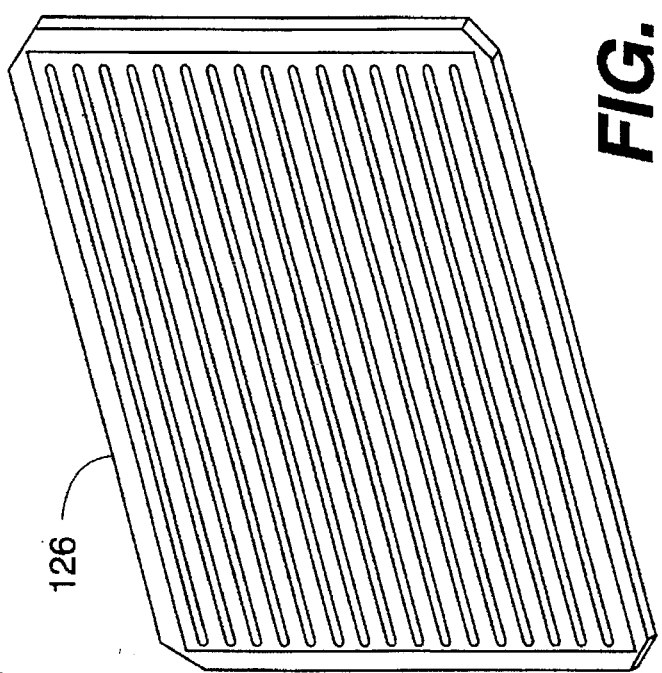
FIG. 35 is a perspective view of a shelf in accordance with the present invention.

A lock-out drawer closure 124 is provided between the upper and lower halves of the enclosed structure and provides a permanent interface to house the controls for the security system that will be discussed in detail below. The drawer closure can be form by securing a blow-molded shelf 120 of polymer plastic, as shown in FIG. 35, to a blank drawer front 100 of the type show in FIG. 18B. The drawer closure is permanently affixed in the enclosed structure by fasteners such as rivets or screws. Housed in the drawer front is the control mechanical locking mechanism 39 and the electronic controller 41 for the security system.

The double-wide enclosed structure 13D shown in FIG. 36, which is also depicted in FIG. 2, illustrates another variation of the enclosed structure in accordance with the present invention. The left side of the structure shows a plurality of drawers 60 and two shelves 120 supported between the corrugations 46 of the interior side panels 36. A hinged door 132, which is discussed in detail below, is provided on the right half of the enclosed structure. The entire enclosed structure sits on a double-wide stationary base 110.

Figure 37:
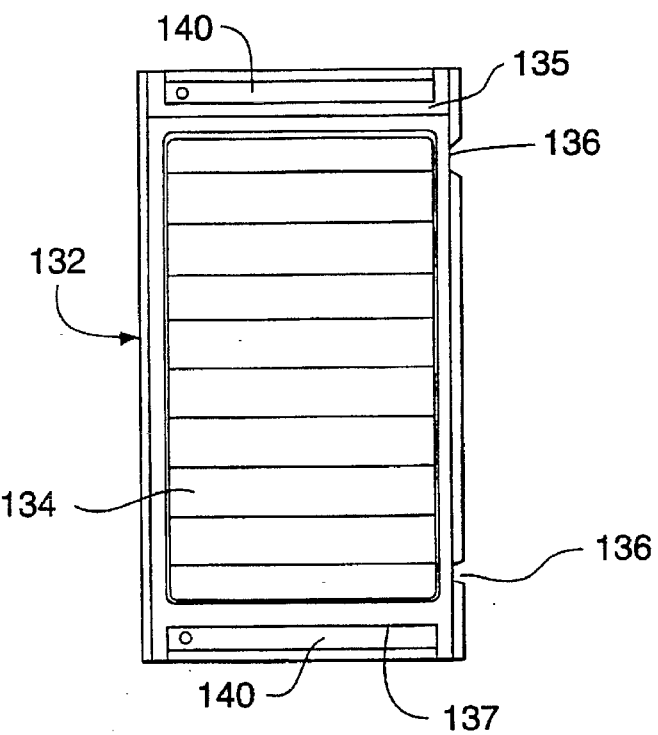
FIG. 37 is a front view of a single door in accordance with the present invention.
Figure 38A:
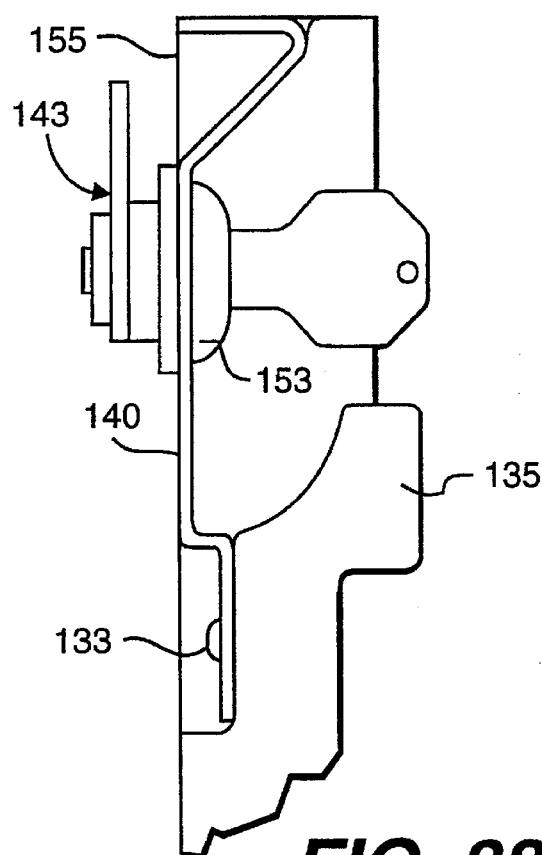
FIGS. 38A and 38B are fragmented side views of door handles on the single door shown in FIG. 37 in accordance with the present invention.
Figure 38B:
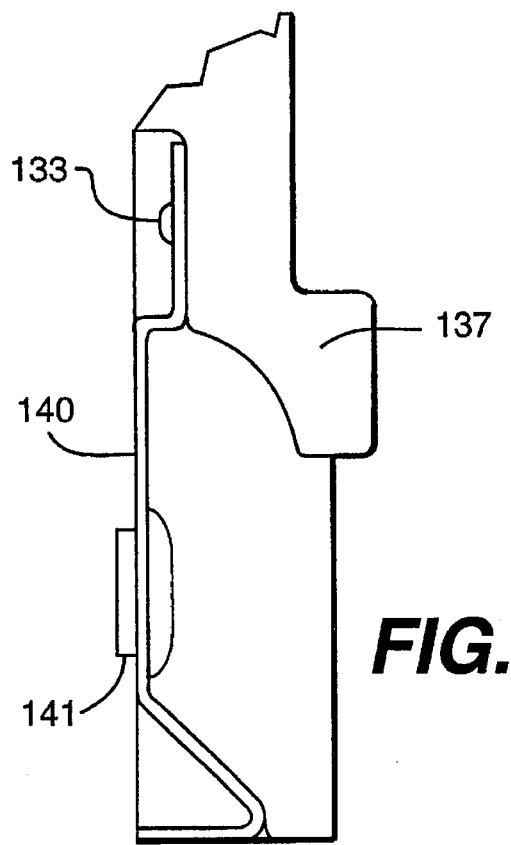

FIG. 37 depicts a front view of a single door 132 for use with an enclosed structure as shown, for example, in FIGS. 34 and 36. As will be appreciated, the single door is asymmetrical about its vertical axis such that it can be used in a number of different orientations and positions. The door includes a central panel 134, which in this figure is formed of thin plastic, and two hinge notches 136 on the right edge of the door. The single door also includes an upper molded handle 135 and a lower molded handle 137. The upper and lower molded handles are best seen in FIGS. 38A and 38B, respectively, which also show separately formed security panels 140 secured to the door proximate to both the upper and lower handles by a fastener 133. A plug 141 fills a locking mechanism hole in the security panel 141 shown in FIG. 38B. The plug is replaced in FIG. 38A with a locking mechanism 143 comprised of a key lock 153 and a locking finger 155. Constructing a door in this manner allows the same door to be used as both an upper door and a lower door. In addition, with hinge notches on the right side as shown in FIG. 37, the mounted door will swing open from left to right. However, if the asymmetrical door is turned 180° (so the lower handle 137 is now on top), the hinged notches will be on the left edge and the door will be able to swing open from right to left. Thus, the same door can be used as an upper or lower door and as a right-side or left-side door. As an alternative to the plastic central panel 134 shown in FIG. 37, a glass or clear plastic central panel 123 can be provided as shown in FIG. 34.

Figure 39:
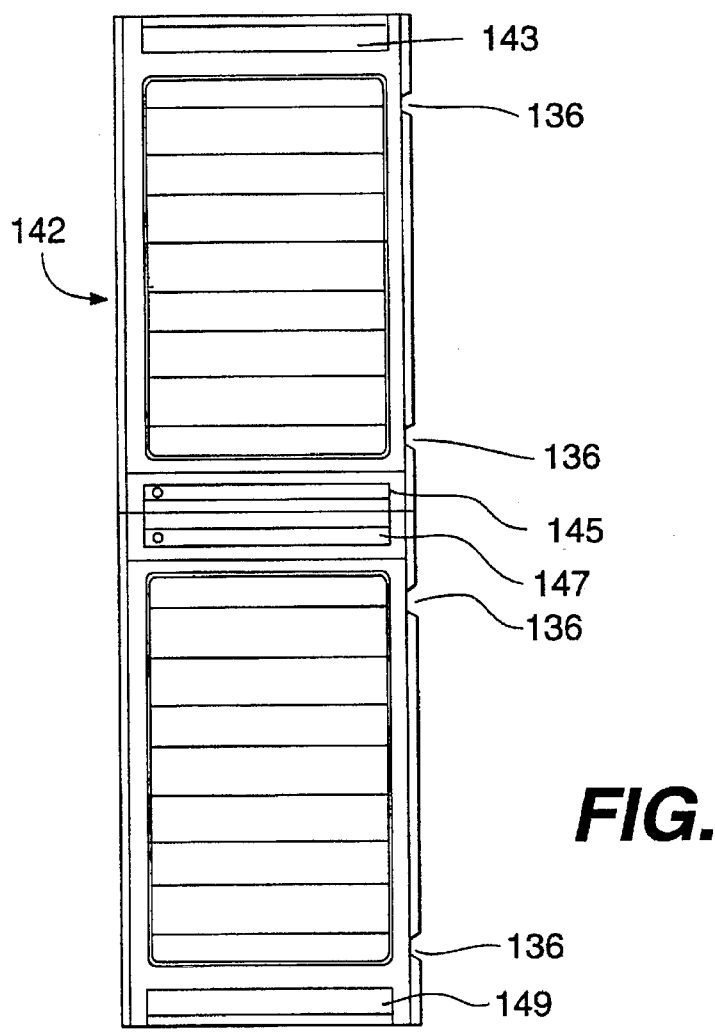
FIG. 39 is a front view of a double tall door in accordance with the present invention.
Figure 40:
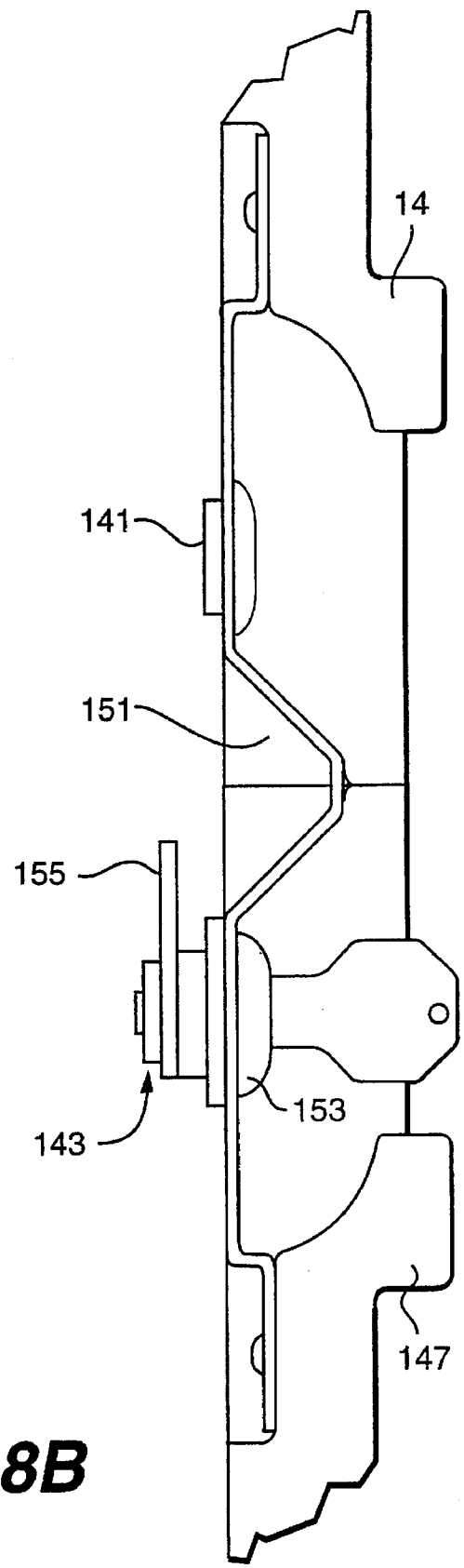
FIG. 40 is a side view of middle door handles on the double tall door shown in FIG. 39 in accordance with the present invention.

FIG. 39 is an asymmetrical double-tall door 142 that can be formed essentially by stacking two single doors 132 of the type shown in FIG. 37. The two doors are joined together to form the double-tall door by a security panel 51 in the manner shown in FIG. 40. Four molded handles 143, 145, 147 and 149 are formed on the double tall door, one at the top, one at the bottom and two in the middle portion of the door. As best seen in FIG. 40, the handles 145 and 147 at the middle portion open opposite to each other so the user will be able to easily grasp either handle. A locking mechanism 143 is mounted in the lower part of the security panel 151 in this embodiment (with a plug 41 filling a hole in the upper part of the security panel). Four hinge notches 136 are shown on the double-tall door and, as discussed above with respect to the single door, the door can be oriented to provide the hinge notches on either the right or left edge, depending on which way the door is to open.

Figure 43:
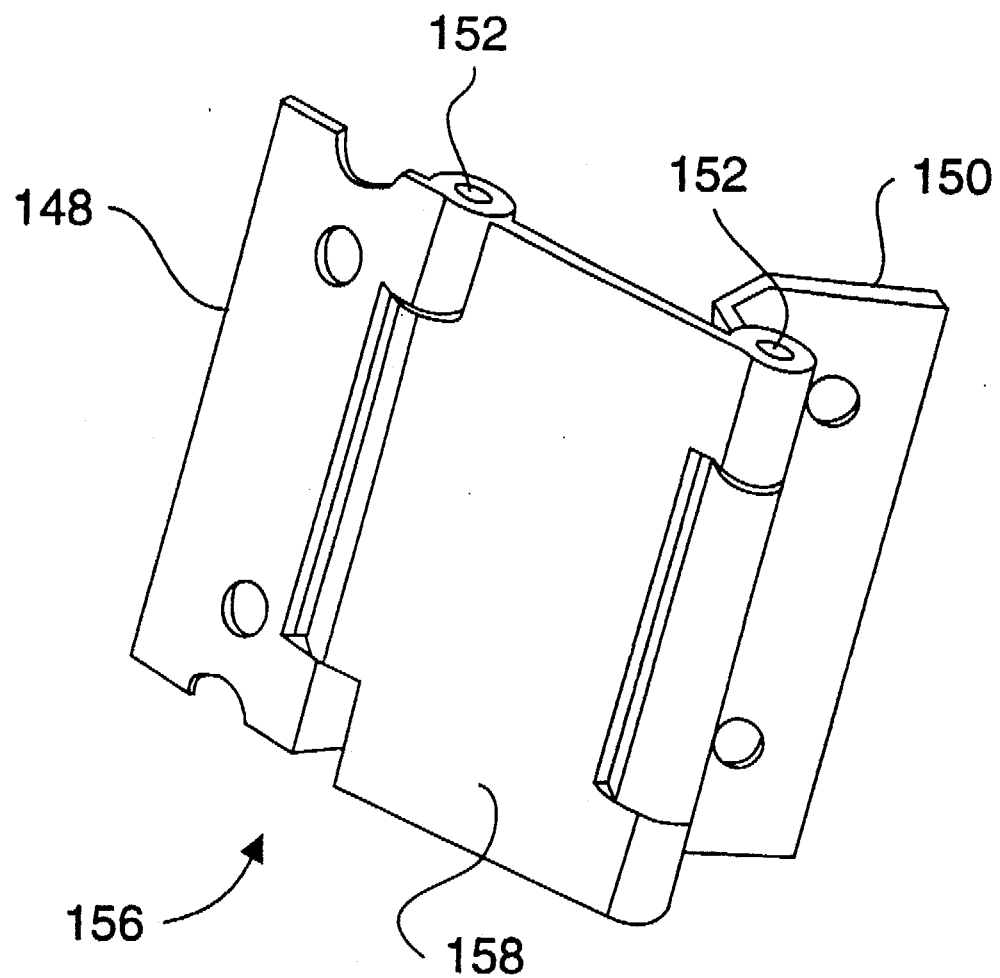
FIG. 43 is an isometric view of another type of door hinge in accordance with the present invention.

FIGS. 41 and 43 are isometric views of two different types of hinges that can be used to support the doors discussed above to the enclosed structure. FIG. 41 shows a 90° hinge 146 which permits the door to swing open approximately 90° from its closed position. This hinge is most suitable when another structure is positioned on the side of the enclosed structure that the door swings open to, i.e., on the hinged side of the door. The 90° hinge includes a flat rectangular first part 148 that is secured to the hinge notches 136 on the door and a three-sided second part 150 that is secured to the support post in a manner described below. The first and second parts are rotatably joined by a hinge pin 152. FIG. 42 is a top view of a door 132 secured to the support post 10 by the two-piece 90° hinge 146.

Figure 44:
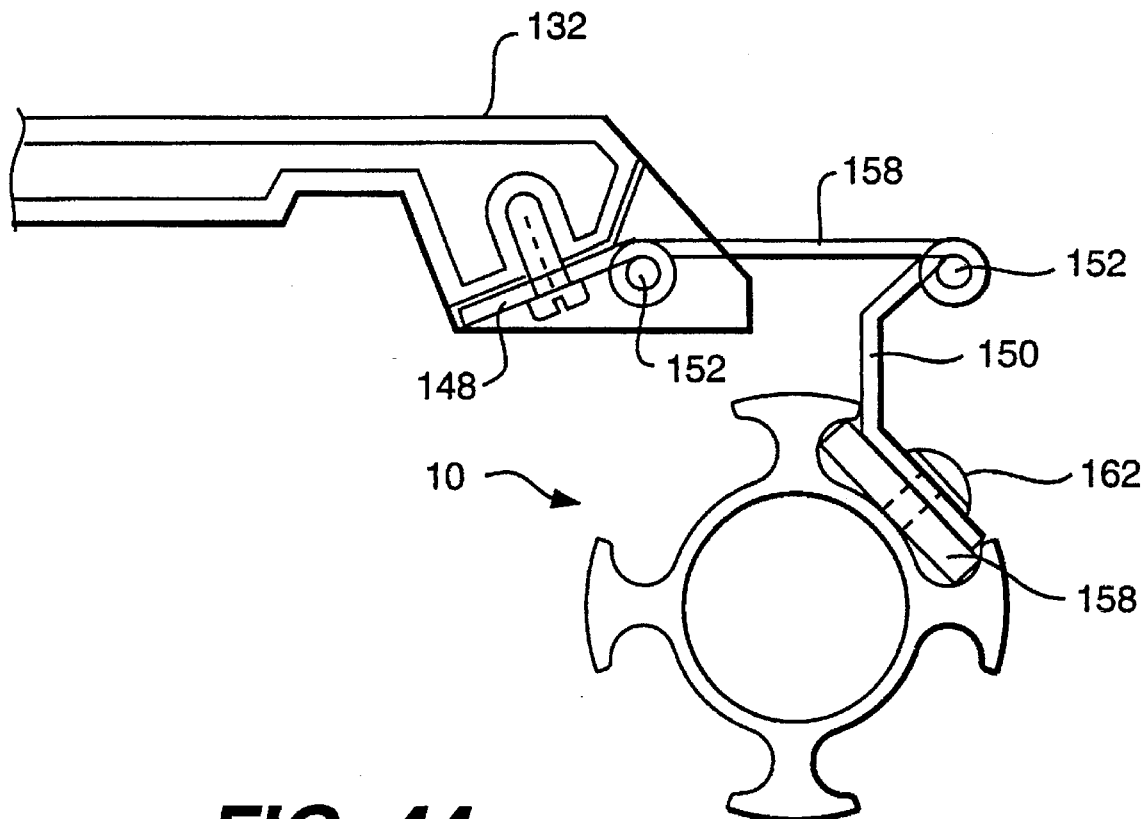
FIG. 44 is a top view of the door hinge securing a door to the support post in accordance with the present invention.

FIG. 43 depicts a 270° compound action hinge 156 for mounting the door in a manner that allows it to swing open approximately 270°. This hinge includes the same first part 148 and three-sided second part 150 that are used in the 90° hinge. In addition, a third part 158 is secured by hinge pins 152 between the first and second parts. The substantially flat third part provides an additional linkage that allows the hinge to have a greater range of motion than the 90° hinge. FIG. 44 shows a top view of the door 132 secured to the support post 10 by the 270° hinge 156.

Figure 45:
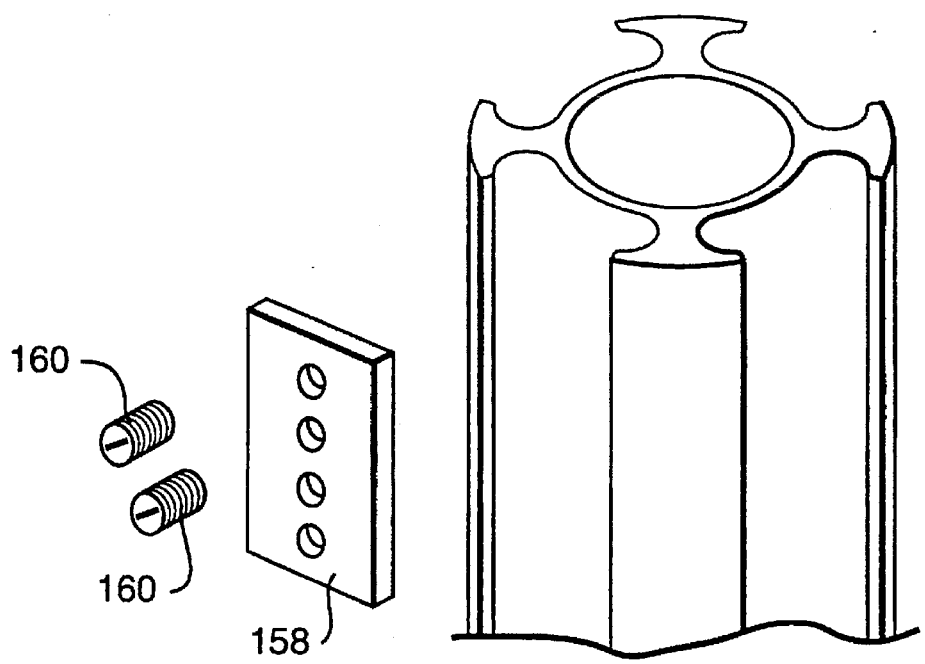
FIG. 45 is a perspective view of a mounting plate for mounting a hinge to the support post in accordance with the present invention.

Both types of hinges 146 and 156 can be secured to the support post 10 by use of a mounting plate 158 and set screws 160 as shown in FIG. 45. The mounting plate is sized such that it can be positioned within a slot 26 in the support post by rotating it slightly about its longitudinal axis. The set screws 160 are inserted to force the mounting plate against the back surface of the flanges (see FIGS. 42 and 44). The mounting plate is now secured in the support post. The second part 50 of the hinge is then secured to the mounting plate by common fasteners, such as screws 162, as best seen in FIGS. 42 and 44.

A security system with both manual and electric controls can be provided in the enclosed structure to lock and secure the drawers. In many applications, such as, for example, in hospitals, the enclosed structure is used to store and transport items such as drugs or other medicine, surgical tools, etc. in the drawers that are preferably secured to prevent unauthorized use or consumption. Generally speaking, the security system features an elongated locking bar disposed in one of the interior side panels 36. The locking bar is moved up and down along its vertical axis to actuate locking fingers, housed in the corrugations, to engage and lock the individual drawers.

The security system is housed, for the most part, in the interior side panel 36. With reference back to FIG. 7, a recessed pocket 220 on the interior side panel 36 receives and secures therein an electric motor, an electronic control card and a backup battery (all unshown in this figure). The locking bar is positioned in an extended locking finger clearance pocket 222 formed in the rear side of the interior lateral side panel. Two of these clearance pockets can be provided in the side panel, as shown in FIG. 7, to provide the option of mounting the locking bar in either side of the panel. However, only one locking bar is normally mounted in the side panel.

A front and rear view of the locking bar 224 is shown in FIGS. 46A and 46B, respectively. The elongated locking bar is preferably formed from metal, such as 0.075" steel (14 gauge), and includes two holes 225 at the top for interfacing with the mechanical locking mechanism as described below. As best seen in FIG. 46A, a plurality of locking fingers 226 are secured along the length of the locking bar. The locking fingers are evenly spaced and will be housed in corrugations 46 of the interior side panel 36 when the locking bar is properly positioned.

Figure 47:
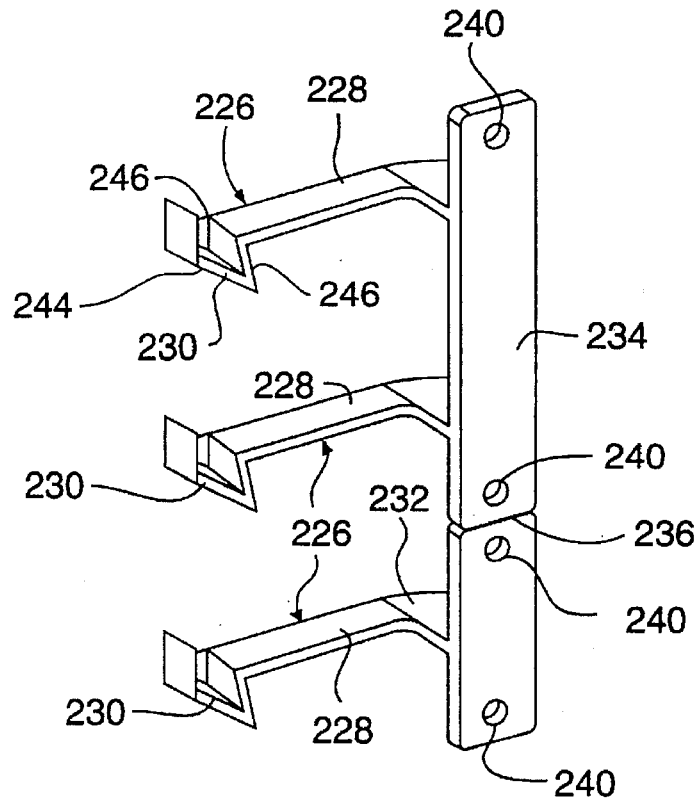
FIG. 47 is a perspective view of right side locking fingers in accordance with present invention.
Figure 48:
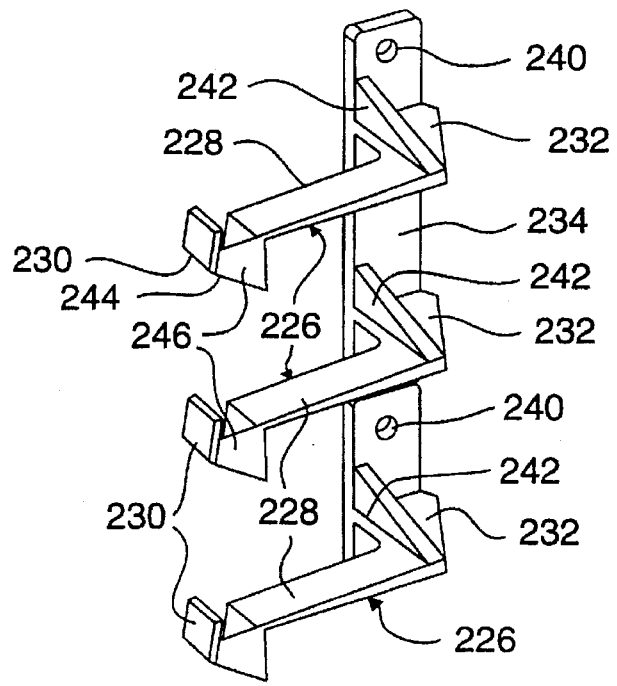
FIG. 48 is a perspective view of left side locking fingers in accordance with the present invention.

FIG. 47 illustrates a set of three "right-hand" locking fingers 226 to be secured on the locking bar 224. The right hand locking fingers will be housed in an interior side panel secured on the right side of the enclosed structure. FIG. 48 illustrates "left-hand" locking fingers for use on the left side of the enclosed structure. The fingers are preferably grouped in sets of three, or sometimes four, for ease of attachment to the locking bar. Each set of fingers is preferably an integrally formed structure made of a resilient plastic, such as nylon, to impart flexibility to the individual fingers. Each finger includes a lateral arm 228 and an angular tip 230. An extension 232 joins each arm to a common base 234. In a three-finger set, as shown in FIG. 47, the base 234 includes one scored section 236 for separating the fingers as necessary. The base 234 includes a plurality of holes 240 for receiving rivets or other fasteners for attaching the locking fingers to the locking bar. In addition, a rib 242, which is best seen in the left-hand fingers shown in FIG. 48, can also be provided as a stabilizer. The angular tip 230 includes an angled face 244 and an abutting face 246, with a front face 244 joining the angled and abutting faces.

Figure 49:
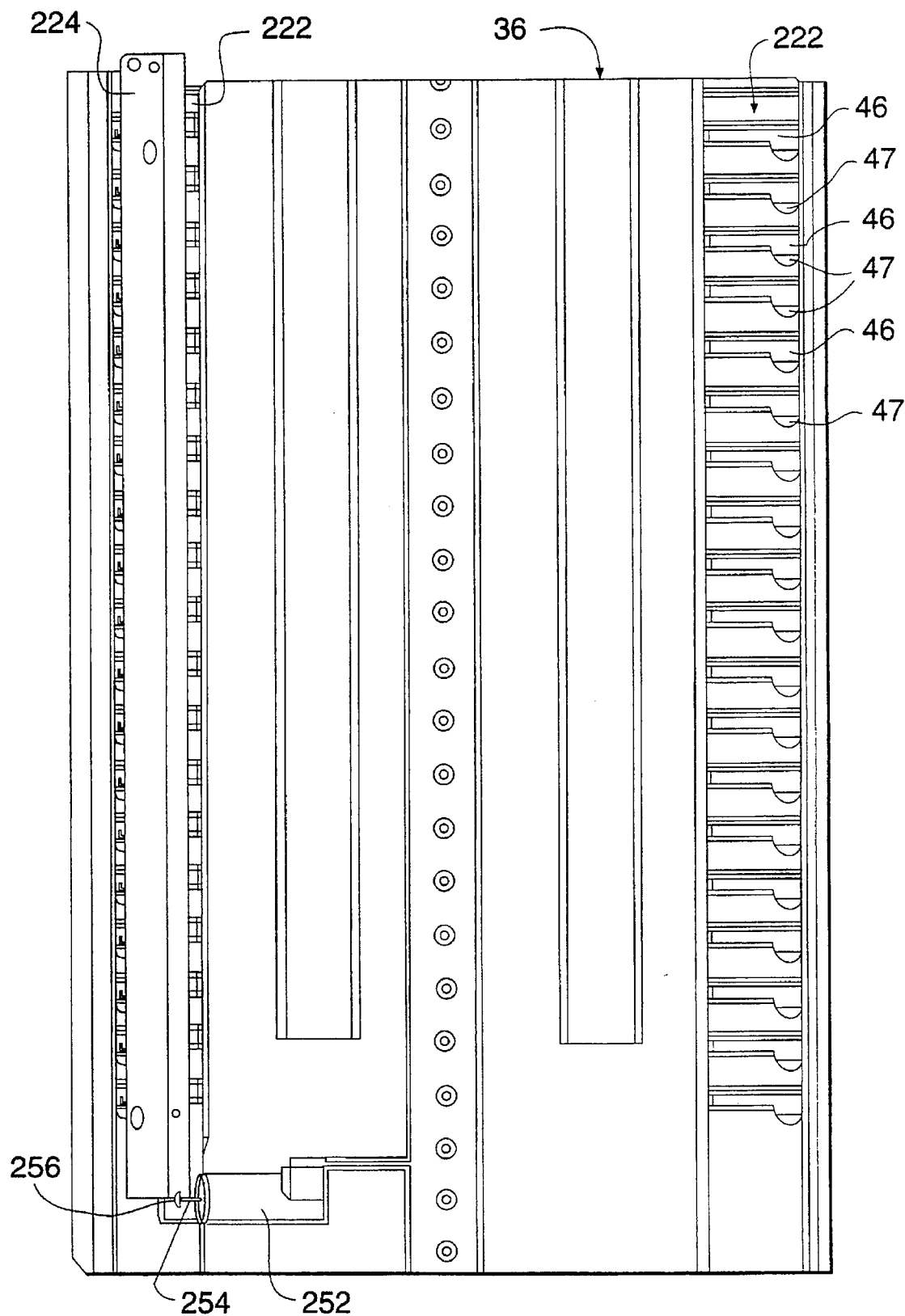
FIG. 49 is a rear elevational view of the corrugated interior panel in accordance with the present invention.

FIG. 49 is a rear view of the interior side panel 36, showing the locking bar 224 positioned in the locking finger clearance pocket 222 in the left side (from the rear view) of the panel. As will be appreciated by those skilled in the art, the side panel in FIG. 49 can be formed by a combination of blow molding and compression molding. The middle portion of the panel is hollow as a result of the blow molding. However, a subsequent processing, such as machining or compression molding, forms the locking finger clearance pockets 222 on the right and left sides of the panel. Part of the corrugations 46 can be seen in the locking finger clearance pockets. As seen from this view, each corrugation has an opening 47 in its underside, with the opening extending in a semicircular shape to a lateral face of the side panel immediately below the corrugation. When the locking bar is positioned in the clearance pocket, as shown in the left side of the side panel in FIG. 49, a locking finger 226 is positioned in each corrugation. A partial front view of the corrugated side panel 36 with two locking fingers 226 positioned in corrugations is shown in FIG. 50. In this figure, the locking fingers are extending through the openings 47 in the underside of the corrugations, and thus in their locked position.

With reference to FIG. 49, the lower end of the locking bar is operably engaged to an electric motor 252. The electric motor and an unshown battery operate to actuate the locking bar 224 up and down along its longitudinal axis. A rotatable shaft 254 extends from the motor and has mounted thereon a cam 256 for engaging the locking bar. A shown in FIG. 51, the cam can have a propeller-like shape so that each quarter turn of the shaft will raise or lower the locking bar.

The electronic motor and the battery are controlled by an electronic locking mechanism that will be described below in detail. When the motor is operated to actuate the locking bar, the locking fingers likewise move up or down to extend the tip 230 either in or out of its respective corrugation. When the locking bar is in the "down", or home, position, the locking finger tips 230 extend through the openings 47 and engages the notched channel 73 (see FIGS. 18A and 18B) in the drawer frame. In this locked position, the notched channel is engaged by the abutting face 246 of the locking finger and the drawer cannot be withdrawn. However, when the locking bar is raised and thus in the up, or unlocked, position, the locking finger tips 230 are retracted within the corrugations and the drawers slide freely in and out of enclosed structure.

In accordance with the subject invention, even if the drawer is not fully inserted in the enclosed structure, i.e., the drawer is open, when the locking bar is in the locked position, the drawer can subsequently be closed and will automatically lock. This feature is made possible by the shape and flexibility of the locking fingers. When an open drawer is closed when the locking bar is locked, the side rail 71 of the drawer frame will abut the angled face 244 of the locking fingers. The angled face permits the sliding drawer to impart an upward force to the locking finger, which in response will flex upwardly and allow the drawer to continue sliding until the notched channel 73 receives the finger tip 230. At this point, the locking finger will return to its unbiased state and lock the drawer.

Figure 52:
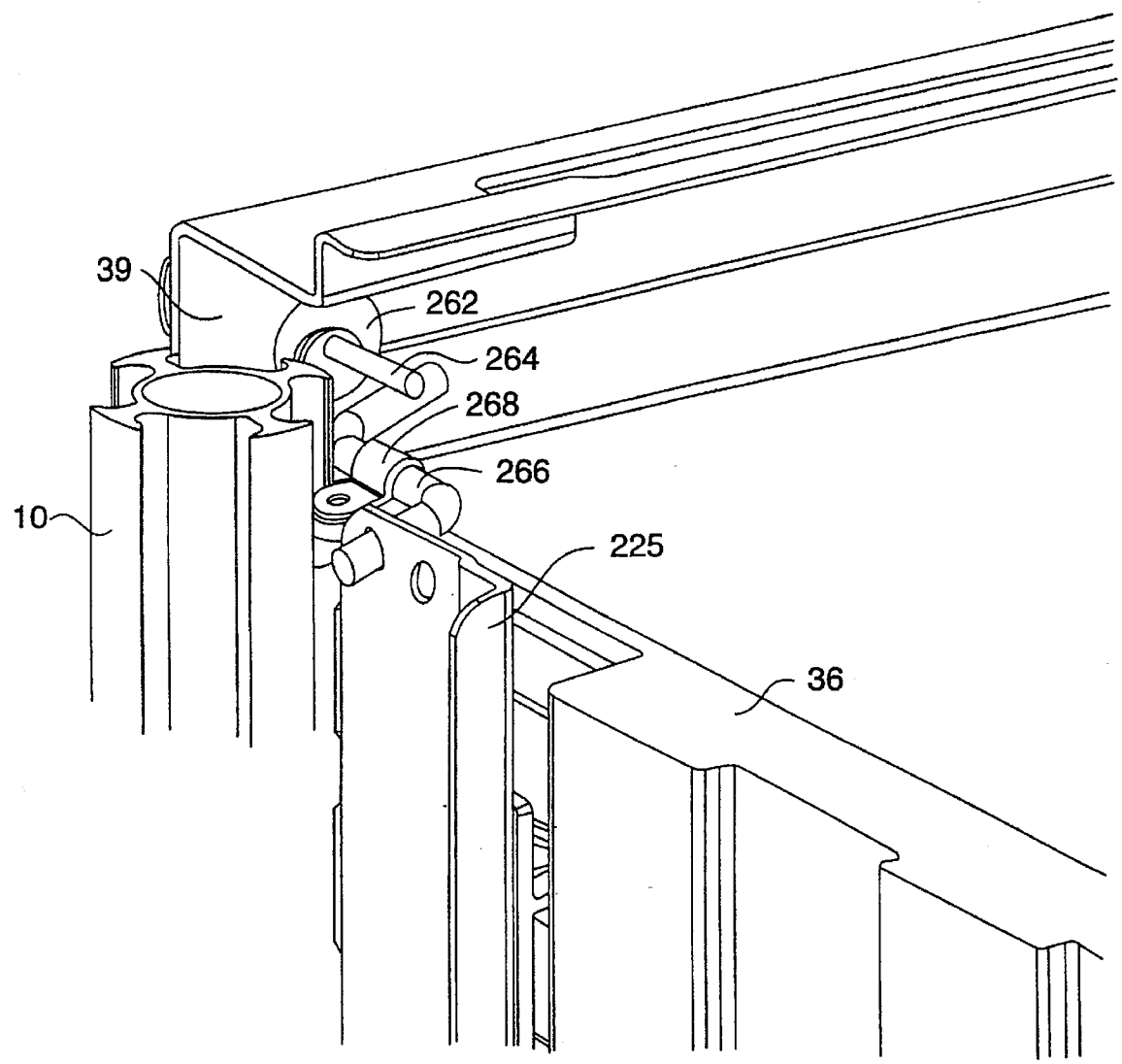
FIG. 52 is a perspective view of a front corner of the enclosed structure showing the locking bar in operable engagement with a mechanical locking mechanism in accordance with the present invention.

While the locking bar 224 can be actuated by the electric motor, it can also be actuated by operation of a mechanical locking mechanism. With reference to FIG. 52, the independent mechanical locking mechanism 39 includes a key-operated lock 262 and a pin 264 extending from the lock. An S-shaped link 226 is secured to the interior side panel 36 by a retainer clip 268. One end of the link extends through the hole 225 in the top end of the locking bar and the other (second) end of the link is in contact with the pin 264. To raise the locking bar and lift the locking fingers, thus unlocking the enclosed structure, a key is inserted into the lock and turned to rotate the pin in the clockwise direction. This clockwise movement lowers the second end of the link 264 and therefor raises the first end of the link to lift the locking bar.

Figure 53:
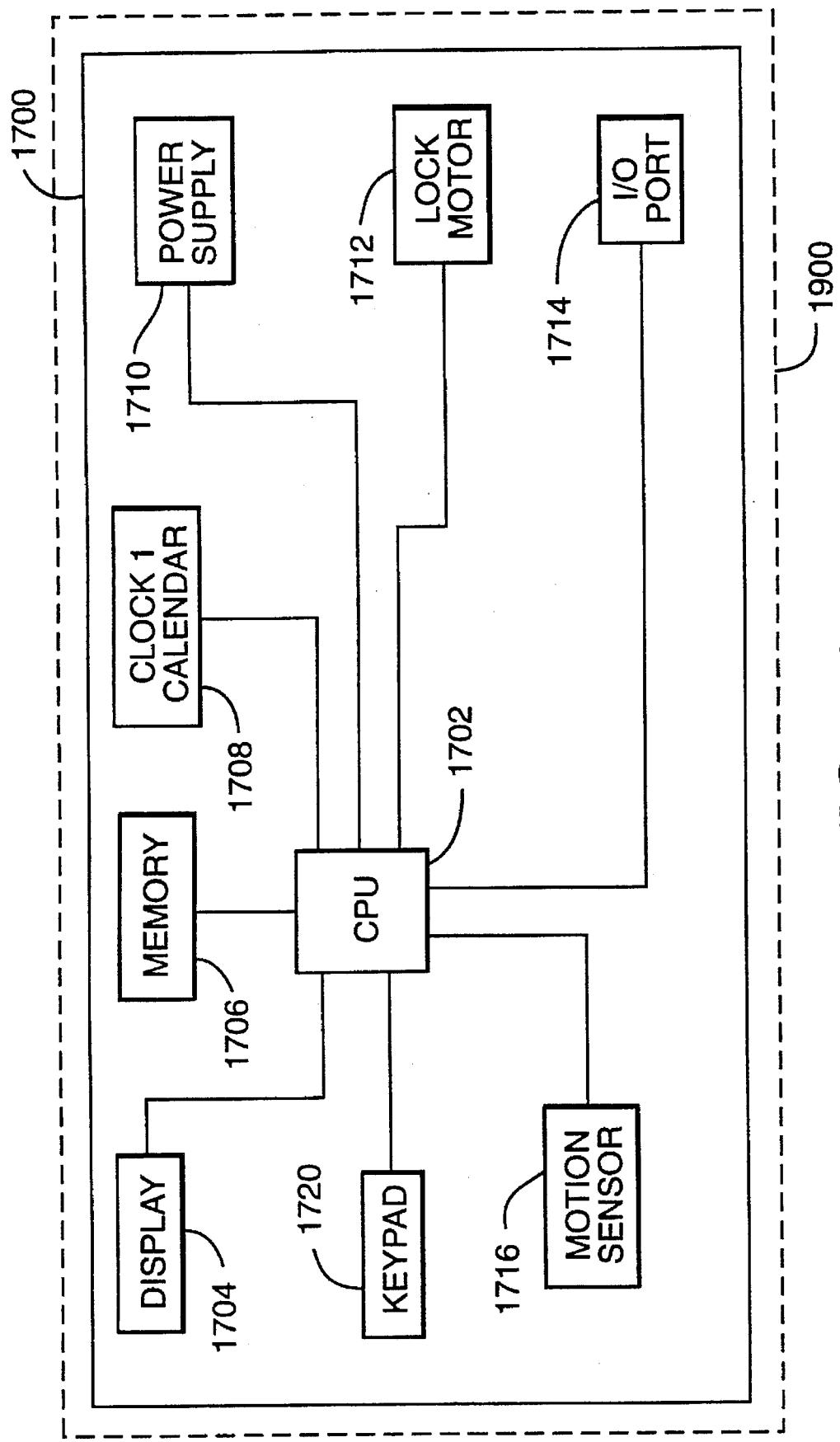
FIG. 53 is a block diagram of the security system in accordance with the present invention.

The electronic locking mechanism is operated by an electronic control system. In FIG. 53, reference numeral 1900 schematically represents the cart or other enclosed structure, reference numeral 1700 represents the electronic control system for controlling the security system, reference numeral 1702 represents the central processing unit (CPU), reference numeral 1704 represents a display, reference numeral 1706 represents memory, reference numeral 1708 represents a clock and calendar, reference numeral 1710 represents a power supply, reference numeral 1712 represents a lock motor, reference numeral 1714 represents an input and output port (I/O port), reference numeral 1716 represents a motion sensor, reference numeral 1718 represents a battery warning light, and reference numeral 1720 represents a keypad. Each of the items identified above are shown in block outline because they are well known, per se, and a specific type of construction is not critical to carrying out the invention or to a disclosure of the best mode for carrying out the invention.

Figure 62:
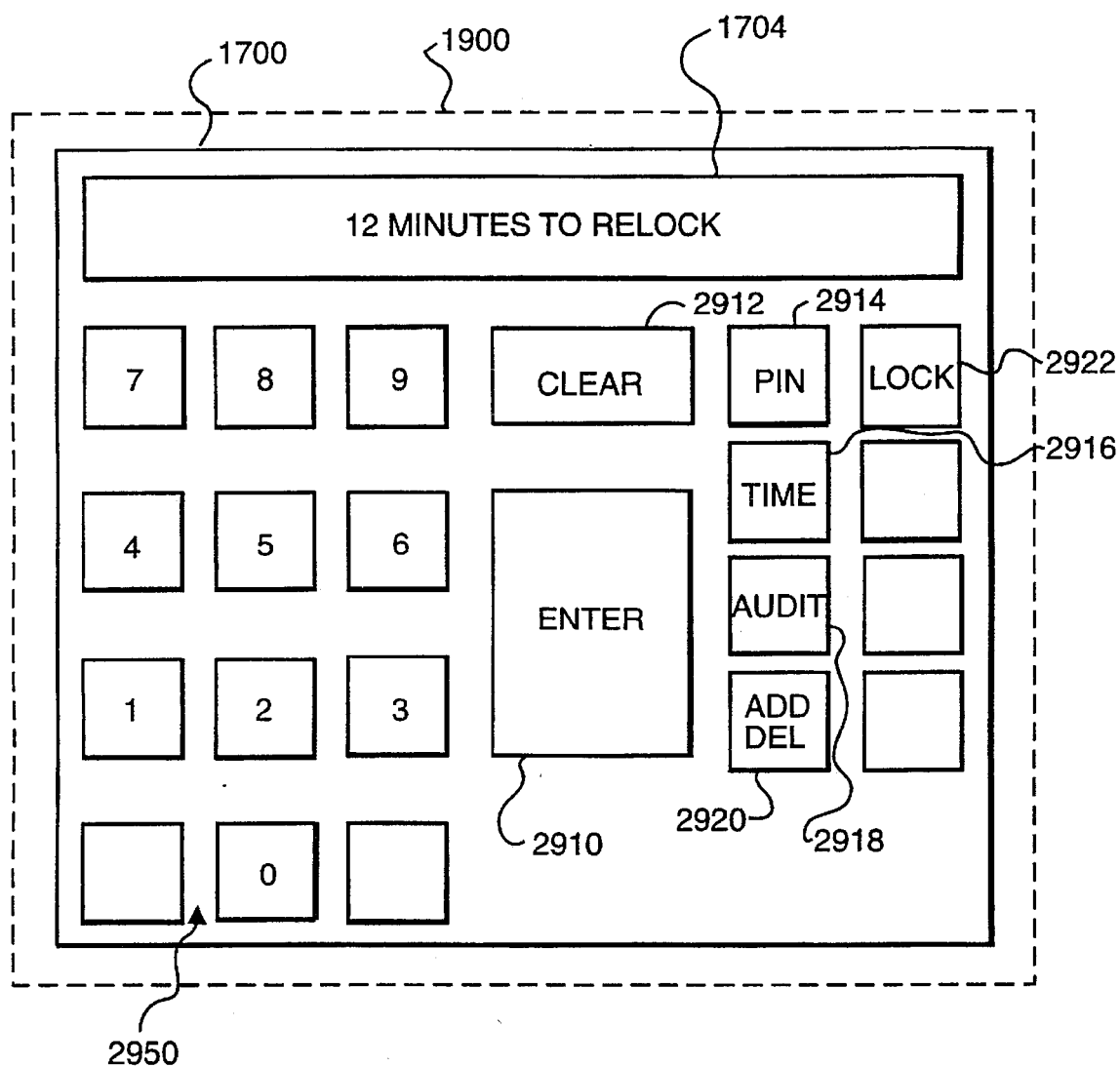
FIG. 62 is a schematic illustration of the keypad and display in accordance with the present invention.

In more detail, CPU 1702 preferably comprises a microprocessor or the like, and is connected to display 1704, memory 1706, clock/calendar 1708, power supply 1710, lock motor 1712, I/O port 1714, motion sensor 1716, and keypad 1720. Display 1704 comprises a 16 character alphanumeric LCD display or the like and includes a battery warning light, and is also shown in FIG. 62. Memory 1706 comprises non-volatile memory, RAM, ROM, and the like. Power supply 1710 preferably comprises a rechargeable nicad battery, featuring unattended fast charging with automatic kick-down to standby charging. Power supply 1710 also allows for connection for wall powered use independent from battery presence or charge level. The power supply comprises circuity (not shown) to survive accidental connection to other than a supplied wall transformer, e.g., A.C. or D.C. of less than 30 volts. Furthermore, the power supply 1710 also comprises a backup lithium cell, preferably with a life expectancy of over five years. The lock motor 1712 is protected from peak turn on current by an active current limiting circuit (not shown). I/O port 1714 comprises a standard port for interconnection with a personal computer. Motion sensor 1716 is optional and could comprise, for example, a circuit using a limit switch that detects if the lock bar has reached an expected position. Keypad 1720 (FIGS. 53 and 62) preferably comprises a membrane touchpad with ENTER key 2910, CLEAR key 2912, 0 through 9 keys generally shown as 2950, and other operation keys including a LOCK key 2922, PIN key 2914, TIME key 2916, AUDIT key 2918, and ADD/DEL key 2920. The battery warning light on the display 1704 is illuminated by CPU 1702 if the battery power is below a predetermined level.

Figure 54:
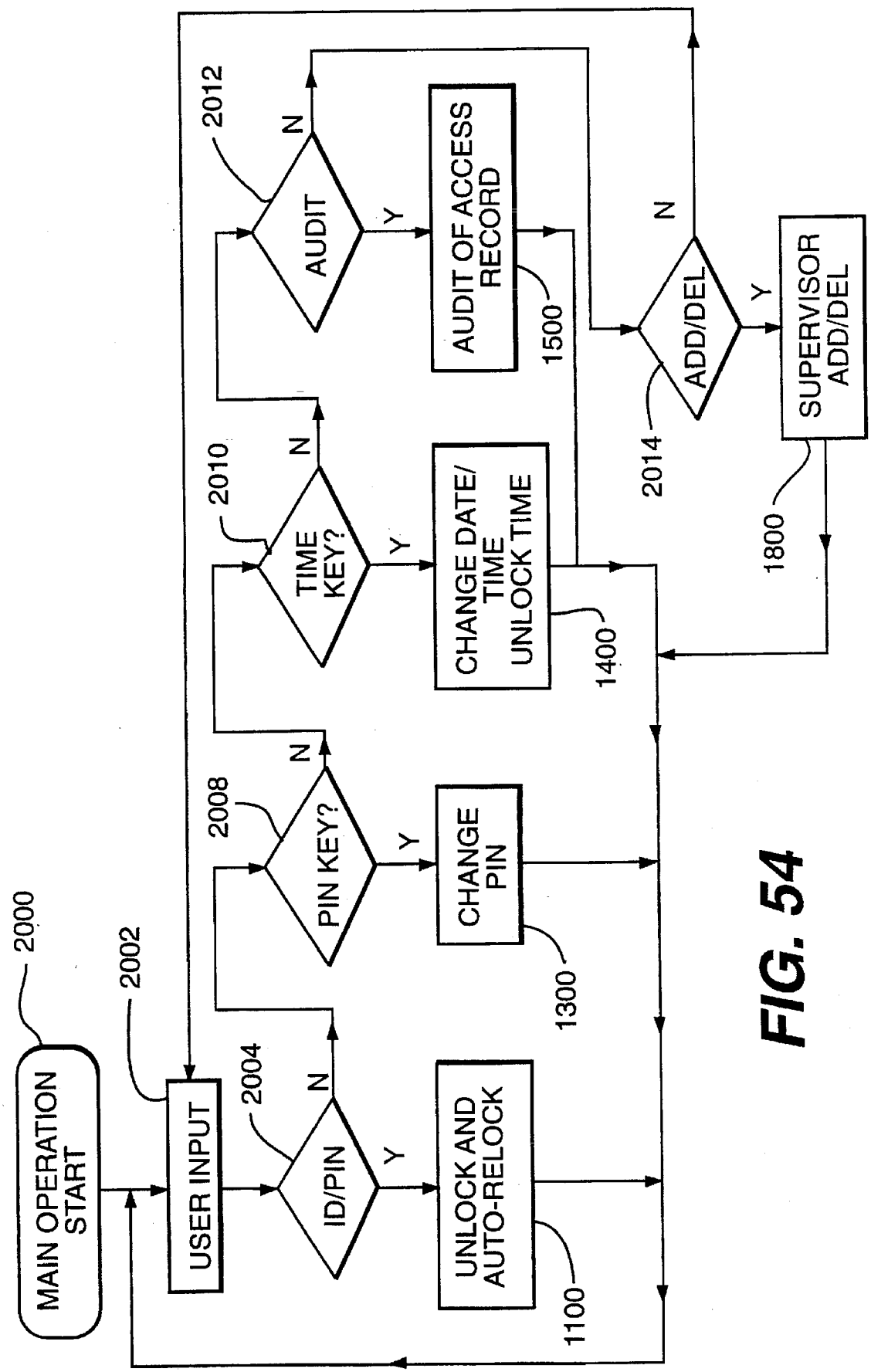
FIG. 54 is a flowchart of the operation of the security system in accordance with the present invention.

A control program for the electronic control is stored in memory 1706, and preferably in non-volatile memory. The control program serves to perform locking, unlocking, and various supervisory functions in response to user input from keypad 1720. FIG. 54 depicts a flowchart representing the main operation of the control program. When left unattended, the system enters into a sleeping, or stand-by, mode to conserve power. User input, as in step 2002 in FIG. 54, awakens the system, which then performs functions in accordance with the keys pressed.

Figure 56:
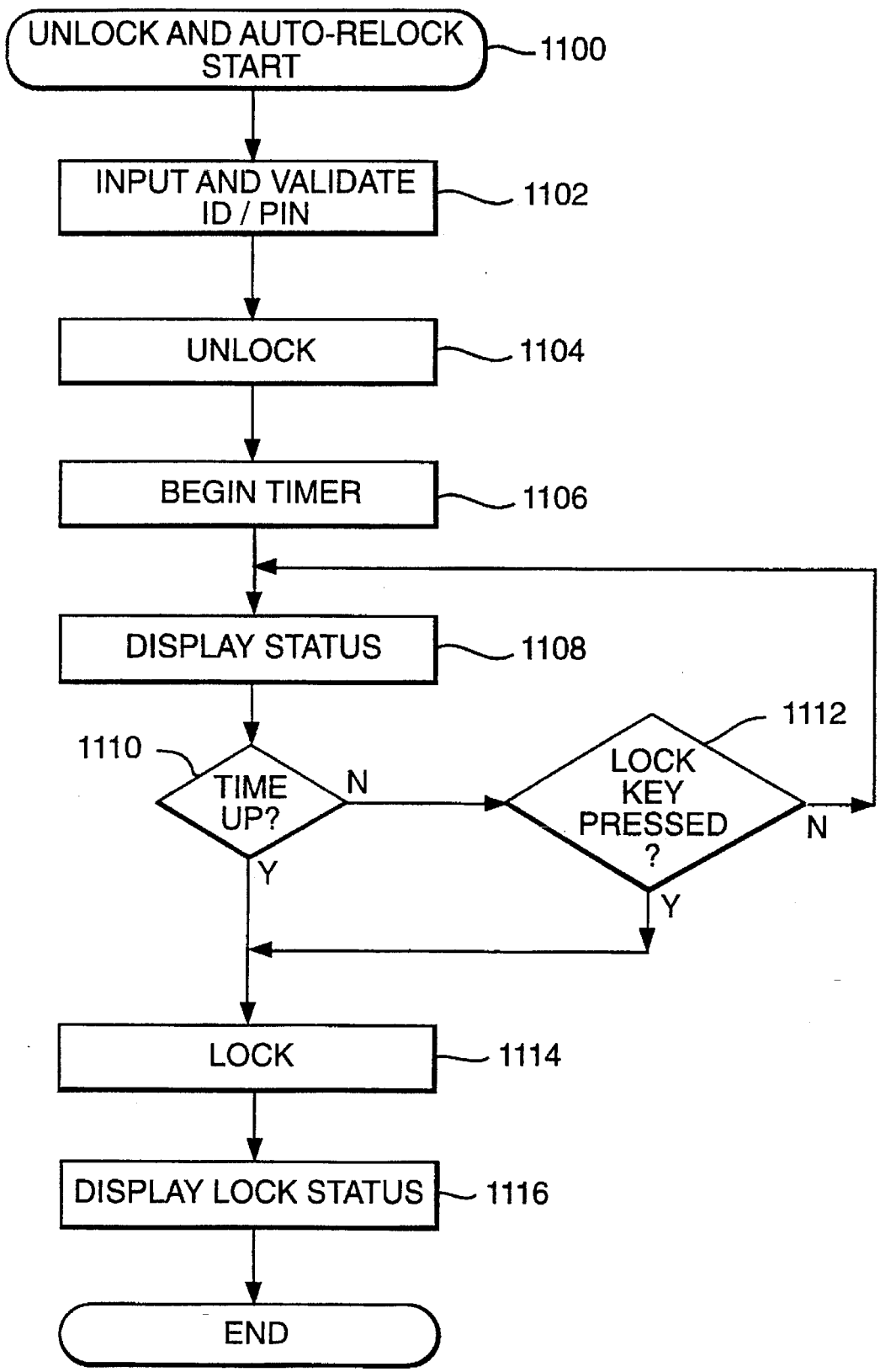
FIG. 56 is a flowchart of the unlock and auto-relock routine in accordance with the present invention.

If the user presses the 0–9 keys on keypad 1720, the control program branches in step 2004 (FIG. 54) to an unlock and auto-relock routine 1100. Turning to FIG. 56, in step 1102, the program inputs the ID and PIN from keypad 1720.

Figure 55:
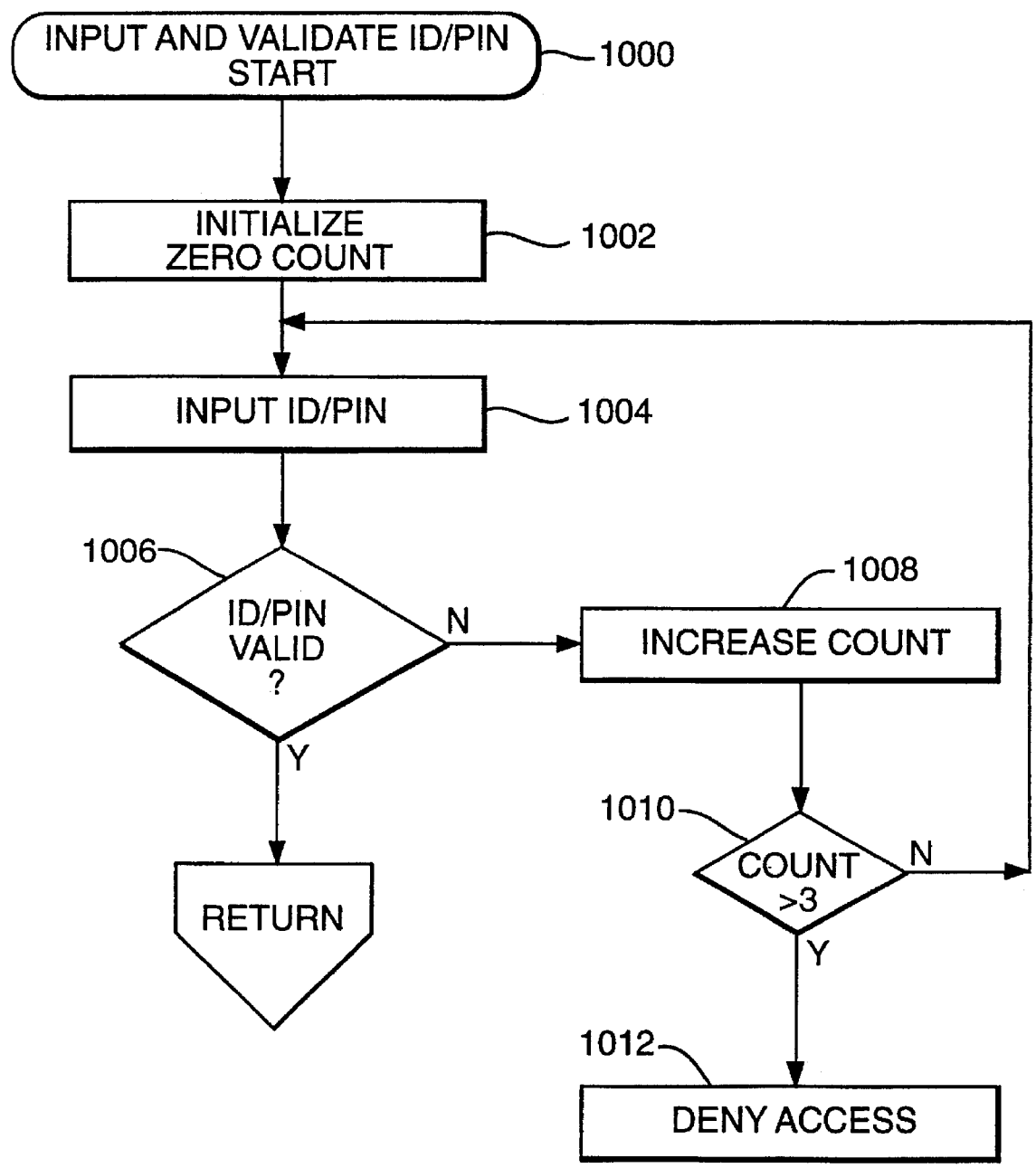
FIG. 55 is a flowchart of a routine for input and validation of the ID/PIN in accordance with the present invention.

Step 1102 is shown in more detail in FIG. 55. FIG. 55 depicts a routine for inputting and validating the ID/PIN. Step 1002 sets a count variable to zero. The program inputs the ID and PIN in step 1004. The ID comprises a two digit number (00–99), and the PIN comprises a four digit number (0000–9999). Together, the ID and PIN comprise a user code. Of course, these choices are exemplary and could be changed to allow any specified number of digits for each of the ID and PIN. In any case, if the ID and PIN are found to be valid in step 1006, then the routine returns. If the ID and PIN are not found to be valid in step 1006, then control branches to step 1008, where the count variable is increased. If the count variable is found to be greater than three in step 1010, then access is denied in step 1012. In step 1012, the security system will remain locked for a supervisory-selectable number of minutes (LOCKOUT TIME). However, if the count variable is found to be less than or equal to three in step 1010, then the routine returns to step 1004 to allow the user to enter the ID and PIN again.

Assuming that the user has entered a valid ID/PIN, the FIG. 55 routine for inputting and validating the ID/PIN returns to the FIG. 56 unlock and auto-relock routine, as discussed above. The unlock and auto-relock routine in FIG. 56 continues processing with step 1104. In step 1104, the CPU 1702 controls the lock motor 1712 to unlock the cart. In step 1106, the control program begins a timing operation. To inform the user of the remaining time, the CPU 1702 controls the display 1704 to display a status message. The status message preferably includes an alternating display of "XX MIN TO RELOCK" and "BATTERY E(****)F", wherein XX represents the number of minutes until auto-relock, and the latter display represents the amount of charge remaining on the battery (hereinafter referred to as the "battery charge message"). Step 1100 checks to see if the time is up, i.e., if the time has reached an AUTO-RELOCK TIME. This time can be changed by a user's supervisor for security purposes. If time is not up in step 1110, then in step 1112, it is checked whether the LOCK key has been pressed. If not, then the program returns to display status step 1108. Once time is up in step 1110, or if the lock key has been pressed in step 1112, then CPU 1702 controls lock motor 1712 in step 1114 to lock the cart. When the cart has been locked, CPU 1702 controls display 1704 to display a lock status display, preferably for about 15 seconds, after which the display is shut off. The lock status display preferably comprises an alternating "LOCKED" message and the above-described battery charge message.

If the optional motion sensor 1716 is included in the electronic control system, then the control program being executed by CPU 1702 uses the motion sensor 1716 to determine if the locking operation was successful. Specifically, in step 1114, after the CPU 1702 has controlled lock motor 1712 to lock the cart, the CPU receives signals from motion sensor 1716 representative of a state of the limit switch. If the limit switch (not shown) remains open for 12 seconds, for example, the motor is turned off, and then step 1116 displays an "UNLOCK ERROR" rather than the above-discussed lock status display. Such unlock errors are stored in memory 1706, preferably in non-volatile memory. The motion sensor operates in the same manner to determine if an unlocking operation was successful, i.e., if the limit switch does not change states after 12 seconds, the motor is turned off and an error signal is displayed and stored in memory 1706.

While the cart is unlocked, and the unlock and auto-relock routine in FIG. 56 is operating, the other functions of the main operation of the control program (FIG. 54) are available on an interrupt basis. Specifically, while the unlock and auto-relock routine in FIG. 56 is passing through the steps 1108, 1110, and 1112, if the user presses any of the function keys (e.g., ADD/DEL, TIME, etc.), that respective routine (e.g., ADD/DEL, TIME, etc.) will be performed. Thereafter, the flow returns to the unlock and auto-relock routine and the timer (step 1106) is reset to begin counting down again from the maximum, predetermined auto-relock time.

Figure 57:
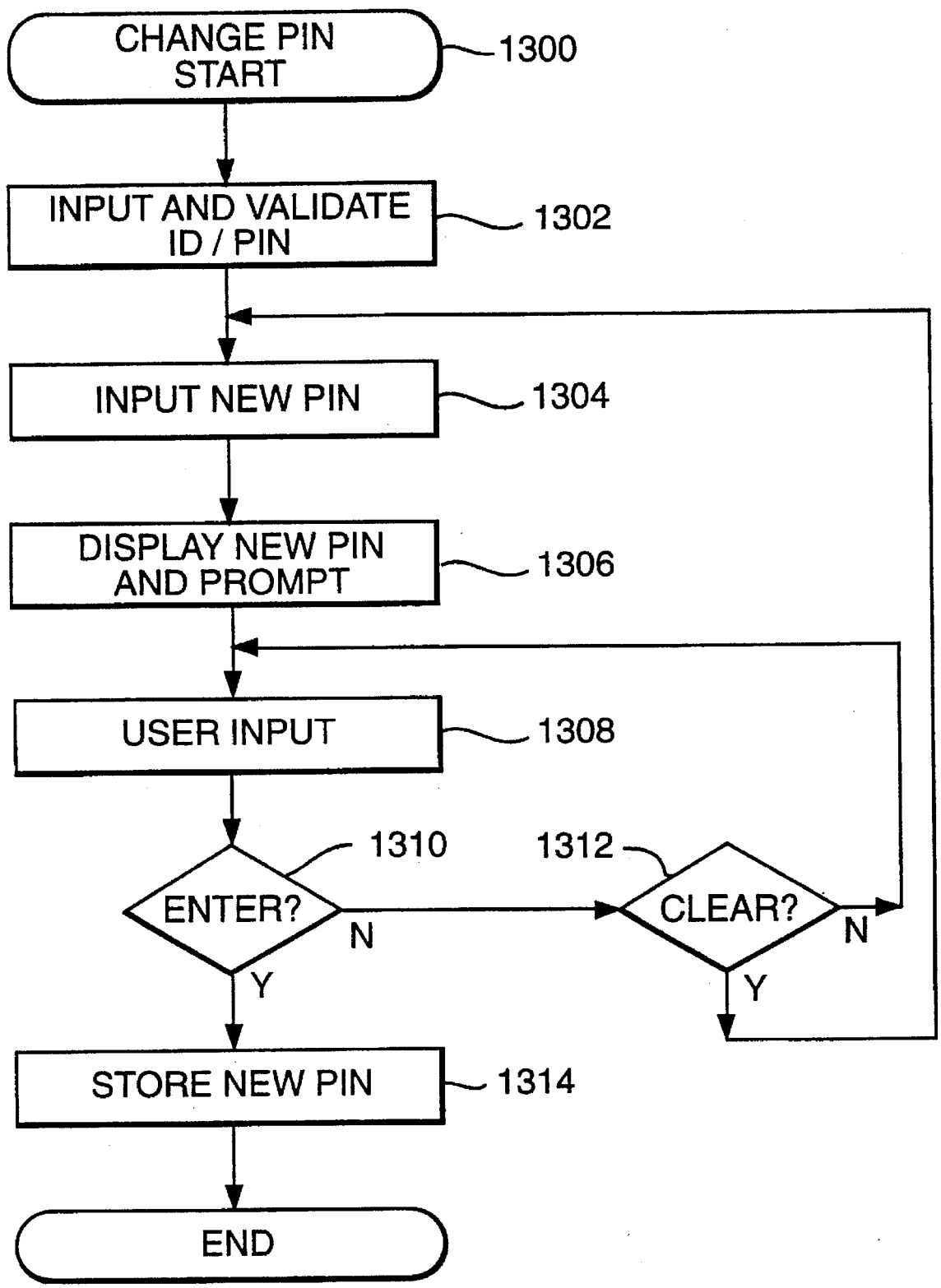
FIG. 57 is a flowchart of the change PIN routine in accordance with the present invention.

To unlock the cart, the user must enter a PIN, as described above; however, the user may wish to change his or her PIN for security purposes. Also, the supervisor may wish to change a user's PIN. FIG. 57 shows a "change PIN" routine 1300. This routine would be selected, as shown in FIG. 54, if the PIN key is pressed (step 2008). Returning to FIG. 57, in step 1302, the user (or supervisor) enters the user code (ID/PIN). Step 1302 follows the procedure of FIG. 55, as described above. Assuming that a valid ID/PIN has been entered, in step 1304 the prompt "NEW PIN" is displayed on display 1704, and the user may input a new PIN via keypad 1720. The new PIN is displayed in step 1306, by an alternating display between "NEW PIN: ####" and "ENTER OR CLEAR." User input is accepted in step 1308 (during which time the alternating display continues). In step 1310, if the ENTER key has been pressed, then the new PIN is stored in step 1314. If in step 1310, the ENTER key has not been pressed, then it is determined in step 1312 if the CLEAR key has been pressed. If so, the routine returns to step 1304 to input a new PIN (although not shown, if the user presses the CLEAR key twice, the routine ends). If the user has not pressed CLEAR (step 1312), then the user has pressed neither CLEAR nor ENTER, therefore the routine returns to step 1308.

Figure 58:
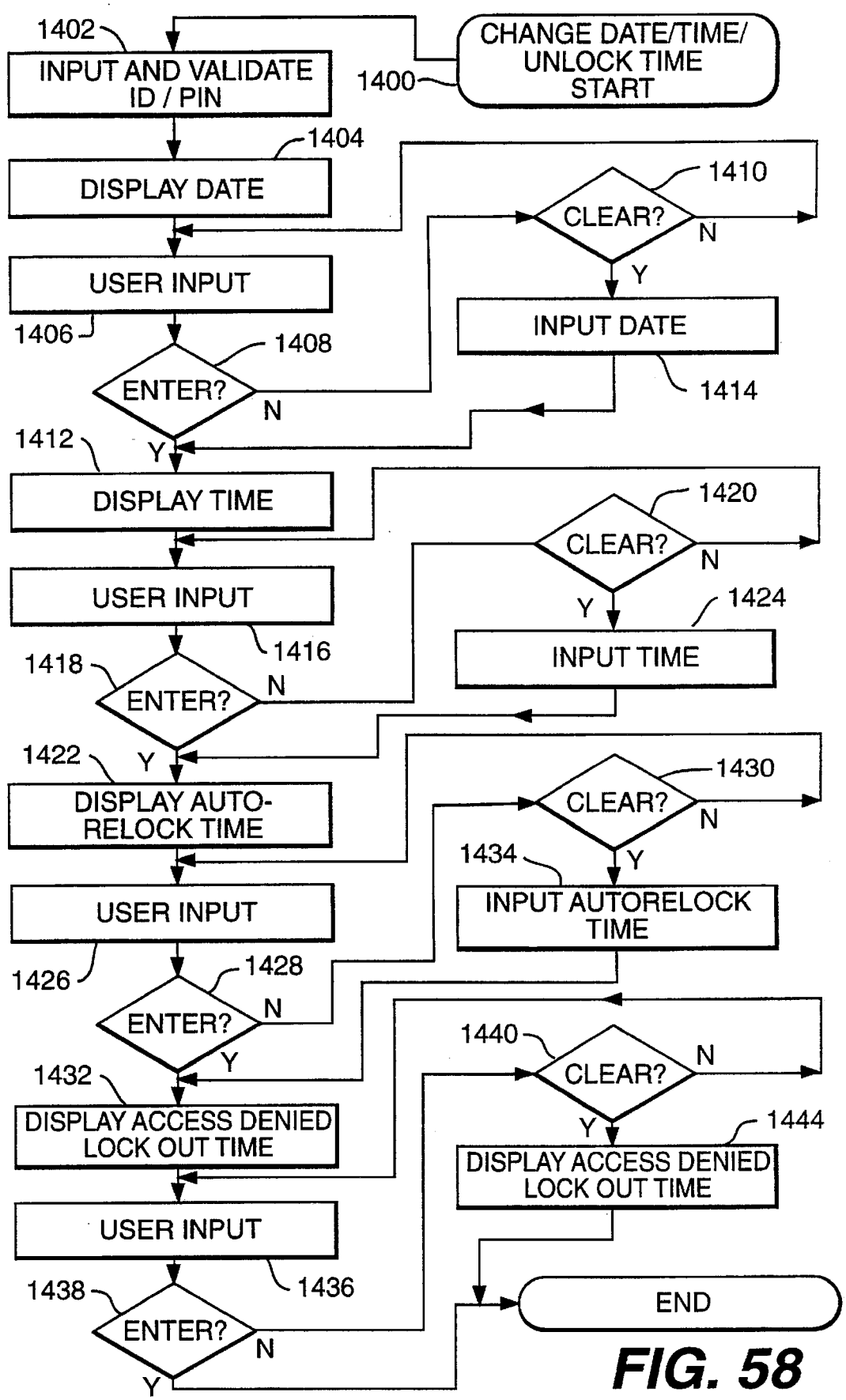
FIG. 58 is a flowchart of the change date/time/unlock time routine in accordance with the present invention.

Returning to FIG. 54, if the PIN key has not been selected in step 2008, then step 2010 determines if the TIME key has been selected. If so, then the change date/time/unlock time routine of step 1400 is selected. FIG. 58 depicts this routine in detail. First, a valid ID/PIN is input in step 1402. The current date is displayed in step 1404, e.g., by an alternating display of "DATE—##/##/##" and "ENTER OR CLEAR", which display continues during user input in step 1406. If ENTER has been pressed (step 1408), then the date is presumed to be correct, and the routine continues with step 1412. If ENTER has not been pressed (step 1408), then the CLEAR key is checked in step 1410. If the CLEAR key has not been pressed, the routine returns to step 1406. If the CLEAR key has been pressed, then flow passes to step 1414, wherein the user may enter the date.

Figure 59:
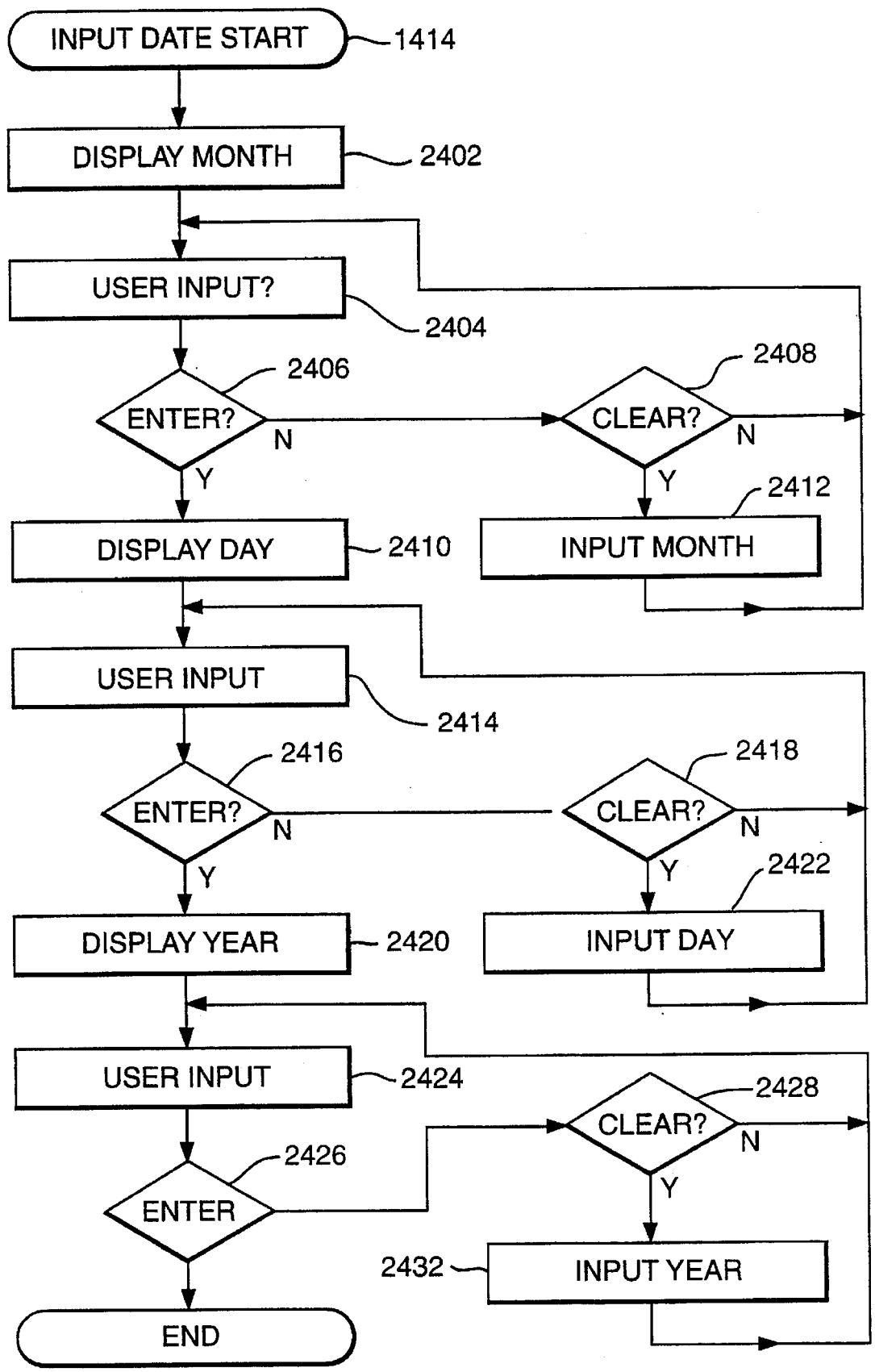
FIG. 59 is a flowchart of the input date routine in accordance with the present invention.

Step 1414 is shown in more detail in FIG. 59. In step 2402, the month is displayed, e.g., by an alternating display of "MONTH: ##(01–12)" and "ENTER OR CLEAR", which display continues during user input step 2404. If neither ENTER nor CLEAR (steps 2406 and 2408) have been pressed, then flow returns to step 2404. If CLEAR has been pressed (steps 2406, 2408), then the month is input in step 2412, and flow returns to step 2404. If ENTER has been pressed (step 2406), then flow continues with step 2410.

In step 2410, the day is displayed, e.g., by an alternating display of "DAY: ## (01–31)" and "ENTER OR CLEAR", which display continues during user input step 2414. If neither ENTER nor CLEAR (steps 2416 and 2418) have been pressed, then flow returns to step 2414. If CLEAR has been pressed (steps 2416, 2418), then the day is input in step 2422, and flow returns to step 2414. If ENTER has been pressed (step 2416), then flow continues with step 2420.

In step 2420, the year is displayed, e.g., by an alternating display of "YEAR: ## (00–99)" and "ENTER OR CLEAR", which display continues during user input step 2424. If neither ENTER nor CLEAR (steps 2426 and 2428) have been pressed, then flow returns to step 2424. If CLEAR has been pressed (steps 2426, 2428), then the year is input in step 2432, and flow returns to step 2424. If ENTER has been pressed (step 2426), then the flow ends.

After routine 1414 (FIG. 59) ends, flow returns to step 1412 in FIG. 58. In step 1412, an alternating display of "TIME: ##:##" and "ENTER OR CLEAR" begins, and continues during user input step 1416. If neither ENTER nor CLEAR are pressed (steps 1418, 1420), flow returns to step 1416. If CLEAR is pressed (steps 1418, 1420), then the time is input in step 1424. If ENTER is pressed (step 1418), or the time has been input in step 1424, then flow continues with step 1422. Although not depicted herein, input time step 1424 is similar in function to input date step 1414, with the difference being that HOURS (00–24) and MINUTES (00–59) are input.

In step 1422, an alternating display of "RELOCK: ## MIN" and "ENTER OR CLEAR" begins, and continues during user input step 1426. If neither ENTER nor CLEAR are pressed (steps 1428, 1430), flow returns to step 1426. If CLEAR is pressed (steps 1428, 1430), then the AUTO-RELOCK TIME is input in step 1434. If ENTER is pressed (step 1428), or the auto-relock time has been input in step 1434, then flow continues with step 1432. Although not depicted herein, input auto-relock time step 1434 is similar in function to input date step 1414, with the difference being that AUTO-RELOCK TIME (01–99 minutes) is input. As described above, once the cart has been unlocked for an amount of time equal to the AUTO-RELOCK TIME (see FIG. 56, step 1100), then the cart is automatically locked.

In step 1432, an alternating display of "LOCKOUT: ## MIN" and "ENTER OR CLEAR" begins, and continues during user input step 1436. If neither ENTER nor CLEAR are pressed (steps 1438, 1440), flow returns to step 1436. If CLEAR is pressed (steps 1438, 1440), then the LOCKOUT TIME is input in step 1444. If ENTER is pressed (step 1438), or the lockout time has been input in step 1444, then flow of the routine ends. Although not depicted herein, input lockout time step 1444 is similar in function to input date step 1414, with the difference being that LOCKOUT TIME (01–99 minutes) is input. As described above, if invalid ID/PINs are thrice entered, then the system enters an access-denied/lockout state (FIG. 55, step 1012), and stays in that state for a period of time equal to the LOCKOUT TIME.

Figure 60:
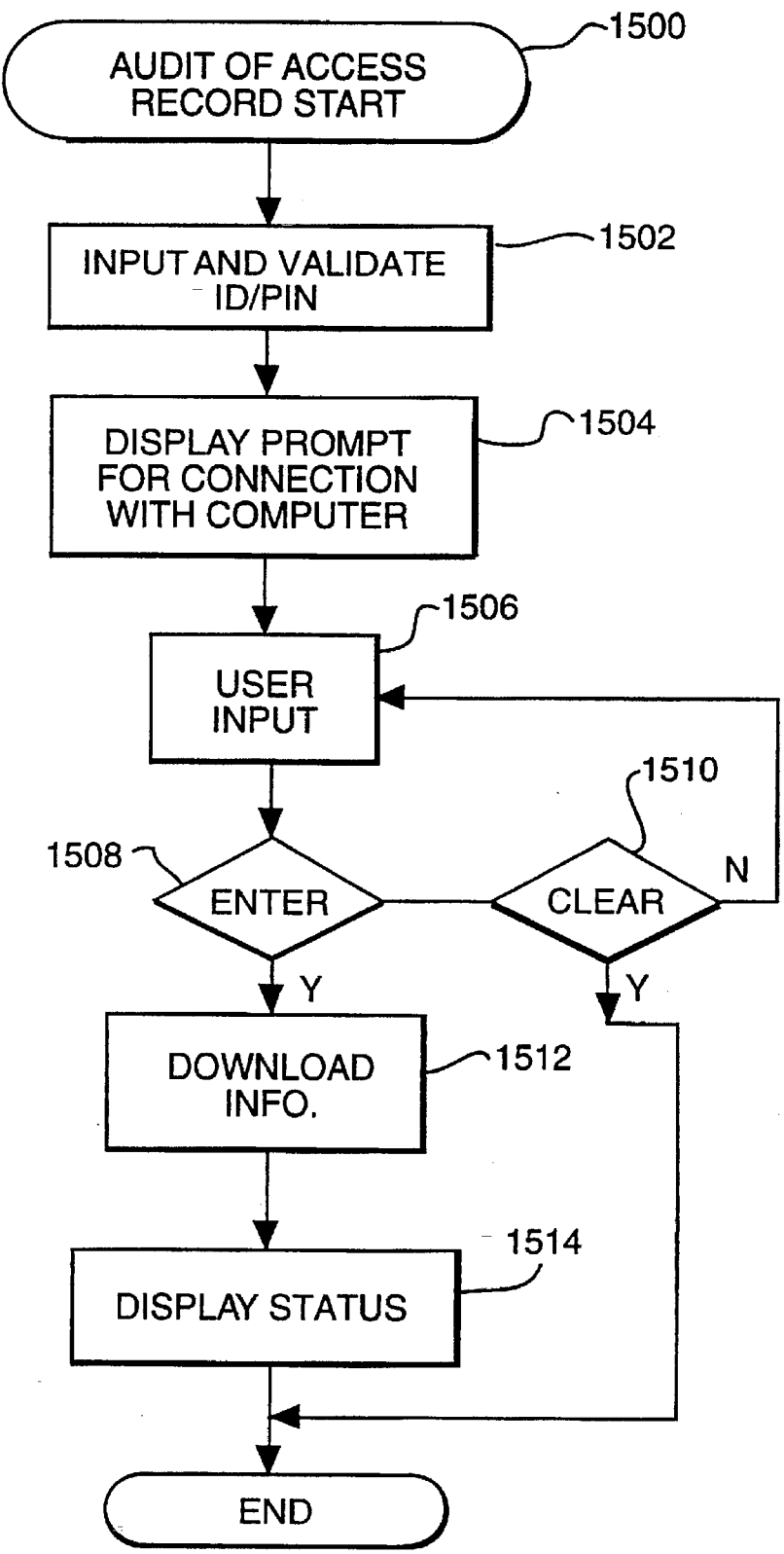
FIG. 60 is a flowchart of the audit of access record routine in accordance with the present invention.

Returning now to FIG. 54, if the TIME key has not been pressed (step 2010), then the selection of the AUDIT key is checked in step 2012. Each time a user unlocks the cart, an access record is stored in non-volatile memory in memory 1706. The last 500 access records, for example, are retained in revolving fashion (i.e., the oldest records are deleted to make way for newer records). Each cart also has stored within it a unique cart identifier. Unlock errors are also stored in memory 1706. All of this information may be downloaded to a computer using the audit function (FIG. 54, step 1500). The procedure is shown in more detail in FIG. 60. In step 1502, the ID/PIN is input in the manner of FIG. 55. An alternating display of "CONNECT COMPUTER" and "ENTER OR CLEAR" begins in step 1504, and continues during input step 1506. After user input from keypad 1720 during step 1506, step 1508 checks to see if ENTER was selected. Presumably, the user will have connected the computer to I/O port 1714 before pressing ENTER. If the user instead presses CLEAR (steps 1508, 1510), then the routine branches to step 1514, where the battery charge message is displayed; thereafter, the routine ends. If neither ENTER (step 1508) nor CLEAR (step 1510) are pressed, then flow returns to step 1506. If enter has been pressed (step 1508), then flow advances to step 1512, wherein the information is downloaded. During step 1512, "DOWNLOADING INFO" is displayed, and then "DOWNLOADING DONE" when the process is completed. When the transaction is complete, the battery charge message is displayed, for about 15 seconds, in step 1514. In addition to access information, other information such as a list of user names, IDs, and PINs may be downloaded to the computer.

Figure 61:
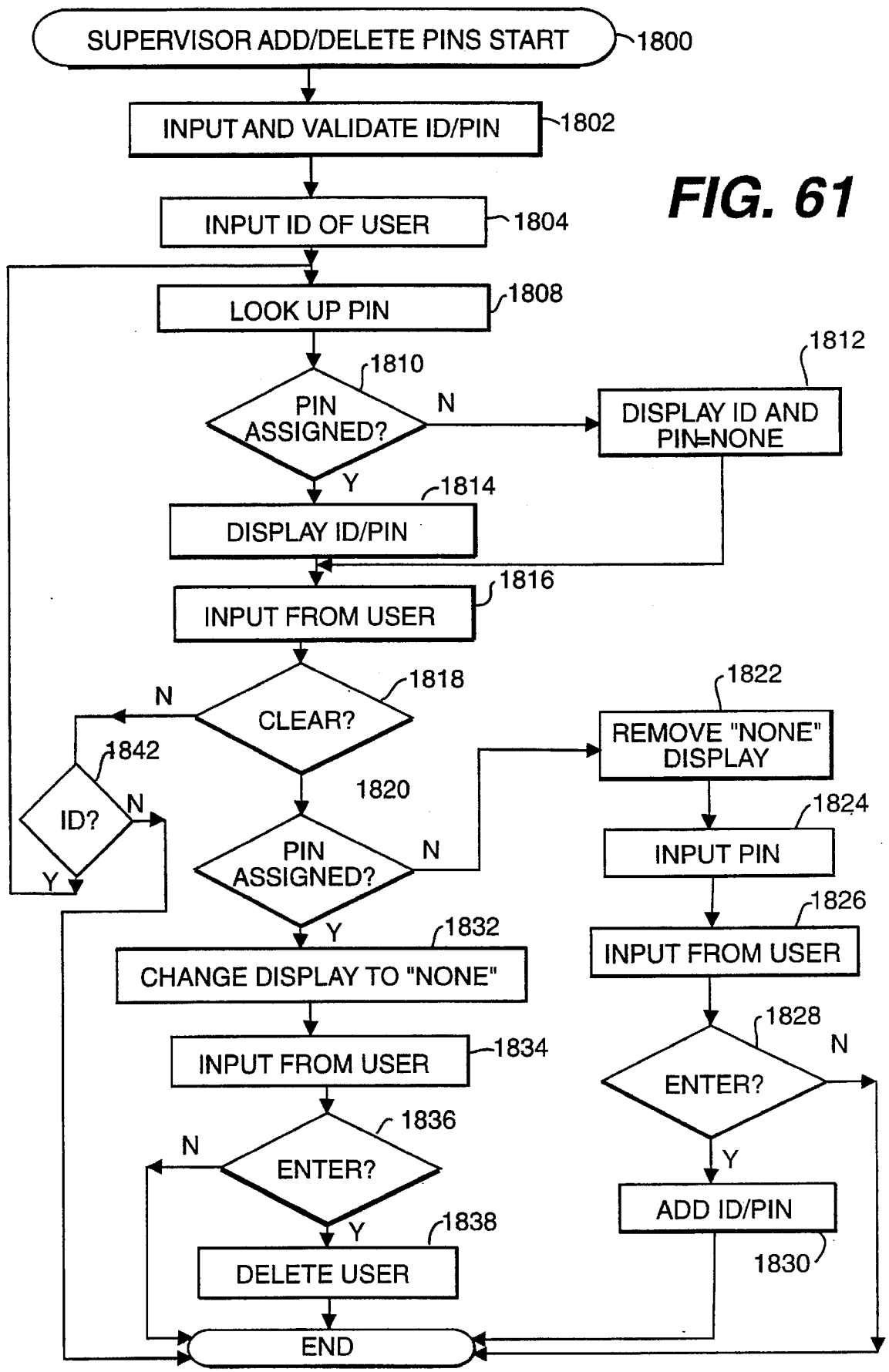
FIG. 61 is a flowchart of the supervisor add/delete PIN routine in accordance with present invention.

In addition to the AUDIT function, a supervisor may also wish to add or delete users. If the AUDIT key is not pressed (FIG. 54, step 2012), flow advances to step 2014, wherein it is determined if the ADD/DEL key has been selected. If not, then flow returns to step 2002. If "YES," then the supervisor add/delete routine, step 1800, is performed. FIG. 61 depicts this routine in more detail. In step 1802, the ID/PIN is input and validated as in FIG. 55. In step 1804, the alternating prompt "ENTER ID OF USER" and "ENTER OR CLEAR" is displayed, while user input is accepted. The CPU 1702 looks up the PIN corresponding to the input ID from memory 1706 in step 1808. If no PIN has been assigned to the input ID (step 1810), then an alternating display of "ID: ##, PIN: NONE" and "CLEAR TO CHG PIN" appears (step 1812). If, on the other hand, a PIN has been assigned to the input ID (step 1810), then an alternating display of "ID: ##, PIN: ####" and "CLEAR TO CHG PIN" appears (step 1814). After either step 1812 or 1814, the flow branches to step 1816. User input is accepted in step 1816. If CLEAR is not pressed (step 1818), but the user has begun to enter another ID (step 1842), then flow returns to step 1808. By means of this procedure, the supervisor can "scroll through" user IDs and PINs by pressing numbers without hitting enter. If neither CLEAR nor an ID is entered (step 1842), then flow ends, and a battery charge message is displayed (not shown in FIG. 61).

On the other hand, if the user has pressed CLEAR, then either the add user routine or delete user routine is chosen. Consider first the delete user routine. Assume, for sake of discussion, that the screen depicts an ID/PIN combination, e.g., "ID: 05, PIN: 1234". Where there is such an assigned PIN (step 1820), the display will now be changed to "NONE" (step 1832). If the user inputs ENTER in step 1834, then flow branches as in step 1836 to step 1838 to delete that user. If the user does not input ENTER in step 1834 (but instead presses CLEAR or another key), then the routine ends (step 1836 branches to end) and a battery charge message is displayed.

Consider next the add user routine. In this case, assume, for sake of discussion that the screen depicts an ID/PIN combination, e.g., "ID: 56, PIN: NONE". Because no PIN is assigned (step 1820), now step 1822 will remove the "NONE" display, and the user may input a new PIN in step 1824. If the user next inputs ENTER in step 1826, then step 1828 branches the flow to step 1830 to add the new ID/PIN. Thereafter, the routine ends and displays a battery charge message. If the user does not input ENTER in step 1826, then step 1828 branches the flow to end the routine, and a battery charge message is displayed.

Note that the foregoing supervisor add/delete PINs routine, when a user is added, entails entry of user IDs and initial PINs; of course, users can change their own PINs as described above in the change PIN routine. If the supervisor needs a list of the user names, IDs, and PINs, the same may be obtained from the computer audit program.

While the aforementioned computer audit program allows downloading of information from the security system 1700 to a computer, the system also allows programming and control of the electronic control system from an external computer. As in the downloading, I/O port 1714 is used as an interface. The date, time, supervisor PIN, user PINs, lockout time, auto-relock time, and any other controllable parameters may be programmed in an external computer, and then uploaded to the electronic control system through I/O port 1714.

In any mode of operation of the control program (including, for example, unlock and auto-relock routine 1100, change PIN routine 1300, change date/time/unlock time routine 1400, audit for access record routine 1500, supervisor add/delete PINs routine 1800, and input and validate ID/PIN routine 1000), if the control program is awaiting user input, and a predetermined amount of time elapses without any input, then the control program exits the mode of operation or routine in question and returns to the main operation (step 2000 in FIG. 54). This improves security, for example, by automatically exiting from the supervisor add/delete PINs routine, if the electronic control system is left unattended in the middle of that routine.

Returning to the structural features of the present invention, the support posts 10 can also serve as part of the platform in an open structure such as the storage system 11 featuring fixed and active level shelves as illustrated in FIG. 2. Details of the storage system are not discussed herein, inasmuch as the shelving system is the subject of a separate patent application being filed concurrently herewith.

When used in an open structure, the symmetrically-spaced circumferential grooves 29 formed on the outer surface of each flange, which are best seen in FIG. 3, can be used to receive a two-piece sleeve as discussed above with respect to U.S. Pat. Nos. 3,424,111 and 3,523,508. Alternatively, or even in conjunction with the two-piece sleeves, metal inserts provided with a vertical array of slots can be secured in an interior slot 26 in the support posts. The slots are designed to receive brackets or other mounting accessories for supporting shelves.

Thus, what has been described is a versatile modular storage and support assembly that uses a flanged support post as a platform for both open and enclosed structures. Of course, all specific shapes, dimensions and sizes of support posts, enclosed structures, panels, shelves or drawers, or materials discussed herein are provided by way of example only. Open and enclosed structures of different configurations than those discussed and illustrated herein are also contemplated as part of the invention.

Although specific embodiments of the present invention have been described above in detail, it will be understood that this description is merely for purposes of illustration. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A support post, comprising:

an elongated tubular post; and a plurality of spaced flanges extending radially from said post and running in a longitudinal direction along said post, each said flange having a first portion extending radially from said post and a second portion extending from a terminal end of said first portion, with each pair of adjacent flanges defining a slot therebetween having a continuous arcuate interior surface and shaped to have a convex interior side.

2. A support post according to claim 1, wherein said flanges are integrally formed with said tubular post.

3. A support post according to claim 1, wherein each said second portion includes a plurality of vertically-spaced horizontal grooves formed in its outer surface.

4. A support post according to claim 1, wherein four flanges are equally spaced around a circumference of said tubular post.

5. A support post according to claim 1, wherein said second portion of each said flange is arcuate in shape.

6. A support post according to claim 5, wherein said plurality of second portions define in cross-section a circle concentric with said tubular post.

7. A support post according to claim 5, wherein each said second portion is a single-wall design.

8. A support post according to claim 1, wherein each slot is further defined by concave-shaped opposite ends.

9. A support post, comprising:

an elongated interior post; and a plurality of spaced flanges extending radially from said post and running in a longitudinal direction along said post, each said flange having a first portion extending radially from said post and a second arcuate portion extending from a terminal end of said first portion, with each pair of adjacent flanges defining a slot therebetween having a continuous arcuate interior surface and shaped to have a convex interior side.

10. A support post according to claim 9, wherein said interior post is tubular and has a circular cross-section.

11. A support post according to claim 10, wherein a circumferential surface of said plurality of second portions define in cross-section a circle concentric with said tubular post.

12. A support post according to claim 9, wherein said flanges are integrally formed with said tubular post.

13. A support post according to claim 9, wherein said second portion is a single-wall design.

14. A support according to claim 9, wherein each said second portion has a plurality of vertically-spaced horizontal grooves formed in its outer surface.

15. A support according to claim 9, wherein four flanges are equally spaced around a circumference of said interior post.

16. A support post according to claim 9, wherein each slot is further defined by concave-shaped opposite ends.

17. A support post, comprising:

an elongated post having an outer circumference and a longitudinal axis; and a plurality of symmetrically spaced, elongated flanges extending radially from said post, with each pair of adjacent flanges defining an elongated slot having rounded opposite ends, a convex-shaped interior side and a continuous arcuate interior surface.

18. A support post according to claim 17, wherein each pair of adjacent flanges forms a slot defined by concave-shaped opposite ends.

19. A support post according to claim 17, wherein said flanges are integrally formed with said tubular post.

20. A support post according to claim 17, wherein each said flange includes a plurality of vertically-spaced horizontal grooves formed in its exterior surface.

21. A support post according to claim 17, wherein four flanges are provided on said elongated post, defining four substantially T-shaped slots.

22. A support post, comprising:

an elongated tubular post having an exterior wall defining a first circumference and having a longitudinal axis; and a plurality of symmetrically-spaced, elongated flanges extending radially from said post and running in the longitudinal direction of said post, wherein circumferential surfaces of said flanges define a second circumference concentric with the first circumference and each pair of adjacent flanges defines therebetween an elongated slot with a continuous arcuate interior surface and shaped to have a convex interior side.

23. A support post according to claim 22, wherein each pair of adjacent flanges forms an elongated slot defined by rounded opposite ends.

24. A support post according to claim 23, wherein each pair of adjacent flanges forms a slot defined by concave-shaped opposite ends.

25. A support post according to claim 22, wherein said flanges are integrally formed with said tubular post.

26. A support post according to claim 22, wherein each said flange includes a plurality of vertically-spaced horizontal grooves formed in its exterior surface.

27. A support post according to claim 22, wherein four flanges are provided on said tubular post, defining four slots.

* * * * *

UNITED STATES PATENT AND TRADEMARK OFFICE
CERTIFICATE OF CORRECTION

PATENT NO. : 5,647,650
DATED : July 15, 1997
INVENTOR(S) : Daugherty et al.

It is certified that error appears in the above-identified patent and that said Letters Patent is hereby corrected as shown below:

TITLE PAGE:

[56] REFERENCES CITED:

```
U.S. PATENT DOCUMENTS, insert the following:
  --3,424,111   1/1969   Maslow ..................... 108/144
    5,415,302   5/1995   Carlson et al. ............. 211/187
    5,016,948   5/1991   Welch et al. ............... 312/250
    D 323915    2/1992   Welch ...................... D34/21
```

Signed and Sealed this

Fourteenth Day of April, 1998

Attest:

BRUCE LEHMAN

*Attesting Officer*    *Commissioner of Patents and Trademarks*